United States Patent
McCorkle

(10) Patent No.: US 9,880,260 B2
(45) Date of Patent: Jan. 30, 2018

(54) ELECTRICALLY SMALL, RANGE AND ANGLE-OF-ARRIVAL RF SENSOR AND ESTIMATION SYSTEM

(71) Applicant: John W. McCorkle, Vienna, VA (US)

(72) Inventor: John W. McCorkle, Vienna, VA (US)

(73) Assignee: APPLIED SIGNALS INTELLIGENCE, INC., Reston, VA (US)

( * ) Notice: Subject to any disclaimer, the term of this patent is extended or adjusted under 35 U.S.C. 154(b) by 182 days.

(21) Appl. No.: 15/003,880

(22) Filed: Jan. 22, 2016

(65) Prior Publication Data

US 2016/0146923 A1    May 26, 2016

Related U.S. Application Data

(63) Continuation of application No. 14/798,864, filed on Jul. 14, 2015, now Pat. No. 9,279,880.

(60) Provisional application No. 62/024,665, filed on Jul. 15, 2014.

(51) Int. Cl.
| | |
|---|---|
| G01S 5/06 | (2006.01) |
| G01S 3/46 | (2006.01) |
| G01S 3/14 | (2006.01) |
| G01S 5/12 | (2006.01) |

(52) U.S. Cl.
CPC .............. *G01S 5/06* (2013.01); *G01S 3/146* (2013.01); *G01S 3/46* (2013.01); *G01S 5/12* (2013.01)

(58) Field of Classification Search
CPC ... G01S 5/06; G01S 5/12; G01S 3/146; G01S 3/46

USPC .......................................................... 342/442
See application file for complete search history.

(56) References Cited

U.S. PATENT DOCUMENTS

| | | | |
|---|---|---|---|
| 4,443,802 A | 4/1984 | Mayes | |
| 6,067,053 A * | 5/2000 | Runyon | ................ H01Q 1/246 343/700 MS |
| 6,329,955 B1 | 12/2001 | McLean et al. | |
| 6,424,309 B1 | 7/2002 | Johnston et al. | |
| 6,515,632 B1 | 2/2003 | McLean | |

(Continued)

OTHER PUBLICATIONS

Cecconi, B., and P. Zarka. "Direction finding and antenna calibration through analytical inversion of radio measurements performed using a system of two or three electric dipole antennas on a three-axis stabilized spacecraft." Radio Sci., 40, RS3003, 2005.

(Continued)

*Primary Examiner* — Frank J McGue
(74) *Attorney, Agent, or Firm* — Posz Law Group, PLC

(57) ABSTRACT

An RF emitter sensing device is provided comprising an antenna circuit and an estimator configured to output, for one or more incoming signals-of-interest (SoI), either or both of an estimated range to the emitter of each SoI, and estimates for one or more angles corresponding to the 3D angle-of-arrival (AoA) of each SoI, wherein: the antenna circuit has a plurality of ports that each output an output signal containing the one or more SoI, the antenna circuit including one or more multi-port antennas, each multi-port antenna having two or more ports, each multi-port antenna being configured to pick up a combination of one or more E-field signals and one or more H-field signals from each SoI, in a common volume of space.

20 Claims, 18 Drawing Sheets

(56) References Cited

U.S. PATENT DOCUMENTS

| | | | | |
|---|---|---|---|---|
| 6,963,301 | B2* | 11/2005 | Schantz | G01S 5/14 |
| | | | | 342/118 |
| 7,388,550 | B2 | 6/2008 | McLean | |
| 8,179,328 | B2 | 5/2012 | Brown | |
| 8,253,626 | B2* | 8/2012 | Schantz | H04L 35/02 |
| | | | | 342/442 |

OTHER PUBLICATIONS

Paul Denisowski. "A comparison of radio direction-finding technologies." Rohde & Schwarz.
Lan-Mei Wang, Gui-Bao Wang, Cao Zeng. "Mutual Coupling Calibration for Electro-Magnetic Vector Sensor." Progress in Electromagnetics Research B, vol. 52, pp. 347-362, 2013.
Mayes, P.E., W. Warren, and F. Wiesenmeyer. "The Monopole Slot: A Small Broad-Band Unidirectional Antenna." Antennas and Propagation, IEEE Transactions on 20, No. 4, pp. 489-493, Jul. 1972.
McLean, J., and R. Sutton. "Practical Realization of PxM Antennas for High-Power, Broadband Applications." In Ultra-Wideband, Short-Pulse Electromagnetics 7, Chapter 30, pp. 267-275. Springer New York, 2007.
McLean, J., H. Foltz, and R. Sutton. "Conditions for Direction-Independent Distortion in UWB Antennas." Antennas and Propagation, IEEE Transactions on 54, No. 11, pp. 3178-3183, Nov. 2006.
Oger M., F. Marie, D. Lemur, G. Le Bouter, Y. Erhel, L. Bertel, "A method to calibrate HF receiving antenna arrays." IEE Ionospheric Radio Techniques Symposium, London, United Kingdom, 2006.
R&S ADDx Multichannel DF Antennas Product Overview, Version 4.00, Sep. 2013.
Read, W. "Review of Conventional Tactical Radio Direction Finding Systems." Communications Electronic Warfare Section, Electronic Warfare Division, Defence Research Establishment Ottawa, Technical Note 89-12, May 1989.
Rohde & Schwarz. "Introduction into Theory of Direction Finding." Catalog Radiomonitoring & Radiolocation, 2011/2012.
Sathish Chandran. "Advances in Direction-of-Arrival Estimation." Artech House. Norwood, MA. 2006.
Schroeder, K., and K. Soo Hoo. "Electrically Small Complementary Pair (ESCP) with Interelement Coupling." Antennas and Propagation, IEEE Transactions on 24, No. 4, pp. 411-418, Jul. 1976.
Baum, C. E., "Some Characteristics of Electric and Magnetic Dipole Antennas for Radiating Transient Pulses." AFWL Sensors and Simulation Notes 125, Jan. 1971.
Yu, J.S., C-L. James Chen, and C. E. Baum. "Multipole Radiations: Formulation and Evaluation for Small EMP Simulators." Sensor and Simulation Notes 243, Jul. 1978.
E. G. Farr and J. Hofstra. "An Incident Field Sensor for EMP Measurements." Electromagnetic Compatibility, IEEE Transactions on, May 1991, pp. 105-113, Also published as Sensor and Simulation Notes 319, Jul. 1989.
Baum C. E., "General properties of antennas." Sensor and Simulation Notes 330, Jul. 1991.
Tesche, F. M., "The PxM Antenna and Applications to Radiated Field Testing of Electrical Systems, Part 1—Theory and Numerical Simulations." Electromagnetic Compatibility, IEEE Transactions on, vol. 44, No. 1, pp. 18-24, Feb. 2002. Sensor and Simulation Notes 407, Jul. 1997.
Tesche, F. M., T. Karlsson, and S. Garmland., "The PxM Antenna and Applications to Radiated Field Testing of Electrical Systems, Part 2, Experimental Considerations." Sensor and Simulation Notes 409, Jul. 1997.
Farr, E. G., C. E. Baum, W. D. Prather, and T. Tran., "A Two-Channel Balanced-Dipole Antenna (BDA) With Reversible Antenna Pattern Operating at 50 Ohms." Sensor and Simulation Notes 441, Dec. 1999.
International Preliminary Report on Patentability of the International Searching Authority dated Jan. 17, 2017 issued in corresponding International patent application No. PCT/US2015/040328.
International Search Report and Written Opinion of the International Searching Authority dated Mar. 7, 2016 issued in corresponding International patent application No. PCT/US15/40328.

* cited by examiner

ELECTRICALLY SMALL, RANGE AND ANGLE-OF-ARRIVAL RF SENSOR AND ESTIMATION SYSTEM

CROSS REFERENCE TO RELATED APPLICATIONS

This application is a continuation application of U.S. utility application Ser. No. 14/798,864 filed on Jul. 14, 2015, which claims the benefit of provisional application Ser. No. 62/024,665 filed on Jul. 15, 2014, the contents of which are incorporated herein by reference.

FIELD OF THE INVENTION

The present invention relates to systems designed to detect and estimate the angle of arrival (AoA) or direction of arrival (DoA) of propagating waves such as electromagnetic waves and also characterize their polarization and also estimate the range to the emitter of a wave. Systems that provide both AoA and range estimation are commonly called passive geolocation systems. AoA estimation systems are also commonly referred to as direction finding (DF) systems. More specifically the present invention relates to an RF emitter sensing system that includes in its antenna system what is known in the literature as a $\vec{p}$ cross $\vec{m}$ antenna (PxMA) element, and in particular, PxMA embodiments that maintain high front-to-back ratio (i.e. high directivity) to arbitrarily low frequency. More specifically the present invention relates to an RF emitter sensing system that processes the signals from the antenna system that includes a high directivity at arbitrarily low frequency PxMA to (1) enable self E-field and H-field sensitivity calibration, (2) mitigate self noise, (3) mitigate homogeneous environmental noise, (4) mitigate multipath such as from sky-wave versus ground-wave paths, and (5) enable accurate AoA and polarization characterization of signals so weak that they are below the noise floor of, and cannot be received by, a standard receiver intended to receive and demodulate the signal of interest, and (6) enable accurate estimation of the range to the emitter.

BACKGROUND OF THE INVENTION

A key problem of current DF systems is their large size, weight, power consumption, and setup time, when they must operate at low frequencies, such as a less than a few MHz. For many years, the government has advertised requests for proposals to solve this problem. Many journal articles from radio operators to government researchers to university professors, have been written attempting to solve this problem. What is desired is an RF emitter sensing device that operates at low frequencies and particularly at less than a few MHz, that is also small enough to be handheld or man wearable (e.g. contained within a backpack or in an operators clothing), or small and light enough to fly on a miniature unmanned aerial vehicle (UAV). The disclosed RF emitter sensing device is a solution to this long-standing problem. The disclosed RF emitter sensing system includes (a) antennas that are unique in that they are extremely wide bandwidth and their directivity (i.e. front-to-back ratio) improves as the frequency goes down, allowing the DF system to operate to arbitrarily low frequency regardless of how small it is, and (b) signal processing methods to enhance its sensitivity and accuracy to help mitigate the fact that the energy collection area of the miniature antennas is small. The small high directivity antennas and the signal processing methods, taken together, create the long asked for DF system.

The angle-of-arrival (AoA) or direction-of-arrival (DoA) of a signal of interest (SoI), along with range and polarization, can be expressed in a spherical coordinate system, such as pictured in FIG. 15. Standard geometric rotation and translation calculations can be used to change on object's pose (position and orientation) within a coordinate system or to convert a pose between coordinate systems. In this document we will use the term AoA to mean either a single angle, such as azimuth, or the combination of angles, such as azimuth and elevation, in a defined coordinate system.

For example, in an earth-centric 2D planer coordinate system with the plane parallel to a point on the earth's surface, AoA typically means an azimuth angle, or in other words, a compass direction. The plane could be pictured as the x-y plane in FIG. 15. Azimuth is sometimes measured as a counter-clockwise angle from east where 0 degrees means due east, 90 degrees means due north, and the angular range covers from 0 to 360 degrees. With this azimuth angle definition, in FIG. 15, there would be no z-axis since it is a 2D coordinate system, the x-axis would aim due east, the y-axis would aim due north, and φ would be the azimuth angle.

For another example, in an earth-centric 3D coordinate system, AoA typically means a combination of angles, an azimuth-angle and an elevation-angle. The elevation-angle is typically understood to be an angle covering −90 to 90 degrees relative to a plane parallel to the surface of the earth, where 90 degrees means straight up from the earth's surface toward outer space, −90 degrees means straight down toward the center of the earth, and 0-degrees means parallel to the earth's surface. Given this elevation angle definition, in FIG. 15, 90−θ degrees would be the elevation angle.

Depending on the application, the desired output of the RF emitter sensing system may be either 2D or 3D. Typically, different applications have different lists of desired outputs that also include items such as the SoI's polarization, frequency, magnitude, duty-cycle, peak-to-average ratio, repetition rate, modulation type, event time and the confidence level of these estimates. A confidence level is a statement such as 95% of the estimates will have an error of less than a given amount like, for example, 1 degree, or 10 Hz, or 2 dB, etc.

REFERENCES

The following references are incorporated by reference in their entirety.

Reference 1: Introduction into Theory of Direction Finding, 2011-2012 Rhode Schwarz catalog Radiomonitoring & Radiolocation.

Reference 2: Paul Denisowski, A comparison of radio direction-finding technologies, Rohde & Schwarz.

Reference 3: R&S ADDx Multichannel DF Antennas Product Overview, Version 4.00, September 2013.

Reference 4: W. Read, Review of Conventional Tactical Radio Direction Finding Systems, Communications Electroinic Warfare Section, Electronic Warfare Division, Defence Research Establishment Ottawa, Technical Note 89-12, May 1989.

Reference 5: Sathish Chandran, Editor, Advances in Direction-of-Arrival Estimation, Artech House 2006, Norwood Mass. ISBN-10: 1-59693-004-7.

Reference 6. Lan-Mei Wang, Gui-Bao Wang, Cao Zeng, "MUTUAL COUPLING CALIBRATION FOR ELECTRO- MAGNETIC VECTOR SENSOR." Progress In Electromagnetics Research B, Vol. 52, pp 347-362, 2013.

Reference 7: Oger M., Marie F., Lemur D., Le Bouter G., Erhel Y., Bertel L., "A method to calibrate HF receiving antenna arrays." IEE Ionospheric Radio Techniques Symposium, London: United Kingdom (2006).

Reference 8: Cecconi, B., and P. Zarka (2005), "Direction finding and antenna calibration through analytical inversion of radio measurements performed using a system of two or three electric dipole antennas on a three-axis stabilized spacecraft." Radio Sci., 40, RS3003, doi:10.1029/2004RS003070.

Reference 9: Baum, C. E., "Some Characteristics of Electric and Magnetic Dipole Antennas for Radiating Transient Pulses." AFWL Sensors and Simulation Notes 125 (January 1971).

Reference 10: J. S. Yu, C-L James Chen, and C. E. Baum, "Multipole Radiations: Formulation and Evaluation for Small EMP Simulators." Sensor and Simulation Notes 243 (July 1978).

Reference 11: E. G. Farr and J. Hofstra, "An Incident Field Sensor for EMP Measurements." Electromagnetic Compatibility, IEEE Trans. on, May 1991, 105-13, Also published as Sensor and Simulation Notes 319 (July 1989).

Reference 12: Baum C. E., "General properties of antennas." Electromagnetic Compatibility, IEEE Transactions on, vol. 44, no. 1, pp. 18-24, February 2002 doi: 10.1109/15.990707. Also Sensor and Simulation Notes 330 (July 1991);

Reference 13: F. M. Tesche, "The PxM Antenna and Applications to Radiated Field Testing of Electrical Systems, Part 1, Theory and Numerical Simulations." Sensor and Simulation Notes 407 (July 1997).

Reference 14: F. M. Tesche, T. Karlsson, and S. Garmland, "The PxM Antenna and Applications to Radiated Field Testing of Electrical Systems, Part 2, Experimental Considerations." Sensor and Simulation Notes 409 (July 1997).

Reference 15: E. G. Farr, C. E. Baum, W. D. Prather, and T. Tran, "A Two-Channel Balanced-Dipole Antenna (BDA) With Reversible Antenna Pattern Operating at 50 Ohms" Sensor and Simulation Notes 441 (December 1999).

Reference 16: McLean, J., H. Foltz, and R. Sutton. "Conditions for Direction-Independent Distortion in UWB Antennas." Antennas and Propagation, IEEE Transactions on 54, no. 11 (November 2006): 3178-83. doi:10.1109/TAP.2006.883956.

Reference 17: Mayes, P. E., W. Warren, and F. Wiesenmeyer. "The Monopole Slot: A Small Broad-Band Unidirectional Antenna." Antennas and Propagation, IEEE Transactions on 20, no. 4 (July 1972): 489-93. doi:10.1109/TAP.1972.1140250.

Reference 18. McLean, J., and R. Sutton. "Practical Realization of PxM Antennas for High-Power, Broadband Applications." In Ultra-Wideband, Short-Pulse Electromagnetics 7, Chapter 30, edited by Frank Sabath, Eric L. Mokole, Uwe Schenk, and Daniel Nitsch, 267-75. Springer New York, 2007.

Reference 19: McLean, J. S., and G. E. Crook. *Broadband Antenna Incorporating Both Electric and Magnetic Dipole Radiators*, U.S. Pat. No. 6,329,955.

Reference 20. McLean, J. S. *PxM Antenna with Improved Radiation Characteristics over a Broad Frequency Range.* U.S. Pat. No. 7,388,550 Jun. 17, 2008.

Reference 21: G. F. Brown, *Direction finding antenna* U.S. Pat. No. 8,179,328, 15-May-2012.

Reference 22: Schroeder, K., and K. Soo Hoo. "Electrically Small Complementary Pair (ESCP) with Interelement Coupling." Antennas and Propagation, IEEE Transactions on 24, no. 4 (July 1976): 411-18. doi:10.1109/TAP.1976.1141376.

Reference 23: Mayes, P. E. *Stripline Fed Hybrid Slot Antenna*, U.S. Pat. No. 4,443,802 April 1984.

Direction Finding Background

Reference 1 and Reference 2 are easy to read introductions into the theory of direction finding that discuss and compare various techniques used to implement DF systems. Reference 3 gives an overview of different antenna systems used in DF systems. Reference 4 and Reference 5 provide in-depth treatments of direction finding techniques. A tremendous amount of effort has gone into calibrating or mitigating errors in DF systems. Reference 5, Reference 6, Reference 7, and Reference 8 provide in-depth background on error mitigation and calibration techniques. Reference 9 through Reference 16 provide detailed theoretical and practical background into a $\vec{p}$ cross $\vec{m}$ antenna element, which we will call a "PxMA" element. The practical realizations shown in Reference 11 and Reference 15 show the operation of a PxMA embodiment that operates to an arbitrarily low frequency, as opposed to antennas such as those shown in Reference 17 through Reference 23, which include multiple elements, such as loops and dipoles/monopoles or slots and dipole/monopoles, multiple slots, or multiple dipole/monopoles and have PxMA characteristics over a passband that does not extend to an arbitrarily low frequency.

To find the source of RF emissions, it is desirable to have a small, man portable, RF emitter sensing system. There are many uses for RF emitter sensing systems. They can be used to track or find objects that have an RF transmitter, like an emergency beacon, or animals whose daily habits or migratory habits are being studied. As the use of wireless devices for remote sensing, remote control, voice and data communication, and a plethora of applications has expanded, as well as the use of digital devices that radiate unintentionally, the likelihood of improperly radiating RF energy at levels beyond regulatory standards has likewise expanded. Equipment operating at levels beyond regulatory standards can cause harmful interference. Often, the source and location of the improper emissions is unknown. RF emitter sensing systems are used to find the aberrant transmitter.

Victim systems to an aberrant transmitter can have a large antenna-system such as a large antenna, or a large array of antennas, that can collect significant energy even from small signals. This fact gives them high sensitivity, causing them to be disturbed by small aberrant signals. On the contrary, a portable DF system must have a small antenna or antenna-system; otherwise, it is not portable. As such, it cannot collect as much energy as the large antenna-system. Not only is the sensor smaller, but the location of the sensor is often poor. For example, the victim system might be strategically located near the top of a tall tower or building. In contrast, to maintain easy and covert portability the DF antenna may be only waist or head high. Thus, it will be appreciated that a method for obtaining a high signal to noise ratio, even with a small poorly located antenna-system, is needed for a man portable DF system.

Another difficulty in realizing an effective RF emitter sensing system is that propagating waves reflect off of and diffract around random objects like mountains, buildings, the ground, rocks, cars, trucks, people, etc. and also refract off of the ionosphere. In contrast, waves from objects and nearby reflections that are far away relative to the size of the RF emitter sensing system's antenna array are seen as essentially plane waves, the waves from nearby sources can often be much more spherical when the RF emitter sensing system's antenna array is relatively large. A plane wave collected by an array produces a distinct pattern of amplitudes and phases at the ports of the antenna system, allowing the direction of the plane wave to be estimated. But a spherical wave from an unknown direction and with an unknown radius typically produces a pattern of amplitudes and phases at the ports that can be confusing and does not match a plane wave. Thus, it will be appreciated that a method is needed that can estimate the AoA with a very small array so that even close-by signals still appear planar enough to give accurate AoA estimates.

Another difficulty in realizing an effective DF system, especially a portable one, is the tight mechanical and electrical tolerances required across a plethora of interconnected items that must all work together in order for a DF system to perform its function. Many DF systems are based on using a loop (sometimes made as a slot) antenna for a magnetic (H-field) sensor and a dipole or monopole antenna for a electric field (E-field) sensor. Assuming their relative position is known and relatively close together, such as less than ½ wavelength apart, the outputs of these antennas can be adjusted in magnitude and phase and then summed so as to create a cardioid pattern in a passband that is useful for direction finding. The problem is that these loop/dipole combinations do not work (i.e., provide high directivity) to an arbitrarily low frequency. The sensitivities of the different elements to the E and H field components of the incident electromagnetic (EM) field must be extremely well matched in order to produce a reasonable cardioid pattern (i.e., one with a back to front ratio of −15 dB or better) so that AoA estimation can be done accurately.

This sensitivity-matching is problematic because the loop antenna and the dipole antenna don't inherently share the same sensitivity, impedance, frequency response, or impedance versus frequency. Moreover, while broad-banding approaches may be used, these antenna elements as well as their matching networks are resonant and thus narrowband devices. Beyond these differences, when the elements are separately matched and amplified, the signal chain for the loop antenna and the dipole antenna must match and be stable across all frequencies. The signal chain components include impedance-matching circuits, transmission line lengths, and gains/losses and delays in amplifiers, mixers, switches, filters, etc. that make up the multiple signal paths. To end up with a cardioid pattern requires all these to match at all frequencies of interest. The inability to maintain tight mechanical and electrical tolerances causes reduced reliability and higher AoA estimation errors. Steps taken to improve or mitigate sensitivity to these tolerance issues typically require offline calibration measurements and cause increased expense, complexity, size, weight, and power use. In light of these difficulties, it will be appreciated that a DF system is needed that that is inherently broadband at low frequencies, inherently calibrated, and can not only estimate the AoA using one or more small EM sensor elements, but is also non-resonant, enabling it to accurately capture the waveform shape to aid in its identification or characterization.

While the above paragraph speaks to the problems for a single vector field sensor, when an array of these sensors are used, the matching must extend across multiple vector sensors. Thus, it will be appreciated that it would be advantageous for the RF emitter sensing system to use a vector field sensor that has an extremely repeatable cardioid pattern, transient response, and sensitivity across multiple units. In other words, the sensor should be highly immune to mechanical and electrical tolerances.

Another difficulty is that there is need for the man portable DF system to operate at low frequencies, yet at broad bandwidths. While a tuning network can be employed, it must be set for one center-frequency at a time, providing only one narrow band of operation at a time. Use of tuning networks also slows reaction time and adds weight, cost, complexity, and a controller to manage its settings. Thus it will be appreciated that a method for obtaining wideband operation without tuning, including down to arbitrarily low-frequency, is highly desirable.

At higher frequencies, wideband antennas such as spirals, log periodic, and Vivaldi antennas are sometimes used. But these antennas introduce a beam pattern (including magnitude, polarization, and group delay as a function of angle) whose magnitude and polarization is not symmetric about the main axis. Furthermore, the non symmetry varies from unit to unit since it is sensitive not only to mechanical tolerances, but also to the electrical tolerances of the matching networks (such as a quadrature-hybrid's magnitude and phase balance). All these non-symmetric factors are important, especially for a fully polarimetric DF systems. These non-symmetries limit the system's accuracy not only in estimating the AoA, but also with respect to the polarization and time/frequency properties of the waveform. Thus it will be appreciated that a method for obtaining a symmetric beam pattern that is insensitive to tolerances and matching networks is needed.

Another difficulty is that man portable RF emitter sensing systems are repeatedly assembled, disassembled, carried around, packed and unpacked. This man-handling makes it all the more difficult to maintain tight tolerances. In practice, even though a RF emitter sensing system might be made to work in a lab environment, the harsh environment of a man portable system can cause RF emitter sensing systems to give un-reliable results, or to simply stop functioning altogether.

It would therefore be desirable to have, and is the object of the invention to construct, a small man-portable DF system that simultaneously (1) allows and has electrically small antenna elements with the ability to operate at arbitrarily low frequency, (2) has high sensitivity even though the antennas are electrically small, (3) is small, light-weight, low-power and low-cost (4) has disassembly and assembly times, and set-up tolerances, that are easy to maintain in a harsh, man-portable environment, (5) provides accurate AoA, polarization, and range estimates, and (6) provides the accurate AoA, polarization, and range estimates quickly.

SUMMARY OF INVENTION

The invention discloses the use of one or more PxMA elements in an RF emitter sensing system that estimates one or more of, the direction of arrival, the polarization, and the range, to an emitter, where the PxMA element maintains high directivity (i.e. high front-to-back ratio) to arbitrarily low frequencies and where the PxMA element is comprised of one or more pairs of conductive surfaces offset from one another comprised of a first conductive surface and a second conductive surface with one or more pairs of ports, or port-pairs, wherein each port-pair has a first port and a second port, and wherein each port is formed by a connection to the two conductive surfaces, and wherein each port-pair forms a loop going from the first terminal of said first port, through said first conductive surface to the first terminal of said second port, through said second port to the second terminal of said second port, and through said second conductive surface to the second terminal of said first port, and through the first port back to the first terminal of the first port to complete the loop. In some embodiments, when there is both a first port-pair and a second port-pair connected to a pair of conductive surfaces, a construction line going between said first port-pair and a construction line going through said second port pair are preferred to be at 90 degrees to each other. When a pair of conductive surfaces has two pairs of ports, it is called a QPA for quad-port-antenna. When a pair of conductive surfaces has one pair of ports, it is called a DPA for dual-port-antenna. When three pairs of conductive surfaces are centered on a common center point to occupy a common volume of space, and each conductive surface pair attaches to one port pair, the antenna is called an HPA for hex port antenna. When three pairs of conductive surfaces are centered on a common center point to occupy a common volume of space, and each conductive surface pair attaches to two port pairs, the antenna is called a DHPA for dual hex port antenna or 12-PA for 12-port-antenna.

FIG. 3 illustrates a DPA where the conductive surfaces are 305 and 310 and the port-pair is on opposite edges of the conductive surfaces. FIG. 4 illustrates a DPA where the pair of conductive surfaces are 305 and 460 and the port-pair is on opposite edges of conductive surface 305, and conductive surface 460 is larger than conductive surface 305 such that conductive surface 460 can be thought of as a ground plane that may be place on the ground or some large object such as an aircraft wing or roof top. As opposed to the surfaces bending less than 90 degrees extending outward to make the port connection points farther apart, the surfaces can also be bent greater than 90 degrees to make the port connections closer together than the extent of the conductive surfaces. Similarly, the conductive surfaces can have a protrusion to establish the connection to a port, also allowing the extent of the surface to extend past the port positions. FIG. 5 illustrates a DPA where the conductive surfaces 505 and 510 wrap around a cylinder and the port-pair is on opposite edges of both conductive surfaces. This shape flexibility allows the antenna to be optimized for various load impedances and to fit in the space needed by different applications.

The invention also discloses a QPA having four ports and comprised of a pair of DPAs that share the same volume of space and the same conductive surfaces. FIG. 6 is a mechanical drawing of a QPA. It shows a pair of PxMA elements that share a common pair of conductive surfaces 605 and 610, where one pair of ports, or port-pair, is oriented orthogonally to the other port-pair. One DPA uses a port-pair comprised of port-1 and port-2 in FIG. 6. The other DPA uses a port-pair comprised of port-3 and port-4 in FIG. 6. FIG. 7 is a mechanical drawing of another QPA embodiment where a pair of DPAs share a common pair of conductive surfaces 705 and 710, where one port-pair is oriented orthogonally to the other port-pair. One DPA uses the port-pair comprised of port-1 and port-2 in FIG. 7. The other DPA uses the port-pair comprised of port-3 and port-4 in FIG. 7. The QPA has the same shape flexibility as the DPA, allowing the antenna to be optimized for various load impedances and to fit in the space needed by different applications.7

The invention also discloses a hex or six (6) port PxMA antenna (HPA) and a twelve (12) port or dual hex-port PxMA antenna (DHPA) that operate to arbitrarily low frequency, and its use in a DF system. These are useful for a minimum size 3D and fully polarimetric RF emitter sensing device embodiments. Rather than using three DPAs or three QPAs that are oriented orthogonally to each other, an embodiment can use a single HPA or DHPA, which allows three DPAs or QPAs to share the same volume. In other words, all six HPA ports or all twelve DHPA ports share the same space. The spatially merged antenna allows tighter manufacturing tolerances on keeping the twelve ports orthogonal, tighter mutual calibration, and a smaller total volume to support six orthogonal ports, or twelve ports. FIG. 19B, is a mechanical drawing showing the DHPA configuration, while FIG. 19A shows an HPA configuration. FIG. 19B shows three pairs of conductive surfaces, a first pair 1a and 1b having two pairs of ports, a second pair of conductive surfaces 2a and 2b having two pairs of ports, and a third pair of conductive surfaces 3a and 3b having two pairs of ports. The HPA in FIG. 19A is a subset with one set of ports removed such that only one pair of ports for each pair of conductive surfaces remain. The conductive surfaces in FIGS. 19A and 19B are shown with a flat and square main body on the faces of a cube. But these surfaces can take on other shapes such as being circular instead of square, or being non-flat (such as forming the shape of a sphere instead of a cube). Similarly, part of the conductive surfaces appear as thin wires that connect the main body of the conductive surfaces to the feed points, but the conductive surface can be shaped such that these connections have other shapes, such as being triangular tapers with the same shape flexibility as a DPA or QPA. In addition to obtaining a smaller total volume, the spatially merged antenna (1) operates better in a multipath environment since all six EM fields are measured in the exact same location, (2) allows tighter manufacturing tolerances for keeping the ports fixed relative to each other (e.g. orthogonal), and (3) achieves tighter mutual calibration. In any embodiment where surfaces have more than one port-pair (e.g. QPA, HPA, DHPA), the surface may be split into a pair of slightly offset surfaces so that each port-pair connects to a separate surface. In all cases (DPA, QPA, HPA, DHPA) there is also flexibility to place slits or slit patterns in the conductive surfaces to force currents to flow in preferred directions and at preferred frequencies if desired. Frequency selective surfaces may be used to operate at preferred frequencies, and be relatively invisible or reflective at other frequencies.

Multi-port antennas can be conceptually cut in half, where port-pairs are split between the two halves, such that the first-half of the multiport antenna is the half of the antenna that the signal arrives at first, and the other-half is the half that the signal arrives at after it passes the first half. In this case, the ports in the first half output a signal that is proportional to the sum of the magnitude of the E and H fields since the E and H fields have the same sign. The ports in the other half output a signal that is proportional to the difference between the magnitude of the E and H fields since the E and H fields have opposite signs. If the antenna's sensitivity to the E and H fields are matched, both the sum and the difference output voltages have cardiod patterns but the cardiod patterns point in opposite directions. This sum and difference operation is shown pictorially in FIG. 11.

As shown in FIG. 1A, the invention discloses an RF-emitter sensing device including an antenna circuit and an estimator configured to output, for one or more incoming signals-of-interest (SoI), one or more of (a) an estimated range to the emitter of each SoI, (b) estimates for one or more angles corresponding to the 3D angle-of-arrival (AoA) of each SoI, and (c) an estimated polarization of each SoI.

In this case, the antenna circuit has a plurality of ports that each output an output signal containing the one or more SoI. The antenna circuit includes one or more multi-port antennas. Each multi-port antenna has two or more ports. Each multi-port antenna is configured to pick up a combination of one or more vectors of the E-field signal and one or more vectors of the H-field signal from each SoI, from a common volume of space, or in other words, the same or identical volume of space. The estimator element is configured to output, for each SoI, one or more of (a) an estimated range, (b) an estimated AoA, and (c) an estimated polarization. It estimates one or more angles corresponding to the AoA of each SoI by receiving the output signals from the antenna circuit, and generating one or more of an estimated range to the emitter of each SoI, and estimates for one or more angles corresponding to the AoA of each SoI and an estimated polarization. The multi-port antenna is configured such that the one or more E-field signals and the one or more H-field signals can be isolated from each other by combining the output signals from the various ports. Each multi-port antenna can also be configured such that each port has a nominally cardioid beam pattern in all planes containing a common axis of symmetry about the cardioid beam pattern. Nearly ideal cardioid beam patterns are generated by adding and subtracting weighted versions of the isolated E-field and H-field signals.

If needed in particular applications, the estimator may also be configured to isolate particular signals of interest from other extraneous signals and noise. FIG. 1B is a block diagram similar to FIG. 1A but that explicitly shows an isolator element.

In some applications, the isolator function can be configured at the time of manufacturing to address well known signals in the intended application. In other applications it is advantageous to allow a user to specify parameters that identify one set of characteristics that represent the desired signal and another set of characteristics that represent interference that should be rejected. Similarly, in some applications, the estimator can be configured to output specific items such as AoA or range or polarization outputs. In other applications it is advantageous to allow a user to define the items they want the system to output. To address this variety of needs, FIG. 1A and FIG. 1B show a user input path that sometimes may not be used, but other times may be used for defining parameters for a set of one or more SoI, or may be used to define a set of outputs needed, or may be used to define system states or configurations such as power-on, power-off, sleep, idle, etc. or orientations and locations of different ports in the antenna circuit, or the orientation of the system relative to something else, such as the orientation relative to the earth, or the orientation relative to the vehicle carrying the DF system.

As shown in FIG. 1B, a DF system is disclosed for determining the AoA, polarization, and range to the emitter of a signal that:
  (1) contains or receives user data that includes items such as: (a) SoI-isolation-metrics that can be used to isolate the SoI, such as one or more of: the center frequency, bandwidth, modulation characteristics, occurrence timing, polarization, field strength, stability of field strength, constraints on the range of potential angles of arrival, and known multipath geometries; (b) a list specifying one or more desired outputs; (c) the antenna-system's port configuration; and (d) the time and date and pose (position and orientation, e.g., x-, y-, z-position and roll, pitch, yaw orientation) of a reference position on the DF system relative to an earth coordinate system; and
  (2) is comprised of:
    (a) an antenna-system 101, with an output for each antenna element port, and which includes one or more PxMA elements where the PxMA element is a pair of conductive surfaces offset from one another comprised of a first conductive surface and a second conductive surface with one or more pairs of ports, or port-pairs, wherein each port-pair has a first port and a second port, and wherein each port is formed by a connection to the two conductive surfaces, and wherein each port-pair forms a loop going from the first terminal of the first port, through the first conductive surface to the first terminal of the second port, through the second port to the second terminal of the second port, and through the second conductive surface to the second terminal of the first port, and through the first port back to the first terminal of the first port to complete the loop, and wherein when there is both a first port-pair and a second port-pair, the port-pairs are orthogonal to one another such that a construction line going between the first port-pair and a construction line going through the second port pair are at 90 degrees to each other, and;
    (b) an isolation element 102 that (i) receives the antenna-system outputs, (ii) isolates the SoI on each port based on the SoI-isolation-metrics in the user data, and (iii) has an output with the isolated SoI corresponding to each antenna-system output; and
    (c) an estimator element 103 that (i) receives the isolated SoI for each of the antenna-system ports from the isolation element, and (ii) estimates and outputs the list of desired outputs specified in the user data.

The list specifying desired outputs generally includes for each particular SoI, one or more items such as: the coordinate system, the RF emitter sensing system's pose (position & orientation) at the time of measurement of the SoI level, time and date, which angles to output (e.g. azimuth, elevation, or both), desired azimuth angle accuracy and confidence level, achieved azimuth angle accuracy and confidence level, desired elevation angle accuracy and confidence level, achieved elevation angle accuracy and confidence level, maximum processing time allowed, processing time used, time periods used to integrate the SoI energy, SoI polarization, center frequency, modulation type, peak-to-average ratio, variance, times to a number of the highest peaks, frequency-versus-time profile, power-versus-time profile, rms power, etc.

The antenna-system's port configuration includes items associated with each port, such as the position and beam pattern (including one or more of magnitude, polarization, group-delay, impulse-response, and transfer-function as a function of angles) relative to a reference position/orientation on the RF emitter sensing system.

The estimator element is configured to determine and output an angle-of-arrival (AoA) estimate of a signal-of-interest (SoI) in a manner that is unbiased to homogeneous noise in the environment, and to its own system noise including the low noise amplifiers (LNA) in its front end.

The estimator element is also configured to mitigate finite tolerances in antenna element dimensions and termination network impedances and losses. The disclosed mitigation method enhances the RF emitter sensing device's accuracy by making it immune to manufacturing tolerances.

The antenna system, in some embodiments, is configured to use shadowing on all or some of the sensor elements. Any antenna element that is made small enough, can fit within a small/short shadow behind a small reflective or absorptive barrier. Operation in this shadow region allows reduced sensitivity to particular wave fronts, such as a skywave, while retaining sensitivity to other wavefronts, such as a ground-wave. This modified sensitivity enhances the performance of the RF emitter sensing system in some applications, such as finding the AoA of near vertical incidence skywave (NVIS) signals. DPA, QPA, HPA, and DHPA elements are particularly suitable to operate in a shadowed mode since they remain directional even at extremely small size.

In other words, the invention discloses the an RF emitter sensing device including an antenna circuit and an estimator configured to output, for one or more incoming signal-of-interest (SoI), either or both of an estimated range to the emitter of each SoI, and estimates for one or more angles corresponding to the 3D angle-of-arrival (AoA) of each SoI, wherein the antenna circuit has a plurality of ports that each output an output signal containing the one or more SoI, the antenna circuit including one or more multi-port antennas, each multi-port antenna having two or more ports, each multi-port antenna being configured to pick up a combination of one or more E-field signals and one or more H-field signals from each SoI, in a common volume of space; and the estimator element is configured to output either or both of an estimated range to the emitter of each SoI, and estimates for one or more angles corresponding to the AoA of each SoI by receiving the output signals from the antenna circuit, and generating either or both of an estimated range to the emitter of each SoI, and estimates for one or more angles corresponding to the AoA of each SoI.

The invention also discloses the above RF emitter sensing device wherein each multi-port antenna is also (a) configured such that each port has a nominally cardioid beam pattern in all planes containing a common axis of symmetry about the cardioid beam pattern, or (b) configured such that the one or more E-field signals and the one or more H-field signals can be isolated from each other by combining the output signals, or (c) configured to pick up a combination of one or more E-field signals and one or more H-field signals from an SoI, such that, an output port on a first-half of a multiport antenna picks up a sum of an E-field signal and H field signal, creating a sum signal, while an output port on an other-half of the multiport antenna picks up a difference between an E-field signal and an H-field signal, creating a difference signal, wherein, the first-half of the multiport antenna is the half of the antenna that the SoI arrives at first, according to the Poynting vector, and the other-half of the multiport antenna is the half that is not the first half.

The invention also discloses the above RF emitter sensing device wherein the estimator circuit is also configured to mitigate extraneous signals and isolate one or more desired SoI from the antenna circuit's output signals.

The invention also discloses the above RF emitter sensing device also receiving or having access to user data that includes SoI isolation parameters or characteristics corresponding to one or more user-desired SoI wherein, the estimator element is configured to isolate the one or more user-desired SoI from other extraneous signals according to the SoI-isolation-parameters. Examples of SoI-isolation-parameters for an SoI include time intervals, time intervals when the SoI is known or likely to be active, time intervals when the SoI is known or likely to be inactive, time-frequency profile intervals, field strength range, center frequency, bandwidth, modulation characteristics, occurrence timing, repetition rate, polarization, stability of field strength, constraints on a range of potential angles of arrival, and multipath geometries.

The invention also discloses the above RF emitter sensing device wherein receiving or having access to user data including a list of desired outputs associated with an incoming signal, wherein: the list of desired outputs including either or both of an estimated range to the emitter of each SoI, and estimates for one or more angles corresponding to the Poynting vector of each SoI and may also include other metrics associated with each SoI such as: the antenna element locations used, the distance between the antenna locations used, the field strength, the pose of the RF emitter sensing device relative to some other coordinate system at the time the antenna outputs were measured, the time periods the antenna outputs were used, the desired accuracy, the desired confidence level, the achieved accuracy, the achieved confidence level, the maximum processing time allowed, the processing time used, the polarization of the SoI, the center frequency the SoI, the type of modulation on the SoI, the pulse repetition rate of the SoI if the SoI is pulsed, the peak-to-average ratio of the SoI over the period used, the variance in the SoI energy over the period used, a number Pm, representing the maximum peak level that occurred in the SoI during the time period used, a number Pr representing a level range factor, a number Npc that is the count of signal peaks that were within the range of Pm and Pm*Pr that occurred during the processing of the SoI, wherein Npc is governed by the user specifying Pr, or Pr is governed by the user specifying Npc, the time that each of the Npc peaks occurred, the frequency versus time profile of the SoI over the period used, the power versus time profile of the SoI over the period used, wherein the power units are specified, such as being an rms, average, quasi-peak, peak, etc., one or more trigger signals, each indicating that a specific event occurred, and the time of occurrence of a specific event, wherein specific events are specified, such as the occurrence of or end of a time-frequency-power profile, and the estimator element is configured to generate and output the list of desired outputs The invention also discloses the above RF emitter sensing device also receiving or having access to user data t that includes orientation information including one or more of: a definition for a local coordinate system on the RF emitter sensing device that includes a system reference position on the RF emitter sensing device; an antenna circuit configuration definition that includes locations, orientations, and beam patterns associated with each of the plurality of antenna ports relative to the local coordinate system on the RF emitter sensing device; and may also include other information such as time, date, and the pose of the local coordinate system on the RF emitter sensing device relative to another coordinate system, such as an earth coordinate system, or a ground or an air vehicle coordinate system; and wherein a beam pattern definition includes the response as a function of angle for one or more of: polarization-versus-frequency; group-delay; transfer function magnitude versus frequency; transfer function phase versus frequency; and impulse response.

The invention also discloses the above RF emitter sensing device wherein the one or more multi-port antennas include a multiport antenna that is comprised of one or more conductive-surface-pairs, wherein, each conductive-surface-pair has a first conductive surface, a second conductive surface offset in an offset-direction from the first conductive surface, and one or more port-pairs, each port-pair including a first port and a second port; wherein each of the first and second port is formed by a connection to the first and second conductive surfaces, and wherein each of the one or more port-pairs forms a loop going from a first terminal of a corresponding first port, through the first conductive surface to a first terminal of a corresponding second port, through a termination load connected across the corresponding second port to a second terminal of the corresponding second port, and through the second conductive surface to a second terminal of the corresponding first port, and through a termination load connected across the corresponding first port, back to the first terminal of the corresponding first port to complete the loop, and an output for each port; and wherein the different conductive-surface-pairs have different offset-directions; and wherein the loops associated with the port-pairs share a nominally common center point. The invention discloses the above RF emitter sensing device wherein all specific embodiments of the preceding multiport antenna are permissible, including a multiport antenna with one conductive surface pair wherein the surface pair attaches to one port-pair, or two port-pairs, or two port-pairs wherein there is an aiming axis associated with each port-pair, lying in the plane of the loop formed by each port-pair, that extends between each port-pair such that it intersects the center point between the terminals of the first port, and the center point between the terminals of the second port, wherein there is a polarization axis orthogonal to the aiming axis and lying in the plane of the loop formed by each port-pair, wherein the two port-pairs are oriented such that: their aiming axes are nominally orthogonal to each other, their polarization axes are nominally aligned to each other, and their loops nominally share the same center point.

Similarly, the invention discloses the above RF emitter sensing device wherein the above multiport antenna has three conductive surface-pairs wherein each surface-pair attaches to one port-pair, wherein each conductive-surface-pair has an offset direction and port-pair placement such that the aiming axes of the three port-pairs are nominally orthogonal to each other and the polarization axes of the three port-pairs are nominally orthogonal to each other, and the loops formed by the three port-pairs nominally share the same center point.

Similarly, the invention discloses the above RF emitter sensing device wherein the above multiport antenna has three conductive surface-pairs wherein each surface-pair attaches to two port-pairs, wherein each conductive-surface-pair has an offset direction and port-pair placement such that the aiming axes of the the two port-pairs on each surface pair are nominally orthogonal to each other and the polarization axes are aligned, while the polarization axes of the ports on any conductive surface pair is orthogonal to the polarization axis of the ports on the other conductive surface pairs, and the loops formed by all the port-pairs nominally share the same center point.

The invention also discloses the above RF emitter sensing device wherein the estimator element is configured to output either or both of an estimated range to the emitter of the incoming signal, and estimates for one or more angles corresponding to the AoA of the incoming signal by also computing the estimated range and/or one or more angle estimates based on a computation that is a function of the received output signals from the antenna circuit.

The invention also discloses the above RF emitter sensing device wherein the estimator element is configured to output either or both of an estimated range to the emitter of an SoI, and estimates for one or more angles corresponding to the AoA of an SoI by also computing the estimated range and/or one or more angle estimates based on a computation that is a function of: the received output signals from the antenna circuit, and a set of one or more baseline values determined with one or more known SoI, with each of the one or more known SoI at one or more known positions including one or more of a range and one or more angles.

The invention also discloses the above RF emitter sensing device wherein the estimator element is configured to output either or both of an estimated range to the emitter of an SoI, and estimates for one or more angles corresponding to the AoA of an SoI by also: computing the estimated range and/or one or more angle estimates based on a computation that is a function of: the received output signals from the antenna circuit, and a set of one or more baseline values determined with one or more known SoI, with each of the one or more known SoI at one or more known positions including one or more of a range and one or more angles. The invention also discloses the preceding RF emitter sensing device wherein the baseline values are stored.

The invention also discloses the above RF emitter sensing device wherein the estimator element is configured to output either or both of an estimated range to the emitter of an SoI, and estimates for one or more angles corresponding to the AoA of an SoI by also, computing the estimated range and/or one or more angle estimates based on a computation that is a function that uses the received SoI from the antenna circuit output signals, wherein the function includes: computing a set of weighted sums, where each weighted sum is a sum of weighted versions of the SoI from two or more output signals received from two or more ports of the antenna circuit, and wherein the weights can be positive, negative, or complex.

The invention also discloses the above RF emitter sensing device wherein the estimator element is configured to output either or both of an estimated range to the emitter of an SoI, and estimates for one or more angles corresponding to the AoA of an SoI by also: computing the estimated range and/or one or more angle estimates based on a computation that is a function that uses the received output signals from the antenna circuit, wherein the function is configured to mitigate estimation bias caused by one or more of: receiver noise, noise picked up by the antennas, noise picked up by antennas that is uncorrelated between different ports, sensitivity imbalance in the E and H fields picked up by a port, the magnitude of an SoI, modulation of the SoI, effects of non-ideal termination impedances attached to the antenna ports, and the effects of objects causing reflections into the antenna circuit or blockages to the antenna circuit.

The invention also discloses the above RF emitter sensing device wherein the estimator element is configured to output either or both of an estimated range to the emitter of an SoI, and estimates for one or more angles corresponding to the AoA of an SoI by also, computing the estimated range and/or one or more angle estimates based on a computation that is a function that uses the received SoI from the antenna circuit output signals, wherein the function is configured to mitigate estimation bias caused by one or more of: receiver noise, noise picked up by the antennas, noise picked up by antennas that is uncorrelated between different ports, sensitivity imbalance in the E and H fields picked up by a port, the magnitude of an SoI, modulation of the SoI, effects of non-ideal termination impedances attached to the antenna ports, and the effects of objects causing reflections into the antenna circuit or blockages to the antenna circuit, by estimating an angle of arrival from an (i,j) pair of port-pairs, where the function uses arguments including one or more ratios, $A_i/B_i$, $A_j/B_j$, and $B_i/B_j$, and where the function may include trigonometric functions, lookup table based functions, and functions based on measurements of SoI at known angles, where the trigonometric functions include functions such as inverse sine, inverse cosine, inverse tangent and four quadrant arctangent functions, such as the Fortran a tan 2(y,x) function, wherein: the terms, $A_i$, $B_i$, $A_j$, $B_j$, are either:

$A_i=P_{1,i}-P_{2,i}$, $B_i=P_{1,i}+P_{2,i}$, $A_j=P_{1,j}-P_{2,j}$, $B_j=P_{1,j}+P_{2,j}$, or $A_i=P_{1,i}'-P_{2,i}'$, $B_i=P=P_{1,i}'+P_{2,i}'$, $A_j=P_{1,j}'-P_{2,j}'$, $B_j=P_{1,j}'+P_{2,j}'$, and where i and j are indexes, each of which represents a particular port-pair, where each takes on an integer value from 1 to N, and N is the number of port-pairs in the antenna circuit, and the (i,j) pair of port-pairs is a set of ports comprised of the $i^{th}$ port-pair and a $j^{th}$ port pair, wherein, j is not equal to i, the ports in both port-pairs share the same polarization, the patterns of the first port and the second port in each of the port-pairs are aimed in opposite directions defining an aiming axis, the aiming axis of the $i^{th}$ port-pair is orthogonal to that of the $j^{th}$ port-pair, and wherein $P_{1,i}'$ is an initial SoI amplitude derived from the first port of the $i^{th}$ port-pair, and similarly $P_{1,j}'$ is an initial SoI amplitude derived from the first port of the $j^{th}$ port-pair, and wherein $P_{2,i}'$, is an initial SoI amplitude derived from the second port of the $i^{th}$ port-pair, and similarly $P_{2,j}'$ is an initial SoI amplitude derived from the second port of the $j^{th}$ port-pair, and wherein a set of weighted sums is comprised of, a first quantity, $P_{1,i}$ which is a corrected amplitude for the SoI at the first port of the $i^{th}$ port-pair, and a second quantity $P_{2,i}$, which is a corrected amplitude for the SoI at the second port of the $i^{th}$ port-pair, and wherein the set of weighted sums is created as: $P_{1,i}=(a_i+1)P_{1,i}'+(a_i-1)P_{2,i}'$, and $P_{2,i}=c_i[(b_i+1)P_{2,i}'+(b_i-1)P_{1,i}']$ where: the weights in the weighted sum are $(a_i+1)$, $(a_i-1)$, $(b_i+1)$, and $(b_i-1)$, and where $a_i$ and $b_i$ are chosen such that, for the SoI, the beam pattern of $P_{1,i}$ is cardioid with a single deep null in a first direction, the beam pattern of $P_{2,i}$ is cardioid with a single deep null in a second direction, wherein the first direction and second direction are nominally 180 degrees from each other, and $c_i$ is chosen such that the peaks of the main lobes of $P_{1,i}$ and $P_{2,i}$ are equal.

The invention also discloses the above RF emitter sensing device wherein the estimator element is configured to output either or both of an estimated range to the emitter of an SoI, and estimates for one or more angles corresponding to the AoA of an SoI by also, computing the estimated range and/or one or more angle estimates based on a computation that is a function that uses the received SoI from the antenna circuit output signals, wherein the function is configured to mitigate estimation bias caused by one or more of: receiver noise, noise picked up by the antennas, noise picked up by antennas that is uncorrelated between different ports, sensitivity imbalance in the E and H fields picked up by a port, the magnitude of an SoI, modulation of the SoI, effects of non-ideal termination impedances attached to the antenna ports, and the effects of objects causing reflections into the antenna circuit or blockages to the antenna circuit, by estimating an angle of arrival from an (i,j) pair of port-pairs, where the function uses arguments including one or more of $A_i(B_i-\xi_{i,j})$, $A_j(B_j-\xi_{i,j})$, and $(B_i-\xi_{i,j})/(B_j-\xi_{i,j})$, and where the function may include trigonometric functions, lookup table based functions, and functions based on measurements of SoI at known angles, where the trigonometric functions include functions such as inverse sine, inverse cosine, inverse tangent and four quadrant arctangent functions, such as the Fortran a tan 2(y,x) function, wherein: the terms, $A_i$, $B_i$, $A_j$, $B_j$, are either: $A_i=P_{1,i}-P_{2,i}$, $B_i=P_{1,i}+P_{2,i}$, $A_j=P_{1,j} P_{2,j}$, $B_j=P_{1,j}+P_{2,j}$, or $A_i=P_{1,i}'-P_{2,i}'$, $B_i=P=P_{1,i}'+P_{2,i}'$, $A_j=P_{1,j}'-P_{2,j}'$, $B_j=P_{1,j}'+P_{2,j}'$, and where i and j are indexes, each of which represents a particular port-pair, where each takes on an integer value from 1 to N, and N is the number of port-pairs in the antenna circuit, and the (i,j) pair of port-pairs is a set of ports comprised of the $i^{th}$ port-pair and a $j^{th}$ port pair, wherein, j is not equal to i, the ports in both port-pairs share the same polarization, the patterns of the first port and the second port in each of the port-pairs are aimed in opposite directions defining an aiming axis, the aiming axis of the $i^{th}$ port-pair is orthogonal to that of the $j^{th}$ port-pair, and wherein $P_{1,i}'$ is an initial SoI amplitude derived from the first port of the $i^{th}$ port-pair, and similarly $P_{1,j}'$ is an initial SoI amplitude derived from the first port of the $j^{th}$ port-pair, and wherein $P_{2,i}'$ is an initial SoI amplitude derived from the second port of the $i^{th}$ port-pair, and similarly $P_{2,j}'$ is an initial SoI amplitude derived from the second port of the $j^{th}$ port-pair, and wherein a set of weighted sums is comprised of, a first quantity, $P_{1,i}$ which is a corrected amplitude for the SoI at the first port of the $i^{th}$ port-pair, and a second quantity $P_{2,i}$, which is a corrected amplitude for the SoI at the second port of the $i^{th}$ port-pair, and wherein the set of weighted sums is created as: $P_{1,i}=(a_i+1)P_{1,i}'+(a_i-1)P_{2,i}'$, and $P_{2,i}=c_i[(b_i+1)P_{2,i}'+(b_i-1)P_{1,i}']$ where: the weights in the weighted sum are $(a_i+1)$, $(a_i-1)$, $(b_i+1)$, and $(b_i-1)$, and where $a_i$ and $b_i$ are chosen such that, for the SoI, the beam pattern of $P_{1,i}$ is cardioid with its single deep null in a first direction, and the beam pattern of $P_{2,i}$ is cardioid with its single deep null in a second direction, and the first direction and second direction are nominally 180 degrees from each other, and $c_i$ is chosen such that the peaks of the main lobes of $P_{1,i}$ and $P_{2,i}$ are equal, and the factor to mitigate homogeneous noise, $\xi_{i,j}$, can be computed by functions including:

$$\xi_{i,j} = \Phi(A_i, B_i, A_j, B_j) = \text{Re}\left[\frac{B_i}{2} + \frac{B_j}{2} - \sqrt{\frac{F}{6} + \frac{H}{4} + \frac{I}{144}} - \sqrt{\frac{F}{3} - \frac{H}{4} - \frac{I}{144} - \frac{3E}{\sqrt{I+36H+24F}}}\right]$$

wherein $E = A_i^2 B_i - A_j^2 B_i - A_i^2 B_j + A_j^2 B_j$, $F = A_i^2 + B_i^2/2 - B_i B_j + A_j^2 + B_j^2/2$, $G = (B_i - B_j)^2(4A_i^2 - B_i^2 + 2B_i B_j + 4A_j^2 - B_j^2)$, $$H = \sqrt[3]{\sqrt{3(432E^4 - 64E^2 F^3 + G(16F^4 - 144E^2 F) + 8F^2 G^2 + G^3)}/72 + E^2/2 - F^3/27 + G(2B_i B_j - 2A_i^2 - B_i^2 - 2A_j^2 - B_j^2)/24},$$

and $$I = \begin{cases} (4F^2 - 3G)/H & \text{if } H \neq 0 \\ 0 & \text{if } H = 0 \end{cases}.$$

The invention also discloses the above RF emitter sensing device wherein the estimator element is configured to output either or both of an estimated range to the emitter of an SoI, and estimates for one or more angles corresponding to the AoA of an SoI by also: computing the estimated range and/or one or more angle estimates based on a computation that is a function that uses the received output signals from the antenna circuit, wherein the function is configured to mitigate estimation bias caused by receiver noise and noise picked up by the antennas, by coherently deriving the amplitude of the SoI on each port, by correlating the signal from each port in a port pair, over a time period which may be continuous or discontinuous, with a signal that is a combination of the signals from one or more ports that do not include the ports in the port-pair, where the combination of signals includes, selecting one or more porta and summing their signals, selecting one or more ports and weighting and summing their signals, selecting the port with the largest signal from among the available ports and using its signal, and using maximum ratio combining (MRC) to weight and sum the signals from two or more of the ports.

The invention also discloses the above RF emitter sensing device wherein the estimator means is configured to output either or both of an estimated range to the emitter of an SoI, and estimates for one or more angles corresponding to the AoA of an SoI by also using one or more of: one or more magnitudes from one or more combinations of the output signals from among the different ports of the antenna circuit, and one or more phases from one or more combinations of the output signals from among the different ports of the antenna circuit. The invention also discloses the preceding RF emitter sensing device wherein the above weights applied to the one or more combinations are stored. The invention also discloses the preceding RF emitter sensing device wherein the one or more combinations of output signals includes combinations that isolate the E-field of the SoI and that isolate the H-field of the SoI.

The invention also discloses the above RF emitter sensing device wherein the antenna circuit is configured to pick up signals at a more than one location or orientation, and the one or more locations or orientations are made with one or more of a sequential configuration and a simultaneous configuration; wherein, in the sequential configuration, ports are in respective initial locations and orientations at an initial time, and ports are in a respective next location and orientation at a next time that is later than the initial time, and wherein the estimator uses the output signals received at different times.

The invention also discloses an RF emitter sensing device comprising an antenna circuit, an isolation element, and an estimator element configured to output, for one or more incoming signal-of-interest (SoI), either or both of an estimated range to the emitter of each SoI, and estimates for one or more angles corresponding to the angle-of-arrival (AoA) of each SoI, wherein: the antenna circuit has a plurality of ports that each output an output signal containing the one or more SoI, the antenna circuit including one or more multi-port antennas, each multi-port antenna having two or more ports, each multi-port antenna being configured to pick up a combination of one or more E-field signals and one or more H-field signals from each SoI, in a common volume of space, such that the one or more E-field signals and the one or more H-field signals can be isolated from each other by combining the output signals; and the isolation element is configured to output one or more isolated SoI outputs, for each respective port by receiving the output signals from each output port of the antenna circuit, and isolating in each respective port, one or more SoI from other extraneous signals; and the estimator element is configured to output either or both of an estimated range to the emitter of each SoI, and estimates for one or more angles corresponding to the AoA of each SoI by: receiving the output signals from the isolation element, and generating either or both of an estimated range to the emitter of each SoI, and estimates for one or more angles corresponding to the AoA of each SoI.

The invention also discloses the preceding RF emitter sensing device wherein the estimator element is configured to output either or both of an estimated range to the emitter of an SoI, and estimates for one or more angles corresponding to the AoA of an SoI by also: computing, for each SoI, a set of measured values based on the one or more isolated SoI outputs from the isolation element, comparing, for each SoI, the set of measured values with a plurality of sets of calibration values, where the plurality of sets of calibration values is comprised of sets of values determined with the SoI emitter at a known, one or more of, location, AoA, and range.

The invention also discloses the preceding RF emitter sensing device wherein the one or more multi-port antennas include a multiport antenna that is comprised of one or more conductive-surface-pairs, wherein, each conductive-surface-pair has a first conductive surface, a second conductive surface offset in an offset-direction from the first conductive surface, and one or more port-pairs, each port-pair including a first port and a second port; wherein each of the first and second port is formed by a connection to the first and second conductive surfaces, and wherein each of the one or more port-pairs forms a loop going from a first terminal of a corresponding first port, through the first conductive surface to a first terminal of a corresponding second port, through a termination load connected across the corresponding second port to a second terminal of the corresponding second port, and through the second conductive surface to a second terminal of the corresponding first port, and through a termination load connected across the corresponding first port, back to the first terminal of the corresponding first port to complete the loop, and an output for each port; and different conductive-surface-pairs have different offset-directions and the loops associated with the port-pairs share a nominally common center point.

The invention also discloses the above RF emitter sensing devices wherein the antenna circuit is configured such that the ports, including those from one or more multiport antennas, can be combined to provide three orthogonal E-field terms and three orthogonal H-field terms (e.g. $E_X$, $E_Y$, $E_Z$ and $H_X$, $H_Y$, $H_Z$), and the estimator is configured to estimate the three dimensional Poynting vector of each SoI from the antenna circuit's outputs and output the three dimensional AoA for each SoI.

The invention also discloses the preceding RF emitter sensing device also receiving or having access to user data that includes SoI-isolation-parameters corresponding to each SoI wherein, the isolation element is configured to isolate the one or more SoI from other extraneous signals according to the SoI-isolation-parameters. The invention also discloses the preceding RF emitter sensing device wherein the SoI-isolation-parameters include one or more of, time intervals when the SoI is known or likely to be active, time intervals when the SoI is known or likely to be inactive, field strength range, center frequency, bandwidth, modulation characteristics, occurrence timing, repetition rate, polarization, field strength range, stability of field strength, constraints on a range of potential angles of arrival, and multipath geometries.

The invention also discloses the preceding RF emitter sensing device wherein the estimator element is configured to output either or both of an estimated range to the emitter of an SoI, and estimates for one or more angles corresponding to the AoA of an SoI by also computing the estimated range and/or one or more angle estimates based on a computation that is a function of the received output signals from the antenna circuit, and a set of one or more baseline values determined with one or more known SoI, with each of the one or more known SoI at one or more known positions including one or more of a range and one or more angles. The invention also discloses the preceding RF emitter sensing device wherein the baseline values are stored.

BRIEF DESCRIPTION OF THE DRAWINGS

The accompanying figures, where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

Figure 1A:
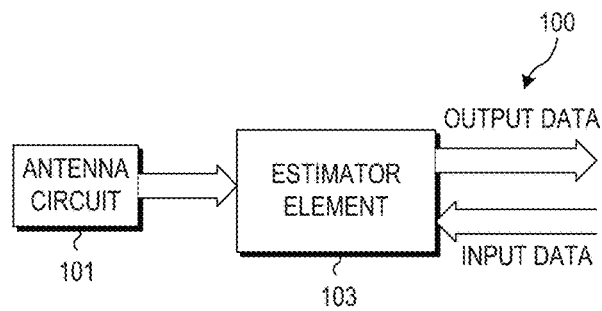
FIG. 1A is a block diagram of an RF emitter sensing system.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, may be supported with integrated circuits (ICs), RF amplifiers, RF switches, mixers, analog-to-digital converters, digital-to-analog converters, direct digital synthesis (DDS) ICs, phase locked loop (PLL) and voltage controlled oscillator (VCO) ICs, microcontrollers, microprocessors, field programmable logic array (FPGA) ICs, digital signal processing (DSP) ICs, dynamic random access memory (DRAM) devices, static random access memory (SRAM) devices, or the like. In particular, they may be implemented using semiconductor processes and transistors such as FET, (including HFET, HEMT, E-PHEMT, PHEMT, MESFET, JFET, MOSFET, CMOS, etc.), BJT (including HBT, etc), and BiCMOS. It is expected that one of ordinary skill, notwithstanding possibly significant effort and many design choices motivated by, for example, available time, current technology, and economic considerations, when guided by the concepts and principles disclosed herein will be readily capable of generating the required circuitry with minimal experimentation. Therefore, in the interest of brevity and minimization of any risk of obscuring the principles and concepts according to the present invention, further discussion of such ICs will be limited to the essentials with respect to the principles and concepts used by the exemplary embodiments.

Overview

Disclosed is an ultra miniature RF emitter sensing device that does passive ranging and provides EM wave properties such as the Angle-of-Arrival (AoA) and polarization. It uses (1) an antenna system that includes unique miniature space-saving multi-port $\vec{p}$ cross $\vec{m}$ antenna (PxMA) elements that maintain their $\vec{p}$ cross $\vec{m}$ high directivity at arbitrarily low frequencies, and (2) signal processing methods that operate on the antenna system's outputs such that they (a) enable self sensitivity calibration, (b) mitigate self noise, (c) mitigate homogeneous environmental noise, (d) mitigate multipath such as from sky-wave versus ground-wave paths and such as from nearby metal structures, and (e) enable accurate AoA, polarization, and range to emitter characterization of signals so weak that they are below the noise floor of, and cannot be received by, a standard receiver intended to receive and demodulate the signal of interest. The resulting RF emitter sensing device can be extremely small size suitable for portable applications. It also has lower complexity than previous systems attempting to offer a similar bandwidth and frequency band of operation. Disclosed are miniature space-saving 4-port, 6-port, and 12-port PxMA antennas that maintain their $\vec{p}$ cross $\vec{m}$ high directivity to arbitrarily low frequencies. The 12-port and 6-port antennas provide all six E and H field components. Most RF applications, including previous DF systems, use one or both of two constitutive antenna elements, the magnetic loop antenna element that is sensitive to the H-field, which is sometimes implemented as a slot antenna, and the electric dipole/monopole antenna element that is sensitive to the E-field. Previously combinations of these elements created "$\vec{p}$ cross $\vec{m}$ in a passband" antennas. The problem with these combined element antennas is that the termination impedances and sensitivities of the two elements are different and the network connecting them do not allow them to operate with high directivity to arbitrarily low frequency—thus their bandpass characteristic. There exists, however, a third constitutive element that has precisely collocated electric dipole and magnetic moments $\vec{p}$ and $\vec{m}$ respectively, and where the sensitivity to the E and H fields are inherently matched and where a simple resistive termination allows them to be highly directional (i.e. high front-to-back ratio) to arbitrarily low frequency—which means their direction finding ability at low frequencies does not degrade no matter how small this PxMA element is. Furthermore, the cardioid radiation pattern is rotationally symmetric about the axis of maximum radiation to arbitrarily low frequency. In other words, an E-plane cut and H-plane cut, or any cut going through the axis of maximum and minimum radiation, are identical. This symmetry property facilitates measuring a wave's polarization along with its angle-of-arrival. Disclosed is the use of this element, including disclosed miniature space-saving multi-port versions, in an RF emitter sensing system that includes disclosed signal processing methods allowing it to operate with high accuracy at low, for example HF (1-30 MHz) frequencies, yet be smaller and lighter than previously thought possible, such as being hand carried.

Definition of Antennas—PxMA, DPA

In 1971 Reference 9 (SSN-125), in equation 12.27 on page 150 described the properties that make an ideal $\vec{p}$ cross $\vec{m}$ antenna (PxMA), where $\vec{p}$ refers to the electric dipole moment and $\vec{m}$ refers to the magnetic dipole moment. It is a radiator that (a) has collocated magnetic and electric dipole moments $\vec{m}$ and $\vec{p}$ respectively, and (b) these moments are related in the late time (i.e. in the limit, at time goes to infinity) such that $\vec{m}=c\vec{p}$, where c is the speed of light. Reference 10 (SSN-243) states, An "ideal $\vec{p}$ cross $\vec{m}$ radiator has some unique features that are not found in other elemental radiators. They are summarized in part as follows: (a) Cardioid radiation pattern rotationally symmetric with the axis of maximum radiation. (b) Purely real power out flowing from any spherical surface enclosing the source region. (c) Twice the directivity of a purely electric or magnetic dipole." The "other elemental radiators" referred to in the above quote refer to the previously mentioned dipoles/monopoles for electric fields, and loops for magnetic fields. A key feature of the PxMA is that its "late time" cardioid behavior extends, in the limit, to infinite time. This fact means that in the frequency domain, its cardioid behavior is extremely wide bandwidth and extends, in the limit, to DC. By using it in a small RF emitter sensing system, an RF emitter sensing system can be constructed that is inherently broad band and works to arbitrarily low frequencies without any dependence on matching networks or tuning. Reference 9 through Reference 16 address the theory, properties, and example constructions of PxMA elements.

Figure 2A:
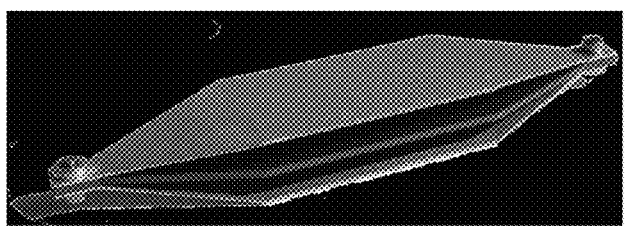
FIG. 2A is a picture of a transmission line version of a DPA.
Figure 2B:
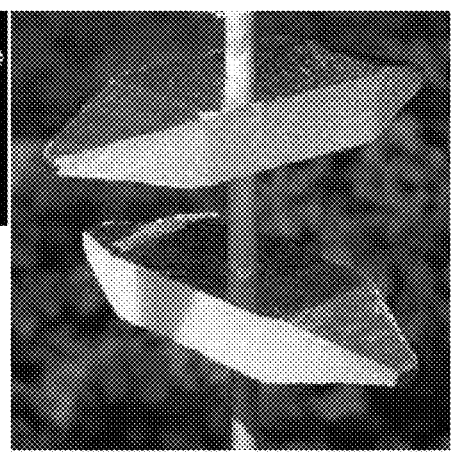
FIG. 2B is a picture showing an array of two transmission line version DPA antennas oriented at 90 degrees to each other according to a disclosed embodiment, where each antenna element is similar to the one shown in FIG. 3.
Figure 3:
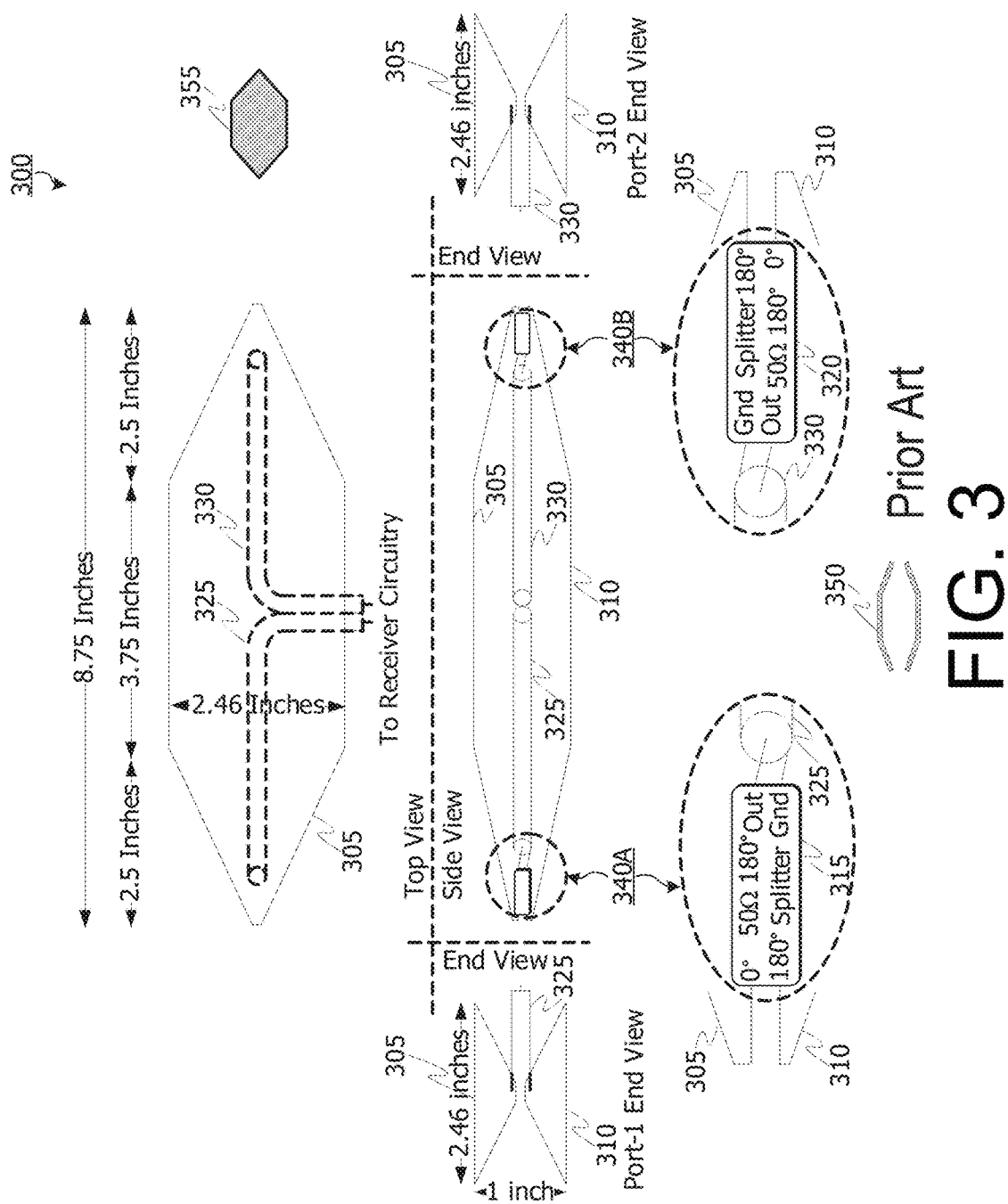
FIG. 3 is a mechanical drawing of a transmission line version DPA where the two ports share a common spatial aperture that produces opposite facing cardioid patterns from the two ports for use in the RF emitter sensing system according to a disclosed embodiment.

We will use the term "DPA" to refer to a dual-port $\vec{p}$ cross $\vec{m}$ antenna element that operates with high directivity to arbitrarily low frequency. In other words, a "DPA" is a PxMA with two ports, or a port-pair. Reference 11 (SSN-319) describes an embodiment of such a DPA where the cardioid patterns from the two ports are aimed opposite one another. In this case the antenna is made with two conductive surfaces oriented and shaped so they can be thought of as a transmission line. FIG. 2A is a picture of an embodiment of this DPA. FIG. 2B pictures a mockup of a pair of these DPAs oriented in orthogonal directions and sharing a common vertical polarization, where one DPA's port-pair aims north and south, and the other DPA's port-pair aims east and west. FIG. 3 is a mechanical drawing of the DPA pictured in FIG. 2A.

Figure 4:
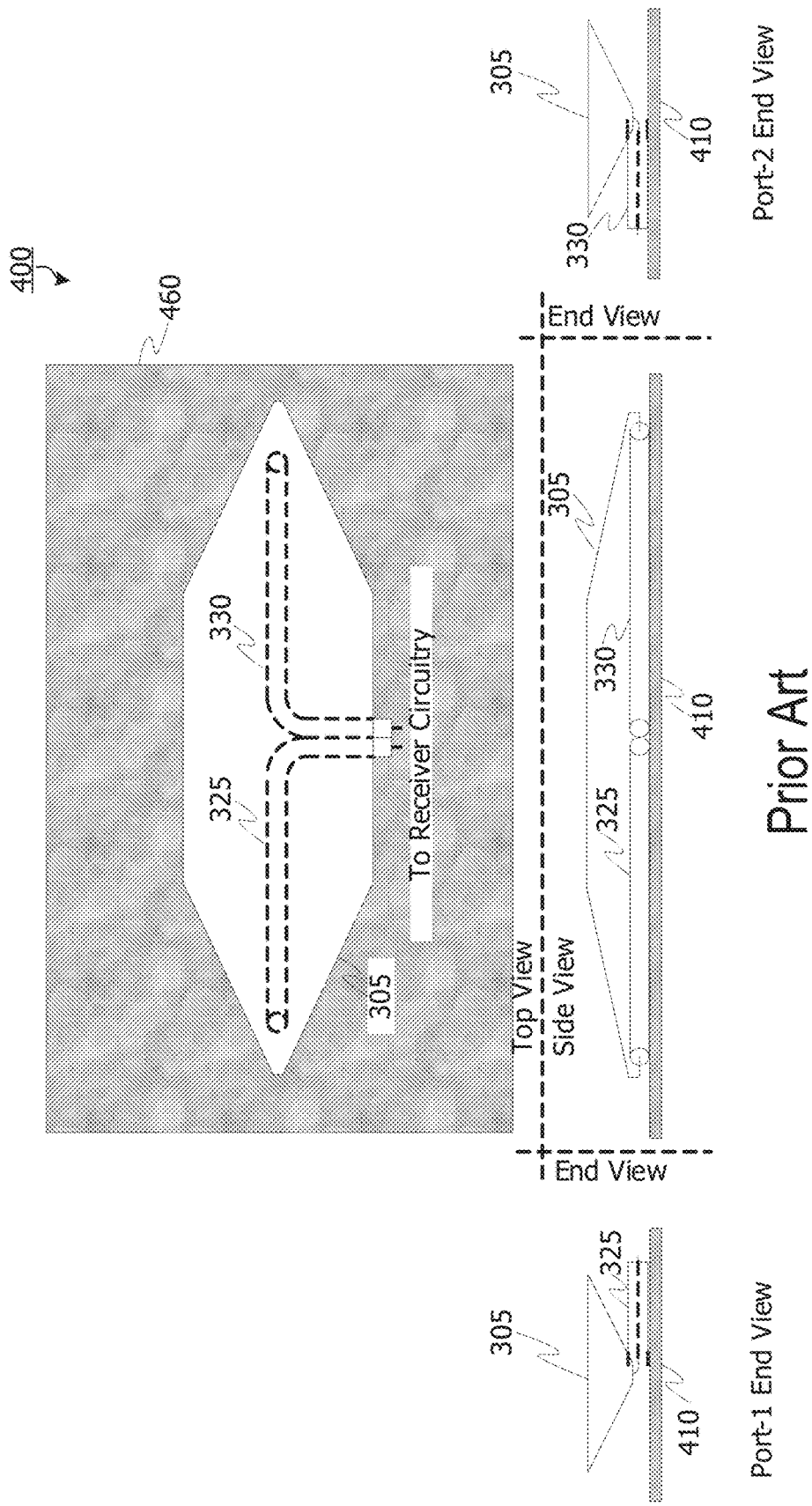
FIG. 4 is a mechanical drawing of a transmission line version DPA in an unbalanced configuration.
Figure 5:
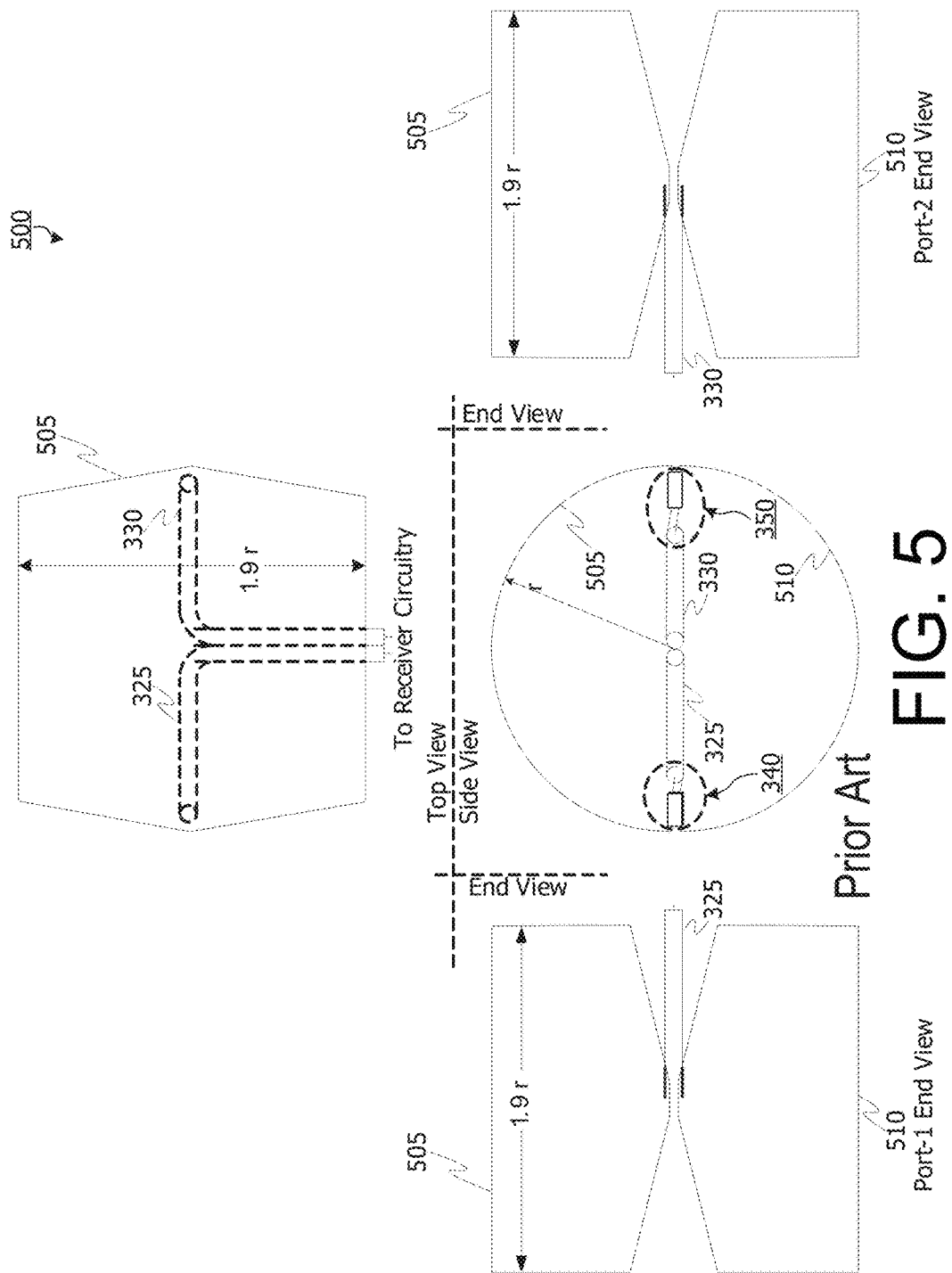
FIG. 5 is a mechanical drawing for a 100 ohm balanced cylindrical DPA.

FIGS. 2A, 2B, and 3 show the DPA in a balanced configuration. The antenna element can be described as a pair of conductive surfaces offset from one another with a pair of ports, where each port is formed by a connection to the two conductive surfaces such that a loop is formed going from the first terminal of the first port, through the first conductive surface to the first terminal of the second port, through the second port to the second terminal of the second port, and through the second conductive surface to the second terminal of the first port, and through the first port back to the first terminal of the first port to complete the loop. In FIG. 3, the pair of conductive surfaces are 305 and 310. In FIG. 4, the pair of conductive surfaces are 305 and 460. In FIG. 5, the pair of conductive surfaces are 505 and 510. The configuration of FIG. 3 is described in Reference 11. The configuration of FIG. 5 is described in Reference 15. The width of these configurations can be narrowed by making the port connections not on the edges of the conductive surfaces.

In FIG. 3 the conductive surfaces might be thought of as a transmission line with a top-wire 305 running left and right, and a bottom-wire 310 running left and right, where the ratio of separation between the wires and the width of the wires determine the transmission line impedance. When the width of both lines are the same, the transmission line is balanced. The plane between and parallel to the antenna's conductive plates (in other words, between the positive and negative terminals of the ports) is its ground-symmetry plane since the conductor above the symmetry plane the conductor below the symmetry plane are a mirror image of one another. Each end of the transmission line 340A and 340B is a balanced port. The dimensions given in FIG. 3 produce a 100 ohm balanced port that can be connected via a 100 ohm twinlead to a receiver. To use a standard unbalanced 50 ohm coaxial cable 325 and 330, the balanced port can be connected through a balun, (i.e. transformer or a splitter) 315 and 320 as is shown in FIG. 3. For example, in the 1-750 MHz range, a MinCircuits SBTCJ-1WX would be suitable to use for the baluns 315 and 320. The polarities on the baluns 315 and 320 are shown such that a vertically polarized wave coming into the side of the antenna produces a balanced differential signal on the two output coaxial cables 325 and 330. A vertically polarized wave arriving on the main beam axis at 340A couples to cable 325, but does not couple to cable 330, providing excellent back-to-front ratio. A wave coming straight down from the sky, polarized so that the E-field is aligned to the axis going through both antenna ports, couples to both output coaxial cables 325 and 330 as a common mode signal.

Figure 12:
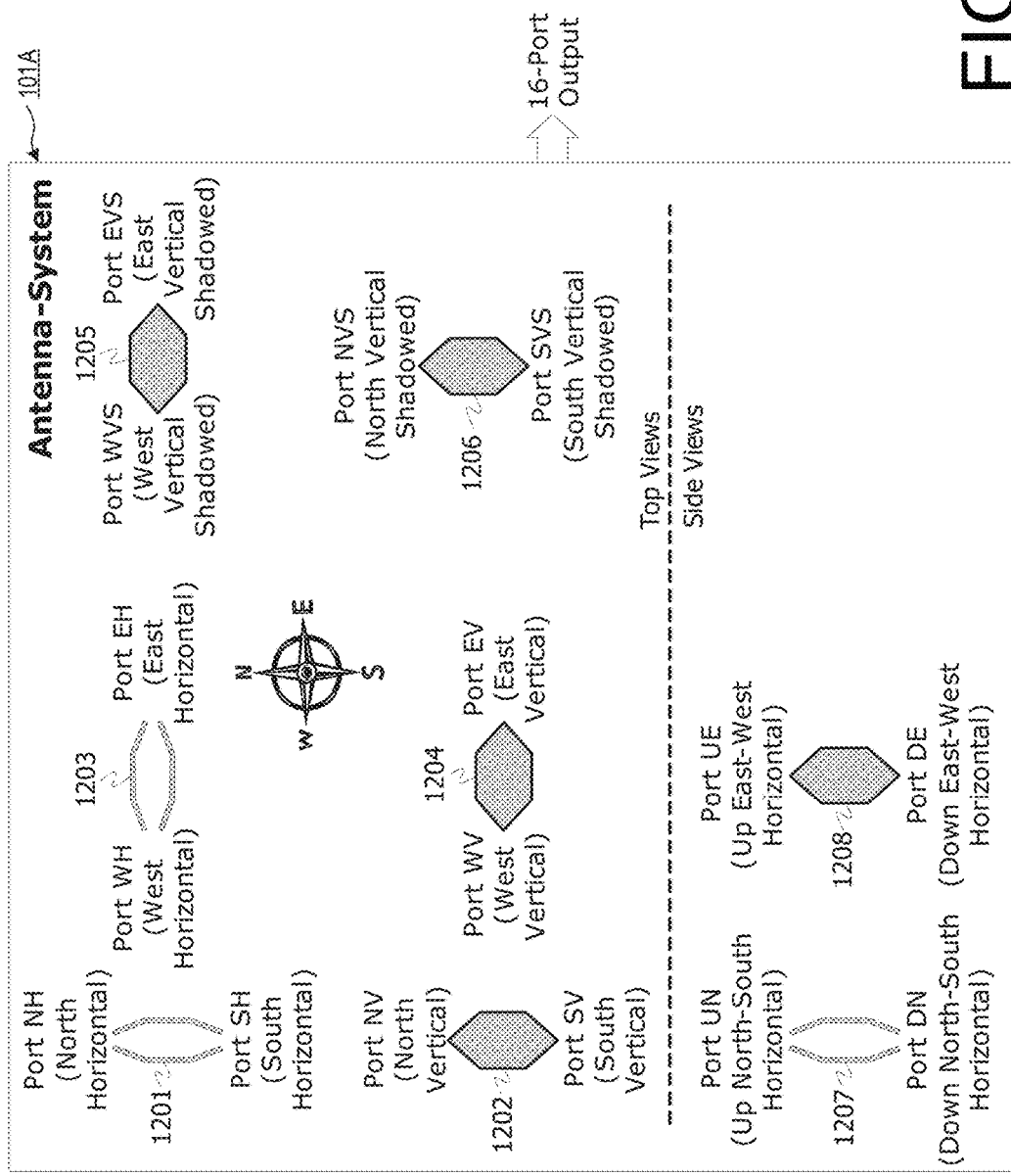
FIG. 12 shows an antenna-system with sixteen ports.
Figure 13:
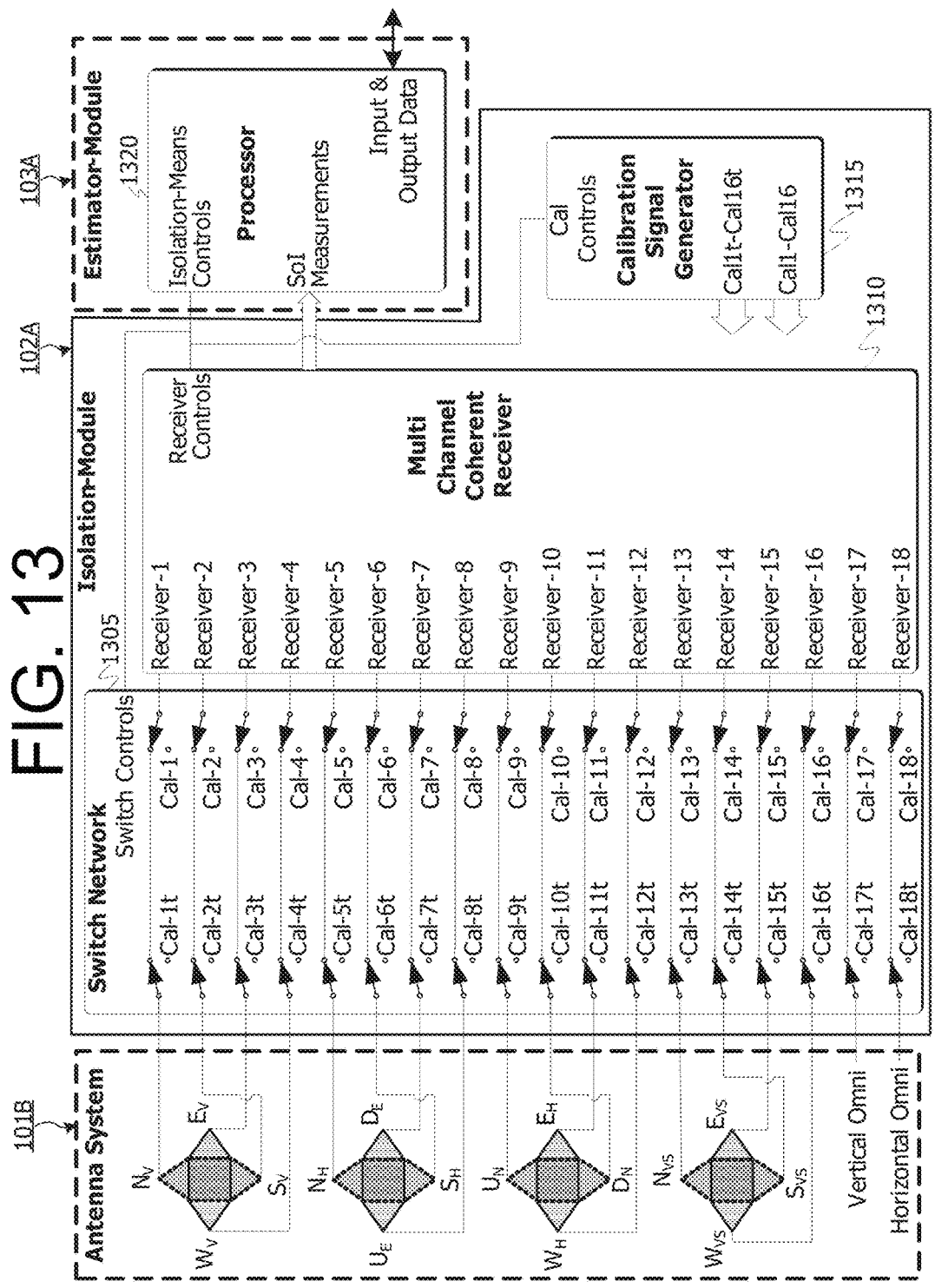
FIG. 13 shows an embodiment with an antenna-system comprised of 18 ports, an isolation element with 18 parallel channels, including a switch network and calibration signal generator that allow full system calibration as well as built-in test capability to confirm all wiring.
Figure 14:
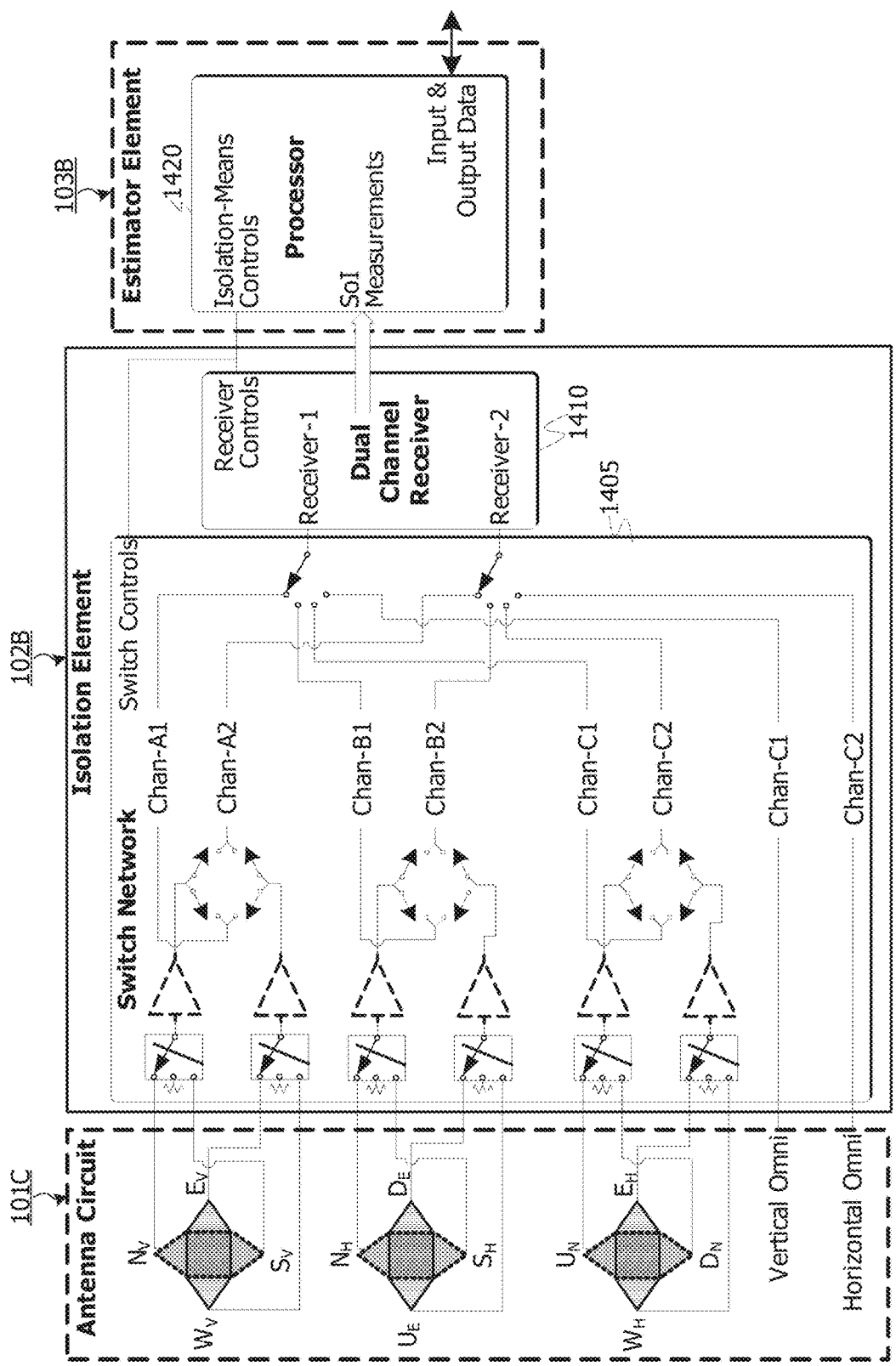
FIG. 14 shows a low-cost embodiment in which the antenna-system has 14 ports, the isolation element has only two coherent receivers and includes a switch network that allows any antenna to connect to either receiver and allows system calibration.

In FIG. 3, symbols 350 and 355 are used in schematics such as FIGS. 12, 13, and 14, to represent the two ports and the orientation of a particular antenna element port. The intent is for the symbols to convey the polarization and directionality of a particular physical element.

FIG. 4 is a mechanical drawing of this DPA in its unbalanced configuration. In this case the two conductive surfaces 305 and 460 are not the same size. The transmission line top-wire 305 running left and right, and a bottom-wire 460 running left and right, are not the same size. Conductive surface 460, due to its larger size, can be called a "ground-plane" and therefore the transmission line would be called unbalanced. This configuration is effectively one half (i.e. the top half) of the FIG. 3 configuration, where conductive surface 460 is in the position of the ground symmetry plane of the FIG. 3 configuration. The width of 460 should extend beyond 305 by about the height shown in FIG. 3. As before, the ports of the antenna are at the left and right ends of the transmission line, i.e. the edges of conductive surface 305. The dimensions given in FIG. 4 produce 50 ohm ports that can be connected to standard 50 ohm coaxial cables 325 and 330. These cables are typically terminated into a receiver that provides a 50 ohm match.

Any mismatch reflection off of the receiver will travel back through the antenna to the other antenna port, and thereby reduce the inherently excellent back-to-front ratio of the DPA element. If the receiver's complex reflection coefficient (e.g. S11) is known at any frequency of interest, and the cable 325, 330 electrical lengths and attenuation are known, then calibrations can be applied to restore the inherently excellent back-to-front ratio of the DPA element.

Figure 11:
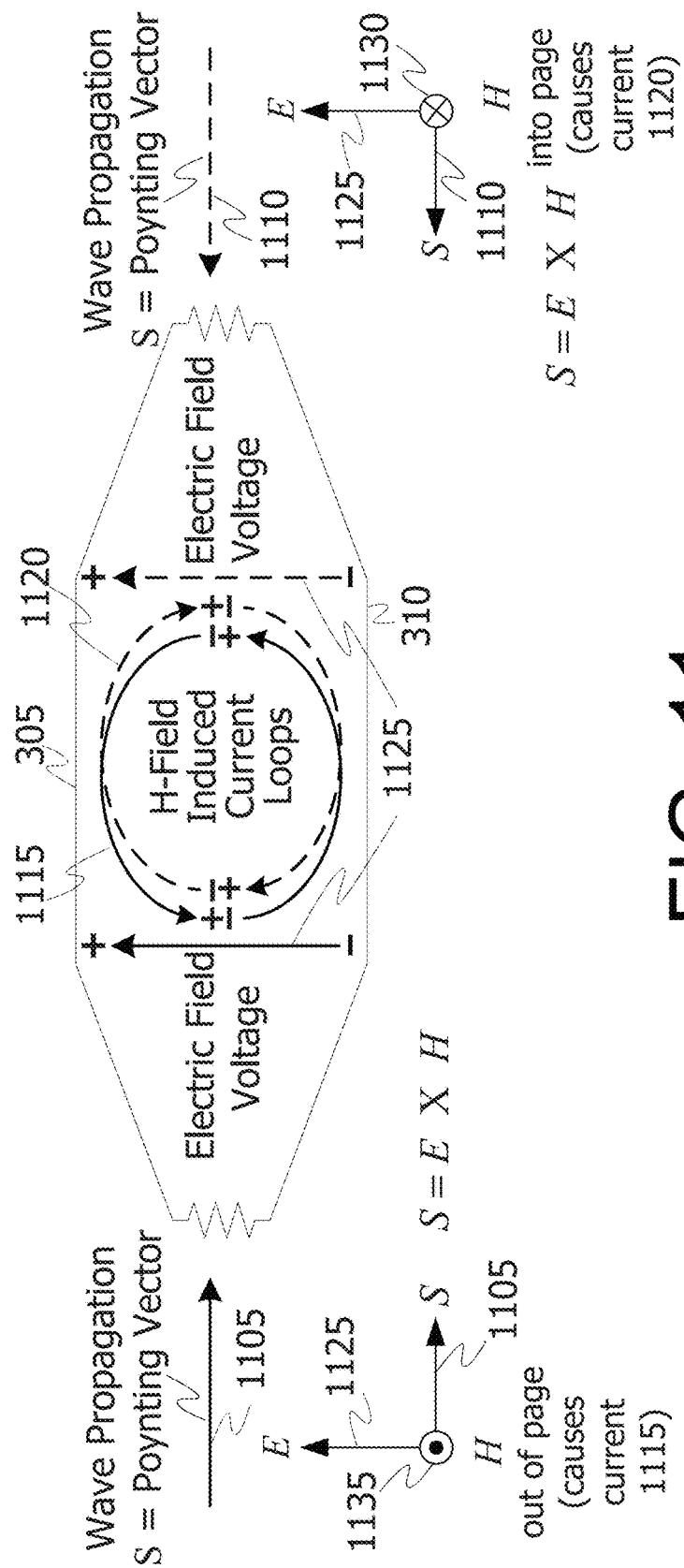
FIG. 11 is a drawing illustrating the theory of operation of a DPA, including showing a side view of a DPA along with solid or dashed arrows to illustrate a wave coming directly into either the right (dashed) or left (solid) ports of the antenna, along with the direction of the current induced by the magnetic field, and the voltage induced by the electric field, according to a disclosed embodiment.

FIG. 11 illustrates the theory of operation of the DPA. It shows a side view of a DPA along with solid 1105 and dashed 1110 arrows to illustrate a wave coming directly into either the right and left ports respectively. It also shows the direction of the current loop induced by the magnetic field with a solid 1115 and dashed 1120 curved arrows associated with waves 1105 and 1110 respectively. It also shows the voltage 1125 induced by the electric field, which is the same for both waves 1105 and 1110. By design, the magnetic and electric fields cancel at one port, and at the other port (where the wave arrives), add to twice what the E-field or H-field would have produced on their own The antenna's inductance is adjusted with the loop area (i.e. with length and height). The antenna's capacitance, that is, between the conductive surfaces 305 and 310 is adjusted with surface area and height. The termination impedance is set by the inductance and capacitance and matched by designing the balun transformers and low noise amplifier (LNA) to have the desired input impedance. The induced current and voltage add to produce an output voltage that is twice what the E-field or H-field would have produced on their own. It shows axes to illustrate the right-hand rule applied to the cross-product to get the Poynting vector from the E cross H, and the right hand rule to get the clockwise or counter-clockwise induced current from the H field direction;

The loop area defined by the height of the transmission line and the length enclosed by the pair of port establishes the magnetic dipole moment of the PxMA. The electric dipole moment of the PxMA is governed by the spacing between the two conductors (i.e. the height of the antenna element) and the capacitance across the ports, which is a function of the size and shape of the two conductors. When the length and width and height and termination impedances are adjusted appropriately, as described in Reference 11, the end result is a dual port PxMA element, or DPA that maintains its unique PxMA properties to arbitrarily low frequencies, and with no matching network—just a resistive termination. Both ports have a cardioid pattern, and the cardioid pattern is rotationally symmetric about the main beam axis.

Reference 15 (SSN-441) describes a DPA that is similar to the one in Reference 11, but the conductive surfaces are cylindrical and do not form a transmission line. FIG. 5 is a mechanical drawing for a 100 ohm balanced cylindrical DPA. Like FIG. 3, there is a top conductive surface 505, a bottom conductive surface 510, with ports 340A and 340B at the edges of these conductive surfaces. Coaxial cables 325 and 330 take the signals from these ports to receivers that can isolate different signals from one another. The cylinder radius sets the loop area and effective height. The width of the conductive surfaces sets the capacitance. Like the DPA of FIG. 3, the loop area, capacitance, and termination resistance are set so that in the late time (i.e. as time goes to infinity), $\vec{m}=c\vec{p}$. The magnetic and electric dipole moments $\vec{m}$ and $\vec{p}$ are related by the speed of light c such that $\vec{m}=c\vec{p}$ so that each port generates a cardioid pattern that extends to arbitrarily low frequency without any frequency dependent matching network but with a simple fixed non-reactive termination. Like the DPA of FIG. 3, the plane between and parallel to the antenna's conductive surfaces (in other words, between the positive and negative terminals of the ports) is its ground-symmetry plane since the conductor above the symmetry plane the conductor below the symmetry plane are a mirror image of one another. Its cardioid pattern is symmetric along the axis of the main beam. Just as the balanced DPA of FIG. 3 has an unbalanced version, as shown in FIG. 4, the balanced cylindrical DPA of FIG. 5 also has an unbalanced version where the lower conductor 510 is replaced by a larger surface that serves as a ground-plane, allowing the antenna to be half the height.

The DPA is electrically small and generally lightweight and inexpensive due to its simple construction. The antenna ports are directional by virtue of the fact that the antenna is a PxMA—the antenna's loop area, sensitive to the H-field, and antenna's electric dipole moment (or effective height), sensitive to the E-field, are inherently matched to produce the same voltage across a resistive port termination impedance. The termination, in the case of an RF emitter sensing system, is the input impedance of the receiver connected to the port. Because of its inherently matched E and H sensitivity at each port, the sum of the E-field induced signal and the H-field induced signal creates a null in one direction and creates a maximum response in the opposite direction—i.e. the cardioid pattern ascribed to a PxMA. Because they are a true PxMA they have high directivity regardless of how low the frequency is—in other words, they are not a structure with a passband nature, but could be infinitesimally small and still be directional. Both ports share the exact same co-located magnetic and electric dipole moments at arbitrarily low frequency. The fields coupled to each port come from the exact same spatial volume. As a result, their port ratios are inherently matched ports and they have a highly repeatable and stable ratio of gains at any angle. If, due to manufacturing tolerances, a DPA is slightly larger or smaller, the ports still share the exact same spatial aperture and volume and therefore have inherently matched gain and symmetrical patterns, even though the null in the cardioid may not be ideal. Because the sensitivity to mechanical tolerances is low, multiple DPAs are extremely well matched to each other, making them ideal for use in phased-array structures. In other words, all of the signal processing methods applied to arrays, such as those described in Reference 5 can be applied to an array that includes DPA elements.

Derived from Reference 15, the output voltage of a DPA versus frequency and the incidence angle of an incoming E-field follows the following proportion:

$$V_{out}(f, \phi, \rho, \text{port\_1}) \approx \frac{\pi A}{\lambda}(1 + \cos\theta)(E_\theta \sin\phi + E_\phi \cos\phi) \quad (1)$$

$$V_{out}(f, \phi, \rho, \text{port\_2}) \approx \frac{\pi A}{\lambda}(1 - \cos\theta)(E_\theta \sin\phi + E_\phi \cos\phi).$$

Figure 15:
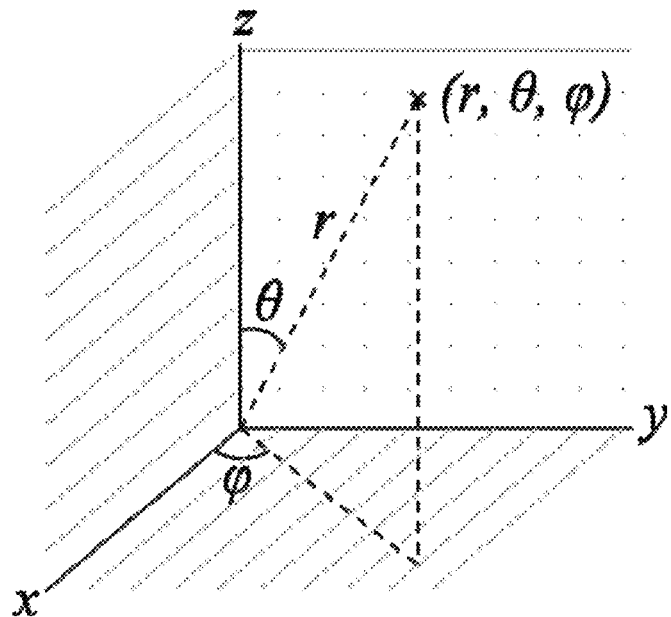
FIG. 15 illustrates the spherical coordinate system used to express the DPA's output voltage versus the angle and polarization of the incoming wave.

In this equation, A is the loop area of the antenna in square meters, $\lambda$ is the wavelength in meters, incident E-field ($E_\phi, E_\theta$) has units of volts/m, and $V_{out}$ is in volts. The angles $\phi$ and $\theta$ are expressed in the spherical coordinate system such as that shown in FIG. 15. For example, referring to FIG. 15, suppose the X-Y plane is parallel to the earth's surface, with the Y-axis aimed north. Suppose the DPA is oriented so that its ports are on the Z-axis and its ground symmetry plane is the Z-X plane. To be clear, the DPA is oriented so that its first port, at positive Z, aims up toward the sky; its second port, at negative Z, aims down to the center of the earth; and the main beam from these ports is sensitive to a wave polarized with its E-field oriented along the y-axis, or north-south. The angle $\theta$ is the angle to the source of the incident field relative to the aiming axis running through the two ports. At $\theta=0°$ the incident field arrives in the main beam of the first port. Note how, in Equation 1, regardless of $\phi$, the beam pattern is always a raised cosine function of $\theta$. This perfect symmetry about $\phi$ is useful for DF. We can define a plane that intersects both antenna ports and the source of the incident field which we will call the $\phi$-plane. This $\phi$-plane can be visualized at a particular $\phi$ by imagining $\theta$ spinning 360 degrees to define the $\phi$-plane. The orientation of the incident E-field (i.e. its polarization) is given in relation to this $\phi$-plane. When $\phi=0°$ the $\phi$-plane is the ground-symmetry plane. The incident TEM (transverse electric magnetic) wave has E-field components that are perpendicular to the direction of energy flow (i.e. the Poynting vector) with one component, $E_\theta$, in the $\phi$-plane, and the other component, $E_\phi$, perpendicular to the $\phi$-plane. Note that the symmetry about the Z-axis is such that if the polarization were always oriented for the maximum response, the output voltage would be independent of $\phi$ and only depend on $\theta$.

To illustrate the antenna's response, rotate the coordinate system and suppose a DPA is oriented so that the first port aims north with vertical polarization. In this case, referring to FIG. 15, the Z-axis would point to the north, the Z-X plane would represent the surface of the earth as well as the antenna's ground-symmetry plane, and the y-axis would aim toward the sky while the x-axis would aim west. In this vertical polarization case, an E-plane pattern is in a vertical plane containing both ports (i.e. the Z-Y plane), and the H-plane pattern is a horizontal plane that contains both ports (i.e. the Z-X plane).

Using this geometry, consider an E-plane beam pattern. In this case, $\phi=90°$ and $\theta$ spins 360 degrees to create the E-plane pattern. Here, $\theta$ represents the elevation angle. At $\phi=90°$, the $\phi$-plane is the E-plane and with vertical polarization $E_\phi=0$ and the E-field is simply $E_\theta$. Note that $E_\theta$ is vertical to the earth (and coming from the horizon) when $\theta=0°$ but when $\theta=90°$, it is coming down from the sky, is horizontal to the earth (with no vertical component), and is aligned north-south along the axis running between the two DPA ports. At $\theta=45°$, $E_\theta$ is still coming from the north, but is coming down from the sky and tilted at an angle of 45°. At $\theta=180°$ the E-field is coming from the south at the horizon. $E_\phi=0$ since there is no E-field perpendicular to the $\phi=90°$ $\phi$-plane. Since $E_\phi=0$, Equation 1 shows that the E-plane pattern is $$V_{out}(f, \theta) \approx \frac{\pi A}{\lambda}(1 + \cos\theta)E_\theta. \quad (2)$$

Next consider an H-plane beam pattern. In this case $\phi=0°$, and $\theta$ spins 360 degrees to create the H-plane pattern. In this case $\theta$ represents the azimuth (or bearing) angle. All fields in this plot come from a vertically polarized wave coming from the horizon. Since the vertically polarized E-field is perpendicular to the $\phi=0°$ $\phi$-plane, the E-field is simply $E_\phi$. In other words, since there is no horizontal E-field, i.e. no field in the $\phi$-plane, $E_\theta=0$. At $\theta=0°$, the field is vertical to the earth and coming in from the north directly into the first port. At $\theta=90°$, the E-field is coming from the west. In this case, Equation 1 shows that the H-plane pattern is $$V_{out}(f, \theta) \approx \frac{\pi A}{\lambda}(1 + \cos\theta)E_\phi \quad (3)$$

A subscript nomenclature will be used to specify that a voltage came from a particular port orientation. For example, a receiver capable of isolating a signal of interest (SoI) connected to port-P has an output voltage on it of $v_P(t)$ where t denotes time and P denotes the port. With earth centric compass aligned ports, the nomenclature includes port P∈{$N_V$, $S_V$, $E_V$, $W_V$} respectively referring to north, south, east, west, and vertically polarized, P∈{$N_H$, $S_H$, $E_H$, $W_H$} respectively referring to north, south, east, west, and horizontally polarized, and P∈{$U_N$, $D_N$, $U_E$, $D_E$} respectively referring to up-north, (sensitive waves polarized north-south coming from the sky), down-north (sensitive waves polarized north-south coming from the ground), up-east (sensitive to an east-west polarized wave coming from the sky), down-east (sensitive to an east-west polarized wave coming from the ground). For example, for a north-south oriented and vertically polarized DPA, the receiver connected to port-N (the north port) has an output voltage of $v_{N_V}(t)$, while a receiver connected to the south port has an output voltage of $v_{S_V}(t)$. For brevity, when discussing a specific or representative case, like using a set of antennas that have only vertically polarized ports, these will be shortened to just $v_N(t)$ and $v_S(t)$, since vertical polarization is understood in the context of their use. Similarly, when simply referring to a single arbitrarily aimed DPA pairs ($v_N(t)$, and $v_S(t)$) or ($v_E(t)$ and $v_W(t)$) or ($v_U(t)$ and $v_D(t)$) will be used to represent the oppositely aimed port-pairs, regardless of how they might actually be aimed in a fielded system. The earth-centric compass-oriented nomenclature is used for simplicity and clarity. Clearly any particular set of ports can be rotated to any orientation which can be mathematically specified by standard geometric translation/rotation equations.

Antenna System

Figure 1B:
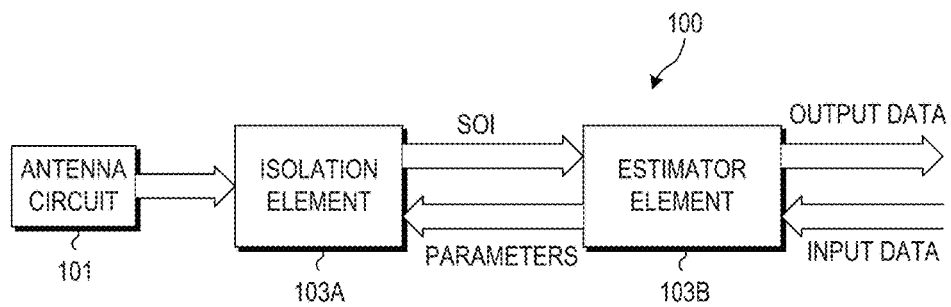
FIG. 1B is a block diagram of an RF emitter sensing system similar to FIG. 1A but with an explicit isolation element.

In one simple embodiment, the antenna-system is comprised of a single DPA element with two ports. Following FIG. 1A, the estimator element is configured to perform a function F that produces an AoA estimate from the outputs of the two DPA ports. Following FIG. 1B, the isolation element filters out all signals except for each of the one or more signals of interest (SoI) from each of the two DPA ports, and then the estimator element performs a function F that produces an AoA estimate for each of the isolated SoI. The isolation element can be comprised of a tuned filter or receiver at each port that isolates the SoI from other signals.

This simple single-DPA embodiment is useful when the operator can rotate the antenna, or when it is known that the AoA can only come from a particular side of the DPA. When it is known that the AoA can only come from a particular side of the DPA, the function F can use a port-pair measurement at a single DPA orientation to determine the AoA. When the AoA can come from either side of the DPA, the DPA can be rotated so that the function F can use measurements from more than one DPA orientation to determine the AoA. Ambiguities, such as cos(x)=cos(−x) are resolved by rotating the DPA.

In another simple embodiment, the antenna-system is comprised of a DPA plus one or more additional antennas such that it has at least three ports. The isolation element is comprised of a tuned filter or a receiver at each port where all the receivers are coherent. The addition of at least one more port allows the SoI levels from the DPA ports to be estimated using a coherent process. The coherent SoI level estimation is done by correlating each DPA port output SoI with the SoI from one or more of the additional ports or a weighted sum from other ports. The correlation process can be done over a period of time that is either continuous or not continuous as will be described in greater detail later in this document.

In another simple embodiment, the antenna-system has four ports and is comprised a set of two DPAs oriented orthogonally to each other, such as north-south and east-west, or a QPA. This embodiment, with both DPAs oriented for vertical polarization, would be appropriate for applications needing to find the AoA (or line of bearing relative to north) of a vertical ground-wave and where the antenna array is fixed and cannot be rotated. By having these four ports, calculations can be done to make the RF emitter sensing system immune to not only its own noise, but also homogeneous noise in the atmosphere picked up by the antennas. With both DPA antennas oriented for vertical polarization and looking for a ground-wave signal, both DPAs are working on an H-plane pattern, as described in Equation 3 in paragraph [00125]. For this vertical ground-wave case, or application, we will represent the azimuth angle, where φ=0° is east and φ=90° is north. With this definition, the voltage out versus angle patterns for the four ports are:

$$W_{N_V} \propto (1+\sin \varphi)/2$$

$$W_{S_V} \propto (1-\sin \varphi)/2$$

$$W_{E_V} \propto (1+\cos \varphi)/2$$

$$W_{W_V} \propto (1-\cos \varphi)/2 \qquad (4)$$

Quad-Port PxMA Antenna (QPA)

Figure 6:
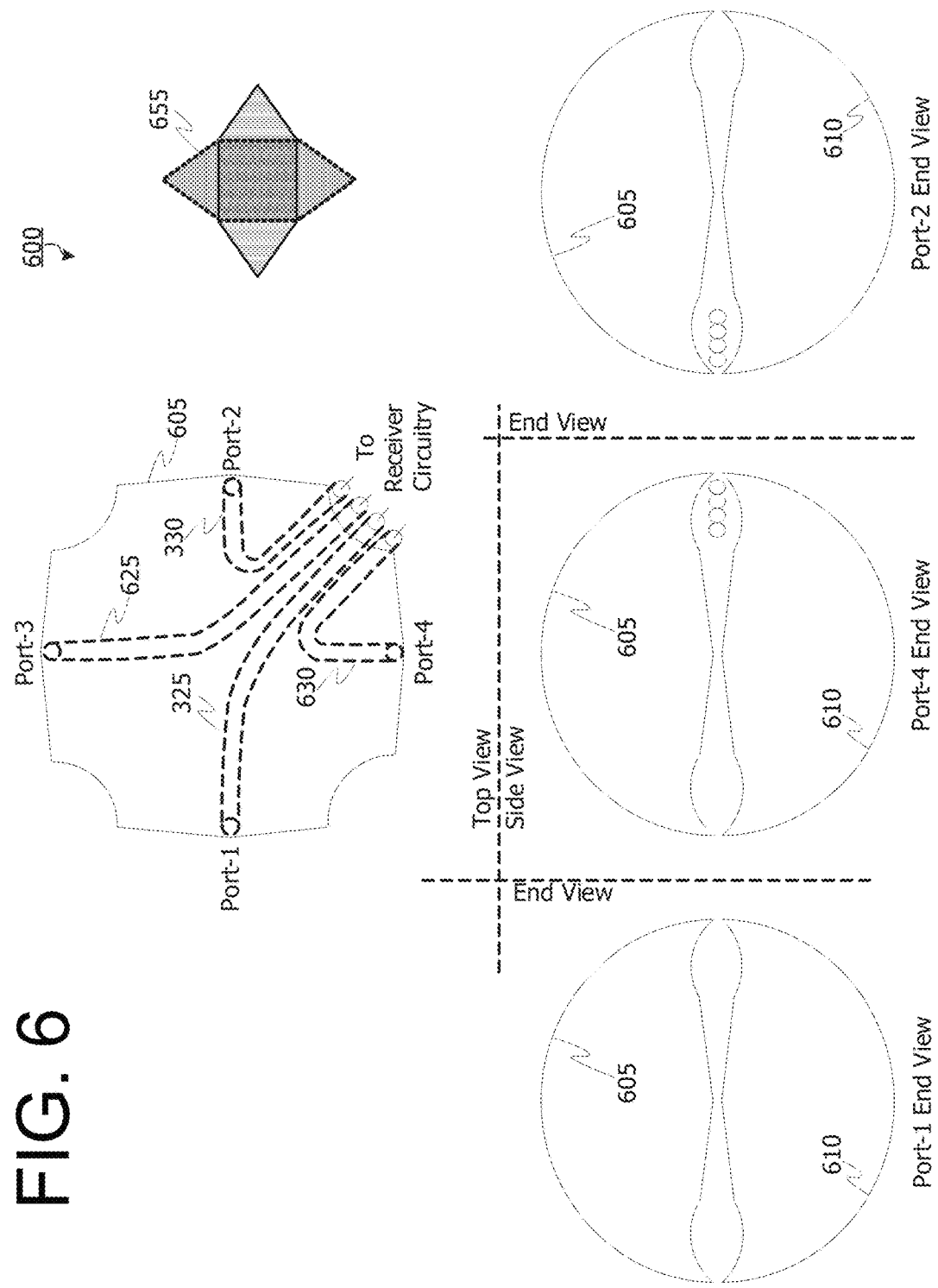
FIG. 6 is a mechanical drawing showing a nominally spherical quad-port antenna (QPA) that is a pair of DPAs that are oriented orthogonally to each other and that share the same conductive surfaces.

Rather than using a pair of DPAs that are oriented orthogonally to each other, another four-port embodiment could use a QPA, which is a pair of orthogonal DPAs sharing the same conductive surfaces. FIG. 6 is a mechanical drawing showing a QPA that is nominally spherical. Like the DPAs of FIG. 3 and FIG. 5, it has a top conductor 605 and a bottom conductor 610, and has the original two ports, or port-pair, port-1 and port-2, and coaxial cables 325 and 330, but now also has an additional second set of ports, or port-pair, port-3 and port-4, and coaxial cables 625 and 630. In this case the first pair of ports produce cardioid patterns aimed 0 and 180 degrees, while the additional pair of ports (port-3 and port-4) produce cardioid patterns aimed 90 and 270 degrees. Each port-pair form, with the conductive surfaces, a loop, where the two loops are orthogonal to each other. The new second magnetic dipole moment $\vec{m}_2$ for the port-3 port-4 pair is orthogonal to the first magnetic dipole moment $\vec{m}_1$ from the port-1 port-2 pair. As with all PxMA elements, the height, and width, and length, and termination impedances are generally setup so $\vec{m}_1 = c\vec{p}$ and $\vec{m}_2 = c\vec{p}$ to obtain their unique symmetric cardioid pattern at arbitrarily low frequency performance with a resistive termination and no additional calibration.

Symbol 655 is a schematic symbol intended to pictorially represent 4 orthogonal ports with polarization and directionality consistent with the QPA or a pair of similarly oriented DPA antennas.

Figure 7:
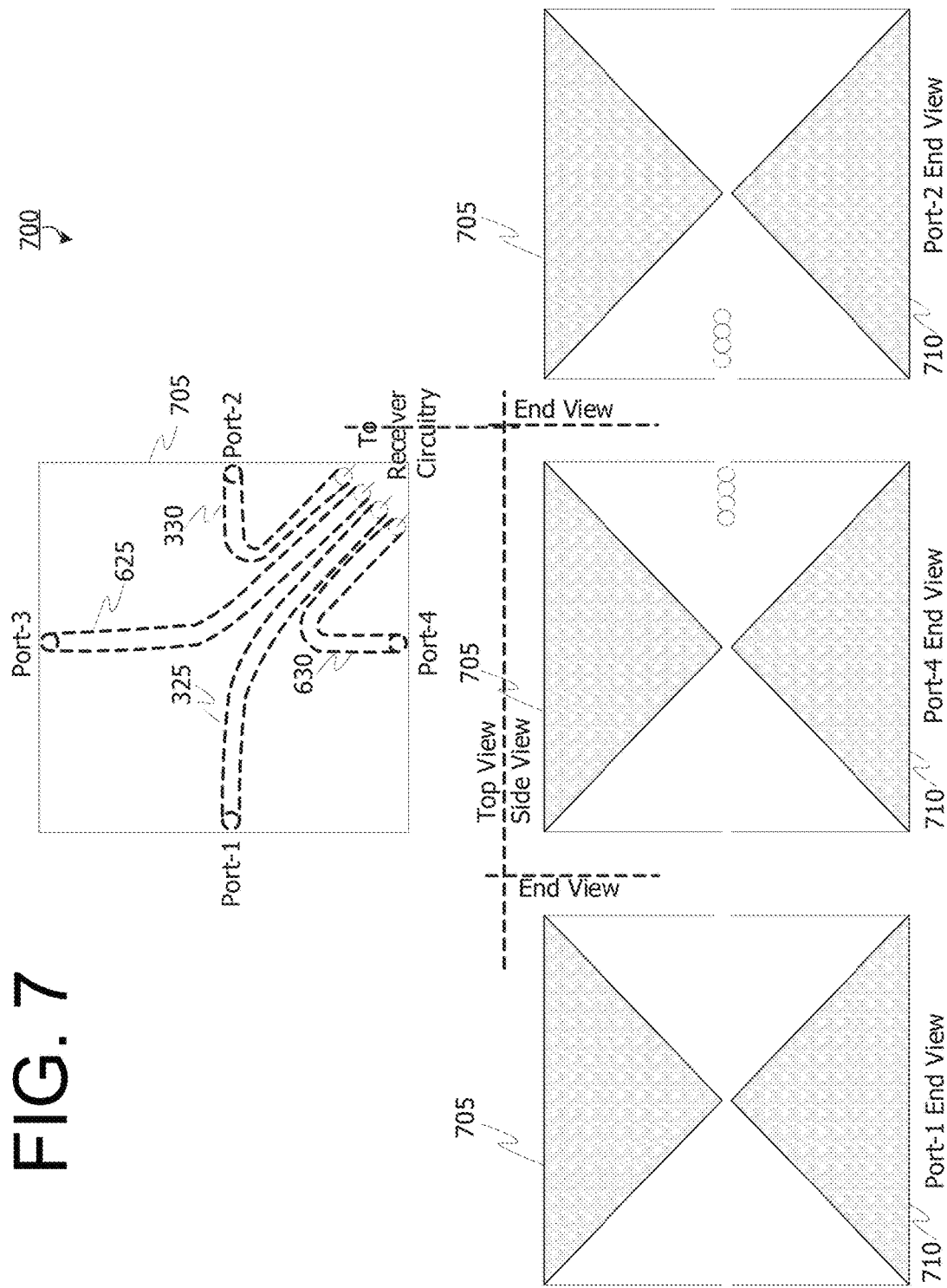
FIG. 7 is a mechanical drawing for a alternative embodiment of a QPA constructed almost identically as the spherical QPA, but is cubical instead of spherical.

FIG. 7 is a mechanical drawing for an alternative embodiment of a QPA constructed almost identically as the spherical QPA, with a top conductive surface 705, a bottom conductive surface 710, and the same port connections as FIG. 6, but is cubical instead of spherical.

FIGS. 6 and 7 show balanced versions of a QPA. Unbalanced versions can be built by replacing the lower conductor 610 or 710 with a conductor that is wide, much like that shown in FIG. 4. In this case, the lower conductor is typically either a square, with a width that is on the order of 3 times or more the height of the sphere (FIG. 6) or cube (FIG. 7), or round with a diameter that is on the order of 3 times or more the height of the sphere or cube versions.

HPA and DHPA—Hex Port Antenna and Dual Hex Port Antenna

Figure 19A:
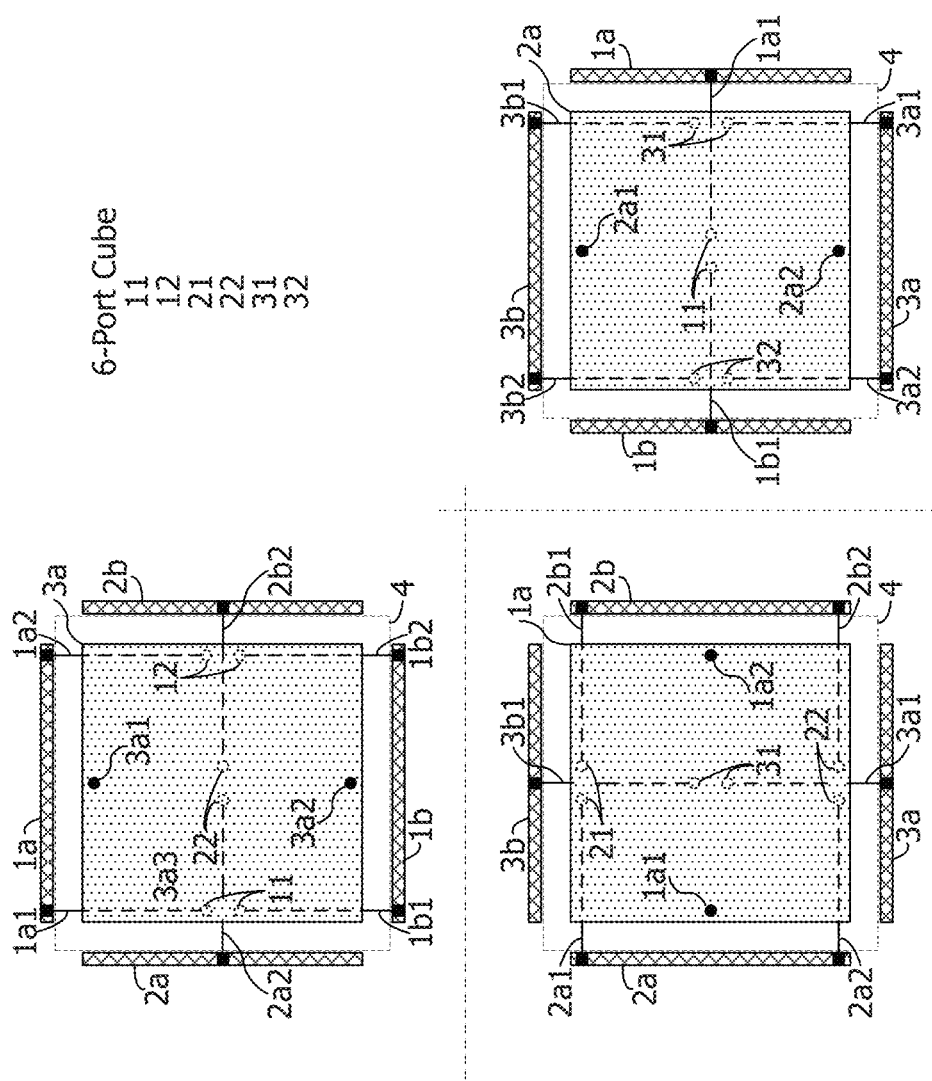
FIG. 19A is a mechanical drawing showing a 6-port $\vec{p}$ cross $\vec{m}$ antenna (6-PA) also called a hex port antenna (HPA) that is cubical, which can replace three DPAs that are oriented orthogonally to each other.
Figure 19B:
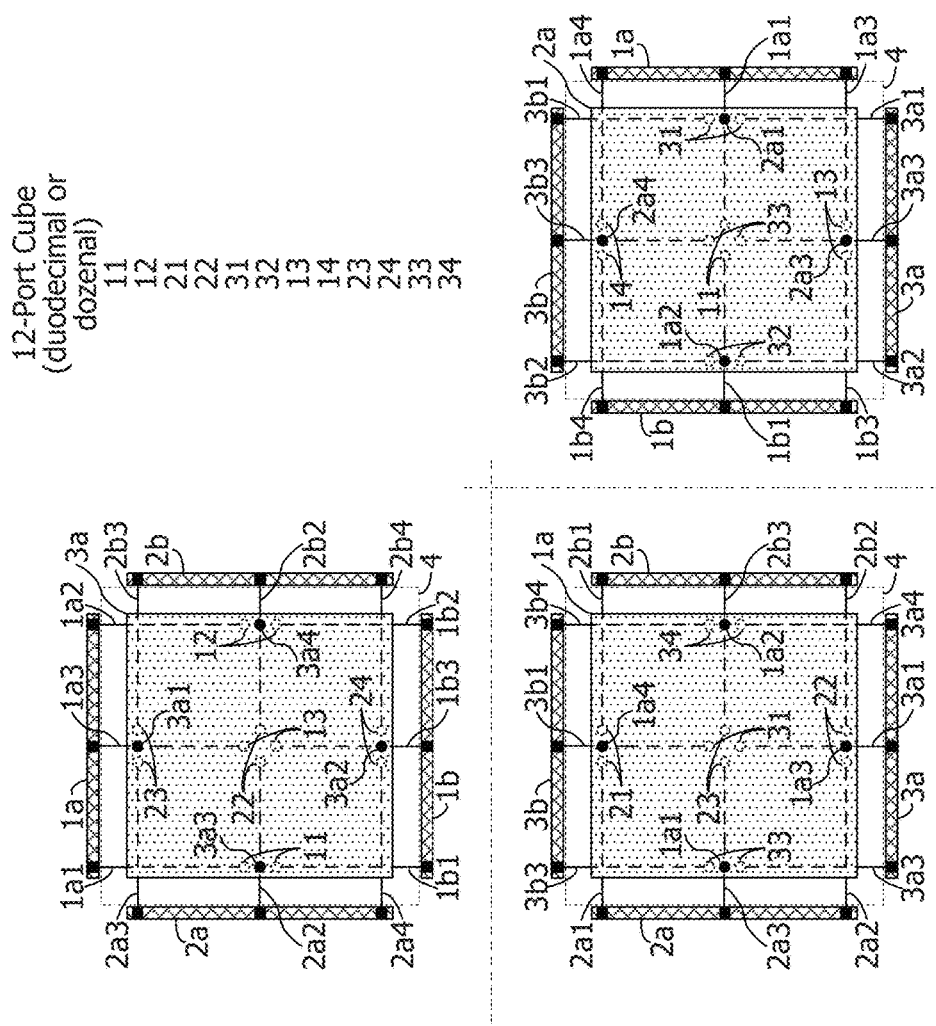
FIG. 19B is a mechanical drawing showing a 12-port $\vec{p}$ cross $\vec{m}$ antenna (12-PA) also called a dual hex port antenna (DHPA) that is cubical, which can replace three QPAs that are oriented orthogonally to each other.

Another embodiment useful for ultra-miniature 3D and fully polarimetric DF applications is an antenna system that includes one or more HPA or DHPA elements. FIG. 19A is a mechanical drawing showing an HPA and FIG. 19B is a mechanical drawing showing a DHPA. Rather than using three separate DPAs that are oriented orthogonally to each other, an HPA is three orthogonal DPAs that share a common volume. Similarly, rather than using three separate QPAs that are oriented orthogonally to each other, a DHPA is three orthogonal QPAs that share a common volume. As shown in FIGS. 19A and 19B, both the HPA and DHPA are made with three pairs of conductive surfaces. Pair-1 is comprised of surface 1a, and surface 1b. Pair-2 is comprised of surface 2a and 2b. Pair-3 is comprised of surface 3a and 3b. Here, the numbers 1, 2, and 3 refer to opposing face-pairs (i.e. faces on opposite sides of cube 4 in FIGS. 19A and 19B) and where the letters a and b refer to a specific face in the face-pair. These conductive surfaces are shown as squares plus wires but could take on other shapes such as a circular or even a complex shape like a jig-saw like piece.

Each face-pair, or pair of conductive surfaces, connect to either two ports, if the conductive surface pair are connected as a DPA, or connect to four ports if the conductive surface pair are connected as a QPA. Face-pair 1 (i.e. 1a and 1b in FIGS. 19A and 19B) has ports 11, 12 when connected as a DPA, and also has ports 13, and 14 when connected as a QPA. Face-pair 2 (i.e. 2a and 2b) has ports 21, 22 when connected as a DPA, and also has ports 23, and 24 when connected as a QPA. Face-pair 3 (i.e. 3a and 3b) has ports 31, 32 when connected as a DPA and also has ports 33, and 34 when connected as a QPA. Each port, or feed point, has a two terminals (e.g., + and −) that connect to their respective conductive surface. For clarity, the connection at the feed is shown being made through a pair of "wires" having equal length. These "wires" are, however, simply part of the conductive surfaces and can be shaped, such as in a triangular sheet. Port 11 connects through the pair of wires where the first wire in the pair is 1a1 (going to face 1a) and the second wire in the pair is 1b1 (going to face 1b). Port 12 connects through the pair of wires 1a2 (going to face 1a) and 1b2 (going to face 1b). Port 13 connects through the pair of wires 1a3 (going to face 1a) and 1b3 (going to face 1b). Port 14 connects through the pair of wires 1a4 (going to face 1a) and 1b4 (going to face 1b). Face 1a plus wires 1a1, 1a2, 1a3, 1a4 form a conductive surface. Face 1b plus wires 1b1, 1b2, 1b3, and 1b4 form another conductive surface. These two conductive surfaces and four ports form a first QPA. Port-11 and port-12 form a port-pair, and port-13 and port-14 form a port pair such that the port-pairs are orthogonal to each other. Each port-pair can be connected to twinlead or a balun transformer or 180-degree splitter or hybrid. A connection of this type is illustrated in FIG. 3. Instead of wires, the conductive surface can be shaped and bent, or be comprised of bonded pieces to provide these connections, such as using triangular wedges similar to those of FIG. 7 instead of wires.

A second QPA orthogonal to the first QPA is constructed similarly. Port 21 connects through the pair of wires 2a1 (going to face 2a) and 2b1 (going to face 2b). Port 22 connects through the pair of wires 2a2 (going to face 2a) and 2b2 (going to face 2b). Port 23 connects through the pair of wires 2a3 (going to face 2a) and 2b3 (going to face 2b). Port 24 connects through the pair of wires 2a4 (going to face 2a) and 2b4 (going to face 2b). These four ports are equivalent to a second QPA, that is orthogonal to the first QPA, where port-21 and port-22 form a port-pair, and port-23 and port-24 form a port pair where the port-pairs are orthogonal to each other.

A third QPA orthogonal to both the first and second QPAs is constructed similarly. Port 31 connects through the pair of wires 3a1 (going to face 3a) and 3b1 (going to face 3b). Port 32 connects through the pair of wires 3a2 (going to face 3a) and 3b2 (going to face 3b). Port 33 connects through the pair of wires 3a3 (going to face 3a) and 3b3 (going to face 3b). Port 34 connects through the pair of wires 3a4 (going to face 3a) and 3b4 (going to face 3b). Port-31 and port-32 form a port-pair, and port-33 and port-34 form a port pair where these port-pairs are orthogonal to each other.

It can be seen that the DHPA shown in FIG. 19B is a super set of the HPA, QPA, and DPA. It is a PxMA antenna where all elements share a common volume, and that can be easily reduced to a fully polarimetric HPA simply by eliminating 6 of the ports, such as eliminating 13, 14, 23, 24, 33, and 34, as shown in FIG. 19A. It can be reduced to a QPA by removing all but one surface-pair. The QPA can be reduced to a DPA by removing one port-pair from the QPA. Thus it is seen that many combinations of reductions of the DHPA can be used according the needs of particular applications.

Exemplary Antenna Array Embodiments

More complex embodiments can use an antenna-system with more ports to offer more degrees of freedom to (1) cover more polarizations, (2) estimate and remove atmospheric noise of different polarizations, (3) combine multiple elements with amplitude and phase weights to aim nulls and/or beams in desired directions, and (4) provide ports that are shadowed from wavefronts from particular directions. For example, FIG. 12 shows an embodiment that includes an antenna-system with sixteen ports. It uses top and side view symbols from FIGS. 3 (350 and 355) and FIG. 6 (655) to convey the different 3D orientations making up the antenna system. The sixteen ports allow the RF emitter sensing system to operate against a conductive plane such as an aircraft wing, or the earth, and estimate the polarization as well as the angle-of-arrival in multipath conditions—multipath conditions such as with waves that bounce off of the ionosphere and ground. Operating in this multipath environment is important in many applications, such as in near-vertical-incidence-skywave (NVIS) operations.

The minimum antenna-system that can provide all three H-field axes and all three E-field axes is a set where the three DPA loops are oriented orthogonally and the three DPA heights are oriented orthogonally, such as $P \epsilon \{N_V, S_V, E_H, W_H, U_E, D_E\}$, or $P \epsilon \{E_V, W_V, N_H, S_H, U_N, D_N\}$, each with six ports. The HPA can be oriented to provide either of these. The DHPA provides both. The addition of other orientations and positions and shadowed elements allows additional degrees of freedom useful for things such as estimating polarization, self calibration, mitigating bias terms from noise, and separately estimating a desired AoA from multiple wavefronts at the same frequency, such as multipath.

Shielding/Shadowing

One key feature in an embodiment using an antenna-system of FIG. 12 is the inclusion of shadowed ports. Generally, to achieve a desired beam pattern capable of isolating multipath terms at low frequencies from an array of elements requires large spacing between elements. In order to isolate multipath and still have a miniature size, the two far right DPA elements in FIGS. 12, 1205 and 1206, are shadowed (or shielded in a direction), so that they pick up vertically polarized ground-wave signals, but have reduced sensitivity to signals coming down from the sky.

Previously we defined port nomenclature to be P∈{$N_V$, $S_V$, $E_V$, $W_W$} respectively referring to north, south, east, west, and vertically polarized, P∈{$N_H$, $S_H$, $E_H$, $W_H$} respectively referring to north, south, east, west, and horizontally polarized, and P∈{$U_N$, $D_N$, $U_E$, $D_E$} respectively referring to up-north, (sensitive to waves polarized with their E-field oriented north-south coming down from the sky), down-north (sensitive to waves polarized with their E-field oriented north-south coming from up the ground), up-east (sensitive to an east-west polarized wave coming from the sky), down-east (sensitive to an east-west polarized wave coming from the ground). To account for ports connected to shadowed elements, we will append these with an S subscript to denote a port that is shadowed. For example, P∈{$N_{VS}$, $S_{VS}$, $E_{VS}$, $W_{VS}$} respectively refers to north, south, east, west, and vertically polarized, and shadowed ports.

Figure 8:
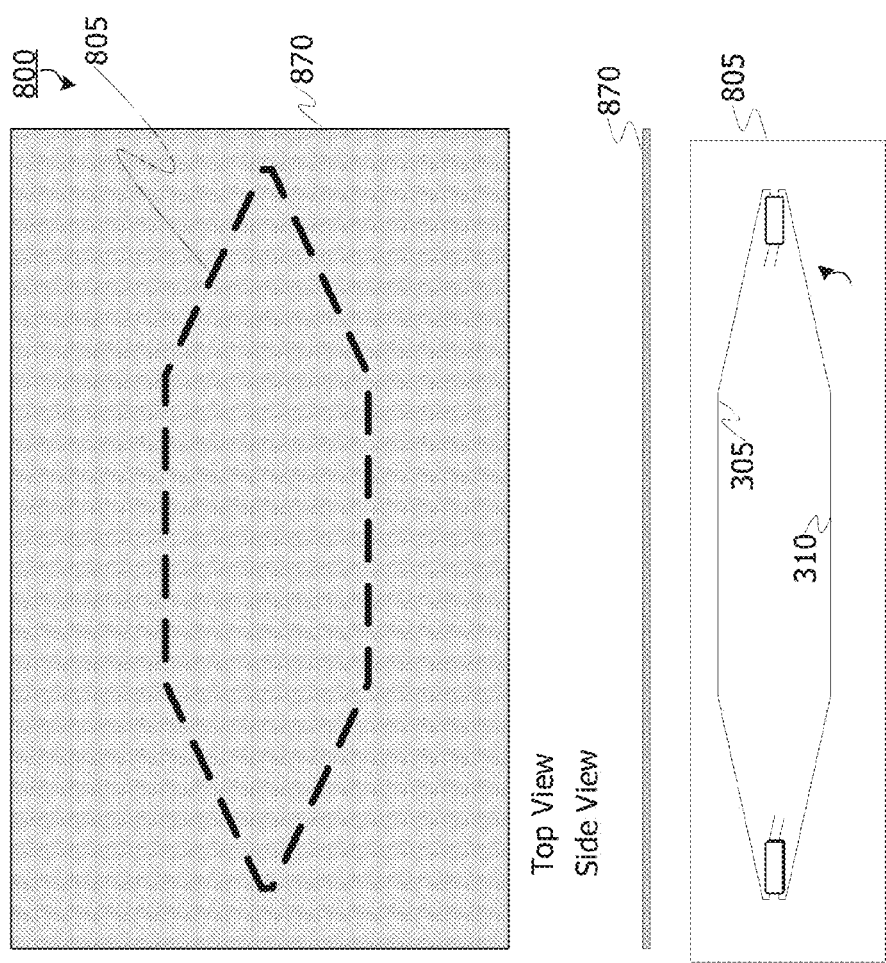
FIG. 8 shows a balanced DPA with its top covered by an absorbing and/or reflective layer which shields or shadows the antenna.

FIG. 8 shows a balanced DPA 805 with its top covered by an absorbing and or reflective layer 870, which shields or shadows the antenna. Since the shield 870 is small relative to the wavelength, it works by creating a short depth shadow. Because the DPA 805 is thin, it can be placed close enough to shield 870 to fall within the shadow. Typically, the absorbing cover 870 is placed three or more antenna midline heights above the top antenna conductor 305. In alternate embodiments, the DPA could also be a QPA, HPA, or DHPA. An antenna mid-line height is the distance between the conductors 305 or 310 and the symmetry plane between them. In order to have equal shielding capability, the size of shield layer 870 must increase as the spacing from the antenna to 870 increases. The layer 870 perimeter distance around the antenna 880 is typically at least the sum of two antenna mid-line heights plus the spacing to 870.

Figure 9:
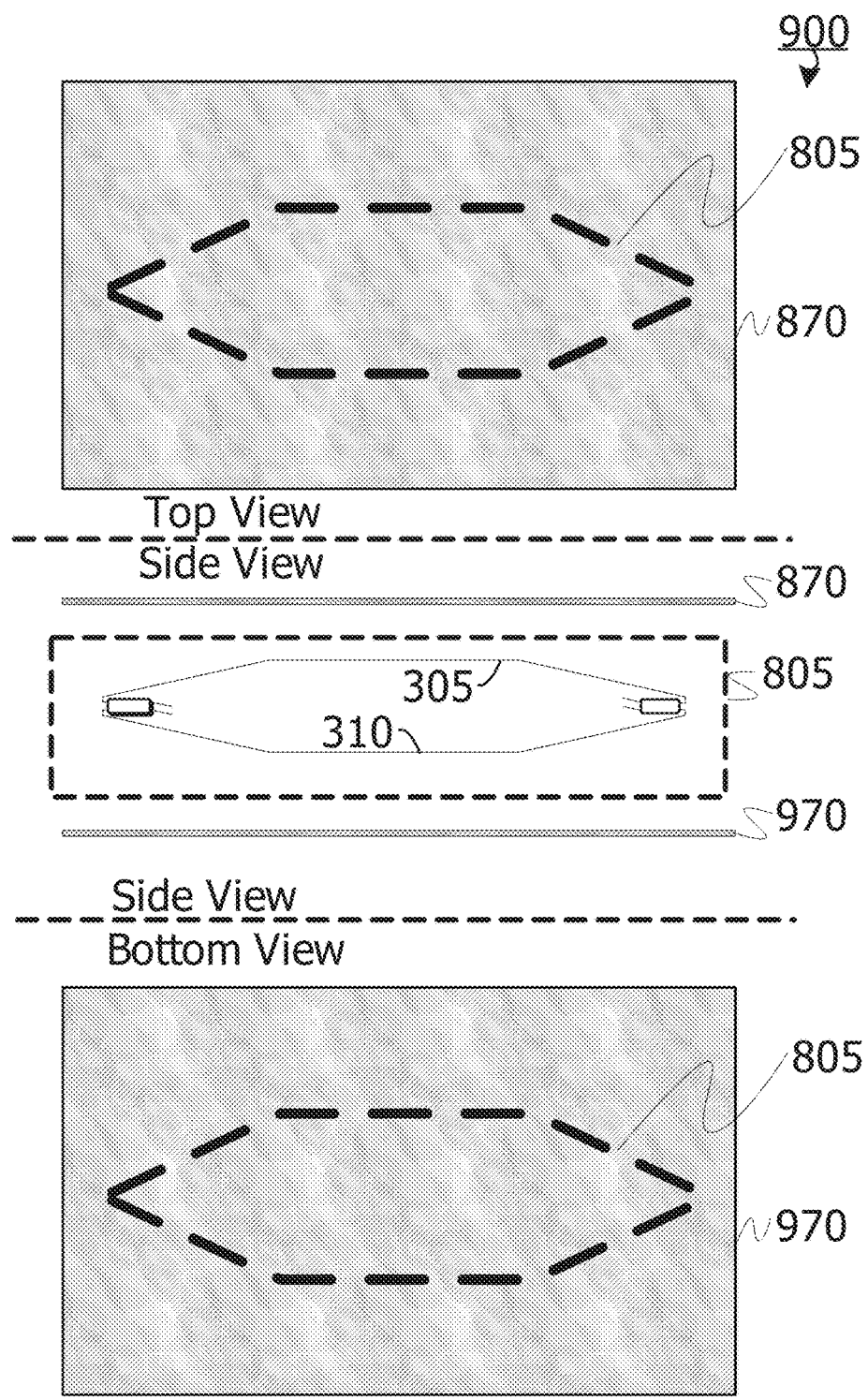
FIG. 9 shows a balanced DPA with both its top and its bottom covered by absorbing and/or reflective layers which shield or shadow the antenna from waves coming down toward the top of the antenna, or coming up toward the bottom of the antenna useful for elevated applications such as on aircraft.

FIG. 9 shows a balanced DPA 805 that is covered by absorbing and/or reflective layers 870 and 970, both above it (upper reflective layer 870) and below it (lower reflective layer 970). Like the upper layer 870, the spacing from the lower antenna conductor 310 to the lower absorbing layer 970 is three or more antenna mid-line heights. This structure is particularly beneficial for an embodiment in which the antenna is elevated, and where it must isolate a sky-wave coming down from the sky, and a ground-bounce wave coming up from the ground, from the desired wave propagating parallel to the ground. The sky-wave coming down and would normally couple to both ports. The reflection of the sky wave off of the ground would also couple into both ports. By placing the thin absorptive reflective material above and below the DPA such that the DPA is in the close-up shadow of the absorptive reflective material, the wave propagating parallel to the ground comes into the antenna unimpeded, while the sky-wave is reduced enough to enhance the accuracy of the AoA estimate. The antenna could be any miniature antenna, such as a QPA, HPA, or DHPA. The absorptive reflective material can be made of typical RF materials like or metal, or mu-metal, or foam/sheets containing lossy carbon powder or fibers.

Figure 10:
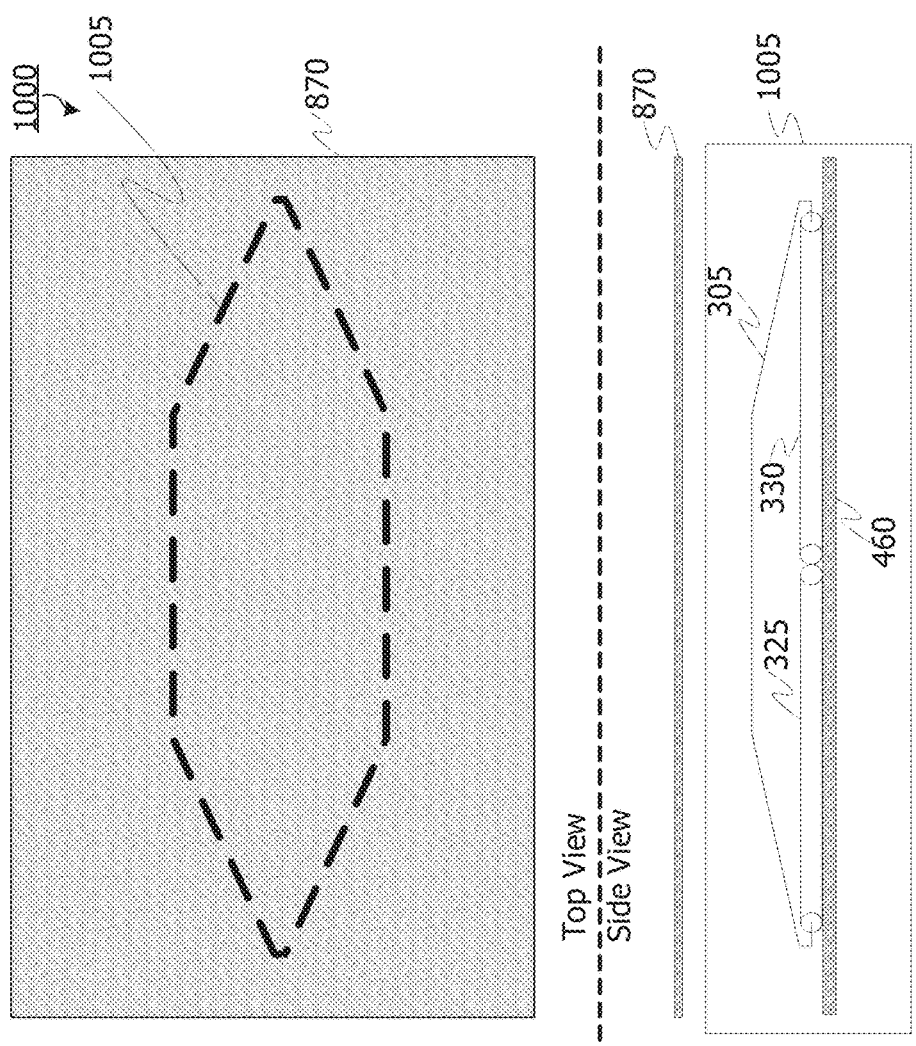
FIG. 10 shows an unbalanced DPA with its top covered by an absorbing and or reflective layer, which shield or shadow the antenna from waves coming down toward the top of the antenna.

FIG. 10 shows an unbalanced DPA 1005 with its top covered by an absorbing and/or reflective layer 870. Again, layer 870 is spaced three unbalanced antenna heights above the top antenna conductor 305, and the layer 870 perimeter distance around the antenna 880 should be at least the sum of two antenna mid-line heights plus the spacing to layer 870.

FIG. 13 shows an embodiment with an antenna-system 101B including 18 ports, where four QPAs provide sixteen ports and the remaining two ports are vertical and horizontal omni-directional antennas. Isolation element 102A is shown with a switch network 1305 and a calibration signal generator 1315 that allow calibration signals to flow through the QPA elements into the receivers, or directly into the receivers. These connections allow the signal path from the antennas, through the receivers 1310 in the isolation element 102A, to the estimator element 103A, to be measured so that signal level comparisons are not changed due to different receiver paths having different gains. It also confirms all wiring.

FIG. 14 shows a low cost embodiment in which the antenna-system 101C has 14 ports, but the isolation element 102B has only two coherent receivers 1410. In this case, a switch network 1405 allows one antenna to feed both receivers 1410, for calibration purposes, and allows any antenna to connect to either receiver. By connecting the same antenna port to both receivers 1410, any difference between them can be measured and eliminated. In the embodiment of FIG. 13, the SoI from all antenna ports was provided to the estimation element 103B simultaneously. But in the embodiment of FIG. 14, each port is isolated and provided sequentially to the processor 1420 in the measurement element 103B. This sequential embodiment works well for signals that use a constant envelop modulation, such as frequency modulation (FM), linear frequency modulation (LFM), bi-phase shift keying (BPSK) and quadrature phase shift keying (QPSK). For example, most VHF/UHF handheld radios use FM modulation. The two ports that are subtracted in the estimator element 103B are switched immediately near the antenna, such as the $N_V$ and $S_V$ ports, so that the exact same wiring and receiver is used. In this way, nothing can effect or bias this difference calculation.

Isolation Element

In applications where it is known that the SoI will always be significantly larger than any other signal, the isolation element 102B could simply be a wire that passes the SoI to the output. It could also simply amplify the SoI and pass it to the output. It could also perform frequency translation. For example, the center frequency of the SoI could be translated so that the output was an intermediate frequency (IF). It could also be translated to DC and the output for each antenna port could be delivered as a complex pair of signals, i.e. an in-phase and quadrature (I/Q) pair of signals. The receivers 1310 in FIG. 13 and the receivers 1410 in FIG. 14 would receive tuning commands from the estimator element (1320 and 1420 respectively) to set the center frequency and bandwidth and modulation type and possibly the listen times. These receivers would also pass any blanking times to the estimator element's processor 1320 and 1420 so that it could properly work with the isolated SoI.

In most applications, the SoI is accompanied by other signals. For these applications the isolation element 102B would pass the signal from each antenna-system port through a filtering process to isolate the SoI from all the other signals. This filtering process can happen in both the frequency domain and time domain. In the simplest case, a frequency domain filter would remove signals at different frequencies, while the time domain filter would remove bursts of interference, or would remove noise during periods of time when the SoI was off. Alternatively, the filtering process could operate as a joint-time-frequency process. For example, an SoI that was repetitively ramping in frequency, such as a radar chirp, could be match filtered (i.e. compressed) to create a high-SNR isolated SoI. The isolation element 102B could include an analog-to-digital converter that delivers digital samples of the SoI at a series of time points. In this case, all or part of the filtering process could take place digitally. Numerous well known digital signal processing (DSP) techniques can be applied to isolate the SoI, such as forward inverse Fourier and Laplace transforms, finite and infinite impulse response (FIR and IIR) filters, joint time frequency analysis (JTFA), MUSIC (multiple signal classification), stretch processing, singular value decomposition (SVD), etc.

Estimator Element

The estimator element 1320, 1420 starts by estimating the level of the SoI at each of the ports. Estimating the level can use an incoherent or coherent mechanism. For example, squaring the voltage on a port, averaging the squared value for some period of time, and taking a square root of the average (the square root of the mean of the square, or RMS) is the classic mechanism and is incoherent. This incoherent function can be accomplished in many ways, such as with a square-law diode detector driving a capacitor, or a bolometer, or it could be done digitally after the signal is digitized using an analog-to-digital converter.

One embodiment uses a coherent mechanism to estimate the level of the SoI. The signal from one port, containing the SoI plus noise, is multiplied by the signal from another port, which also contains the SoI but has a different noise composition. The product is then averaged over a period of time. This function can be accomplished either digitally, or with analog hardware such as by using log, anti-log, integration, and summation functions.

An incoherent estimator element can be as simple as a digital or analog multimeter, a table, and a process that an operator follows. In this case the process is that the operator connects the multimeter to each output port of the isolation element and records the multimeter's RMS voltage reading for each port. The operator then finds the row in the table that most closely matches the set of multimeter readings, and reads the AoA that is listed for that row. This process could add steps, such as the operator performing some calculations using the measured values, and then finding the row in the table that most closely matches the set of results from the calculations, and reading the AoA that is listed for that row. Or the operator could perform a set of calculations that directly produced the AoA.

More typically, the estimator element contains a processor that takes in the SoI outputs from the isolation element and generates an estimate of the AoA. This could be an analog processor or a digital processor or a combination of both. For example, the estimator element could include non-linear network diodes and a processor for performing analog log and exponential and summation functions that takes in the SoI measured at the various antenna ports by the isolation element, and outputs an AoA. Alternatively, the estimator element could be a digital process that could operate via a process similar to the process the operator used in the example case above. It could also use a process for determining the level of the SoI at each port that was coherent and immune to noise in the RF emitter sensing system and immune to homogeneous noise picked up by the antennas. Regardless of implementation (e.g. digital or analog), the estimator element implements a formula, or function $F(\{v_P\}|_{\forall P})$ that produces an AoA estimate given all the signals output by the isolation element.

Some applications benefit from knowing the confidence level in a particular AoA estimate. By evaluating the variance of the SoI outputs over time, the estimator can also output a confidence level for the AoA estimate it provides.

Non-Coherent Method of Estimating AoA

The estimator element typically starts by estimating the RMS voltage level of the SoI at each port. The RMS voltage is measured over a time interval of interest centered at time t with a duration of T. Equation 5 shows the calculation for an arbitrary DPA where its two ports are aimed in opposite directions, and written as (P=N) and (P=S) for north and south for clarity:

$$D_N(t, T) = \sqrt{\frac{1}{T}\int_{t-\frac{T}{2}}^{t+\frac{T}{2}} v_N^2(\tau)d\tau} \text{ and} \quad (5)$$

$$D_S(t, T) = \sqrt{\frac{1}{T}\int_{t-\frac{T}{2}}^{t+\frac{T}{2}} v_S^2(\tau)d\tau}$$

Recall that $\varphi=0$ is due east and $\varphi=90$ due north. A north-south-oriented DPA's symmetry about the north-south axis running between its two ports means that a signal coming from $\varphi=90-x$ (or north−x) degrees and a signal coming from $\varphi=90+x$ (or north+x) degrees will generate an identical ratio in power levels between its two ports. Similarly a signal coming x degrees above or below the horizontal plane will generate an identical ratio in power levels at the two ports.

For a north-south oriented DPA that is vertically polarized, a port ratio function $R_{NV}(D_N,D_S)$ has been defined, where the NV subscript refers to North, and Vertical polarization, and where the arguments $D_N$ and $D_S$ are understood to be ports aimed in opposite directions (i.e. north and south) and vertically polarized to match the V subscript on the $R_{NV}$. The port ratio function $R_{NV}(D_N,D_S)$ varies monotonically between +1 and −1 for a signal coming from $\varphi=-90$ to 90 degrees (north to south) respectively, and that is zero at $\varphi=0$ and 180 (east and west), as follows:

$$R_{NV}(D_N, D_S) = \frac{2D_N}{D_N + D_S} - 1 = \frac{D_N - D_S}{D_N + D_S} = 1 - \frac{2D_S}{D_N + D_S}. \quad (6)$$

Following the same construction pattern, $R_{EV}(D_E,D_W)$, for an east-west oriented and vertically polarized DPA, and $R_{UN}(D_U,D_D)$ for an up-down oriented DPA polarized with its E-field oriented north, are:

$$R_{EV}(D_E, D_W) = \frac{2D_E}{D_E + D_W} - 1 = \frac{D_E - D_W}{D_E + D_W} = 1 - \frac{2D_W}{D_E + D_W}, \text{ and} \quad (7)$$

$$R_{UN}(D_U, D_D) = \frac{2D_U}{D_U + D_D} - 1 = \frac{D_U - D_D}{D_U + D_D} = 1 - \frac{2D_D}{D_U + D_D}. \quad (8)$$

For a signal in any plane containing its two ports, R varies monotonically between +1 and −1 for a signal coming from $\varphi=0$ to 180 degrees respectively (e.g. east to west in a horizontal plane). R is zero at $\varphi=90$ and −90 degrees (north and south). The up-down oriented antenna follows the same pattern with $R_{UN}$ varying monotonically between +1 and −1 for a signal coming down from the sky, to a signal coming up from the ground, respectively, and zero for a signal coming from the horizon.

The functions $R_{NV}$, $R_{EV}$, and $R_{UN}$ are useful for four reasons. First, since the quantity is based on a ratio, the output is independent of the amplitude of the SoI. Similarly, if the power is scaled at each port by the same value, the ratio does not change. Such a scaling is equivalent to multiplying both the numerator and denominator by the same value. This feature is important for using the coherent power estimation method described later. Second, the output of either port of the DPA can go to zero without a divide by zero issue. Third, if the antennas generate the ideal beam patterns, such as shown in Equation 1 or the simplified ones shown in Equation 4, inverting these functions can be done mathematically in closed form. Fourth, the inversion function is smooth and can easily be shaped to be correct for the actual antenna patterns, such as when they are disturbed by local objects, as opposed to the ideal patterns.

The closed form solution is found as follows:

$$R_{NV}(\phi) = \frac{\left(\frac{1+\sin\phi}{2}\right)-\left(\frac{1-\sin\phi}{2}\right)}{\left(\frac{1+\sin\phi}{2}\right)+\left(\frac{1-\sin\phi}{2}\right)} = \sin\phi, \quad (9)$$

$$\phi = \sin^{-1}(R_{NV}(\phi)), \quad (10)$$

or combining Equation 10 with Equation 6:

$$\hat{\phi} = \sin^{-1}\left(\frac{D_N - D_S}{D_N + D_S}\right). \quad (11)$$

Recall that the estimator element implements a function $F(\{v_P\}|_{\forall P})$ that produces an AoA estimate given all the signals output by the isolation element. In this simplest case, with only a single DPA, the signal processor implements a function F that generates an estimated AoA in an arbitrarily-oriented plane containing the two ports of the DPA, from the received signals, i.e. $\hat{\phi}=F(v_N(t), v_S(t))$. In this case, the function F uses Equations 5 and then Equation 11 to estimate the AoA.

In alternate embodiments, instead of using an inverse sine (i.e. arcsine) to determine the AoA (i.e. $\hat{\phi}$), a lookup table could be used. Such a table could deviate from an inverse cosine to correct for other factors, such as local reflections, and thereby enhance the accuracy of $\hat{\phi}$.

This single DPA embodiment is useful when it is known that targets can only appear in a sector on one side of the DPA and in a known plane containing the two DPA ports. For example, when it is know that the SoI will always be within +/−50 degrees of east and on the ground (i.e. at an elevation angle of zero), then a single north-south oriented DPA is the simplest embodiment.

Since the DPA pattern is symmetric about its axis, the ports on a north-south oriented DPA respond identically to an incident field x-degrees east and x-degrees west relative to north. This ambiguity is resolved by either a priori knowledge, turning the antenna and taking multiple measurements, or by having additional antenna ports that allow the correct side to be determined. The additional antenna ports could be another DPA that is orthogonally oriented (in this case, oriented east-west) Similarly, a QPA or 12-PA could be used, as they provide the ports necessary to resolve the ambiguity inherent in a simple pair of ports. With a pair of DPAs or a QPA, the function $\hat{\phi}=F(\{v_P\}|_{\forall P})$ becomes $\hat{\phi}=F(v_N(t), v_S(t), v_E(t), v_W(t))$ and can be computed as:

$$\hat{\phi} = \begin{cases} \sin^{-1}(R_{NV}(\phi)) & \begin{matrix}\text{when } D_S > D_N \text{ and } -90 \le \phi \le 0 \\ \text{when } D_N > D_S \text{ and } 0 \le \phi \le 90\end{matrix} \Big\} D_E > D_W \\ 180 - \sin^{-1}(R_{NV}(\phi)) & \begin{matrix}\text{when } D_N > D_S \text{ and } 90 \le \phi \le 180 \\ \text{when } D_S > D_N \text{ and } 180 \le \phi \le 270\end{matrix} \Big\} D_W > D_E \end{cases}, \quad (12)$$

or as:

$$\hat{\phi} = \begin{cases} \cos^{-1}(R_{EV}(\phi)) & \begin{matrix}\text{when } D_E > D_W \text{ and } 0 \le \phi \le 90 \\ \text{when } D_W > D_E \text{ and } 90 \le \phi \le 180\end{matrix} \Big\} D_N > D_S \\ -\cos^{-1}(R_{EV}(\phi)) & \begin{matrix}\text{when } D_W > D_E \text{ and } -180 \le \phi \le -90 \\ \text{when } D_E > D_W \text{ and } -90 \le \phi \le 0\end{matrix} \Big\} D_S > D_N \end{cases}, \quad (13)$$

or as:

$$\hat{\phi} = \arctan\left(\frac{R_{NV}}{R_{EV}}\right) = a\tan2(R_{EV}, R_{NV}) = a\tan2\left(\frac{D_E - D_W}{D_E + D_W}, \frac{D_N - D_S}{D_N + D_S}\right), \quad (14)$$

where a tan 2 is the standard 4-quadrant arc-tangent function built into many computer languages such as Fortran, Matlab, and Mathcad.

Compute and Table Methods to Generate an AoA Estimate

The function F can be made many ways depending on the needs of the application. For minimum complexity, it can be made with a lookup table. For example, suppose the antenna system uses three orthogonal QPAs. In this case, $(R_{NV}, R_{EV})$, $(R_{EH}, R_{UN})$, and $(R_{NH}, R_{UE})$ should be measured. These six terms are simply extensions obtained by rotating the polarization of the $R_{NV}$, $R_{EV}$, or $R_{UN}$ functions shown in Equations 6, 7, and 8. Relative to an axis of the antenna system, the lookup table could list in its first three columns respectively, an azimuthal angle, an elevation angle, and a polarization angle. Corresponding to these angles, in the remaining columns, it could list any number of expected measurement metrics derived from the ports in the antenna system. For example, six ratio measures (e.g. $\tilde{R}_{NV}$ $\tilde{R}_{EV}$ $\tilde{R}_{EH}$ $\tilde{R}_{UN}$ $\tilde{R}_{NH}$ $\tilde{R}_{UE}$—one for each port pair), or the sums and differences they are based on, or the port SoI levels, could be placed in columns four and up in the table. Here, the superscript ~ in the $\tilde{R}_{NV}$, $\tilde{R}_{EV}$, etc. indicates it is a value that is expected based on a calibration. The calibration would measure theses values for emitters at known angles and polarizations. Calibration measurements incorporate disturbances from objects near the antenna system, allowing the RF emitter sensing system to be accurate even with those disturbances. By virtue of these calibration values, the table captures an accurate mapping between measured values, and estimated angles (azimuth, elevation, and polarization) associated with the SoI.

The RF emitter sensing system measures the SoI from the twelve ports associated with the three QPAs, and in some disclosed embodiments applies corrections to mitigate construction tolerances, applies corrections to mitigate homogeneous environmental noise, and thereby generates a set of calibrated measurements ($R_{NV}$, $R_{EV}$), ($R_{EH}$, $R_{UN}$) and ($R_{NH}$, $R_{UE}$).

For each row in the table, the processor computes an error-value $\epsilon$ such as:

$$\epsilon = (\tilde{R}_{NV} - R_{NV})^2 + (\tilde{R}_H - R_{EH})^2 + (\tilde{R}_{UE} - R_{UE})^2 + (\tilde{R}_{NH} - R_{NH})^2 + (\tilde{R}_{EV} - R_{EV})^2 + (\tilde{R}_{UN} - R_{UN})^2,$$

or:

$$\varepsilon = |a\tan 2(\tilde{R}_{EV}, \tilde{R}_{NV}) - a\tan 2(R_{EV}, R_{NV})| + |a\tan 2(\tilde{R}_{EH}, \tilde{R}_{UN}) - a\tan 2(R_{EH}, R_{UN})| + |a\tan 2(\tilde{R}_{NH}, \tilde{R}_{UE}) - a\tan 2(R_{NH}, R_{UE})|.$$

Given this error metric, the processor, or an operator, would find the row having the minimum error $\epsilon$, and the estimates for the azimuth, elevation, and polarization would be provided in the first three columns of that row. For some applications, in particular environments where significant anomalies occur, additional parameters, such as $$1 - \frac{D_{EV} + D_{WV}}{D_{NV} + D_{SV}}, \text{ and } 1 - \frac{D_{UE} + D_{DE}}{D_{NH} + D_{SH}} \text{ and } 1 - \frac{D_{UN} - D_{DN}}{D_{EH} + D_{WH}}$$

can be used. By determining whether or not they are close to zero, or significantly above or below zero the system can use these values to modify the equations or table columns used for estimation, or to alert the operator that less trust should be placed on the output.

Alternatively, in certain angular ranges, the values placed in the first three columns can be "special numbers" that indicate that a particular alternative table be used. It can sometimes be advantageous to have multiple tables, with particular tables designed for particular angular ranges. Having multiple tables can reduce memory requirements and facilitate usage of different error function formulations in different angular ranges such as error functions that use different port combinations or metrics for different angular ranges. These features can makes them useful for antenna systems with a large number of ports, or where special rules are needed to mitigate ambiguities in particular angular ranges—for example, ambiguities caused by interference from local objects. If desired, one could break down the angle space into an arbitrary number of pieces so a different curve or equation could be used for each one.

An equation-based approach can easily be substituted for the above table-based implementation by using standard curve fitting methods. Each output angle in a table, can use an interpolating curve fitting function to allow the angle to be found directly from the set of parameters used in the table.

Discontinuous Integration

The integration duration shown in Equation 5 covers a single contiguous interval and is appropriate for many applications. In other applications, such as when the signal sometimes disappears or is blanked to avoid a burst of interference, an alternative embodiment could perform this integral incrementally over a plurality of time segments that may not be contiguous with each other. An example is shown in Equation 15, where there are J time-segments:

Let P∈{the ports in the antenna system, e.g. NV, SV, EV, WV, NH, DH, UE, DE, etc.}

Let j∈{1, 2, ... J}

Let i∈{1, 2, ... J}

Let $\psi_i = \{(t_{ai}, t_{bi})\}$ where $(t_{ai}, t_{bi})$ are start and stop times, if discrete, start and stop indexes Let $T_i = t_{bi} - t_{ai}$ where this is the time interval, if discrete, the number of sample intervals $$\text{Let } \tau_j = \sum_{i=1}^{j} T_i$$

If continuous, use the integrals below, if discrete, use the summations below:

$$\text{Let } \beta_{i,P}(\psi_i) = \int_{t_{ai}}^{t_{bi}} v_P^2(\tau) d\tau \text{ or}$$ (15)

$$= \frac{v^2(t_{bi}) + v^2(t_{ai})}{2} + \sum_{k=1}^{T_i - 1} v_P^2(t_{ai} + k)$$

$$\text{Let } D_P(\tau_j) = \frac{1}{\tau_j} \sum_{i=1}^{j} \beta_{i,P}(\psi_i)$$

$$\text{Let } \beta'_{i,j,P}(\psi_i) = \int_{t_{ai}}^{t_{bi}} (v_P(\tau) - D_{j,P})^2 d\tau \text{ or}$$

$$= \frac{(v(t_{bi}) - D_{j,P})^2 + (v(t_{ai}) - D_{j,P})^2}{2} + \sum_{k=1}^{T_i - 1} (v_P(t_{ai} + k) - D_{j,P})^2$$

$$\text{Let } \sigma_P^2(\tau_j) = \frac{1}{\tau_j} \sum_{i=1}^{j} \beta'_{i,j,P}(\psi_i)$$

where the set $\psi$ of J arbitrary time intervals allows the integration to skip increments of time that are advantageous to skip. For example, at times with high interference, it can be advantageous to effectively "blank" and not use the received signal. In fact, the isolation element might blank the signal in such circumstances. In this case, part of its output would inform the estimation element when the SoI is blanked so that the estimator could respond appropriately. Equation 15 is shown broken down to highlight how the processor can incrementally integrate the SoI over J different time intervals defined by $\psi$. If further shows the computation of an incremental estimate of the variance $\sigma^2$ at the $i^{th}$ step. When the signal is digitized and known at discrete points in time, the summation formulations can be used rather than the continuous time integrals that are useful for analog forms of processing.

In some embodiments, the integration times can be adaptive, such as responding to blanking intervals caused by adaptive blankers that may be operating in the isolation element. For other applications, an embodiment may set the integration time to a fixed value at the factory. Other applications prefer an embodiment that allows the integration time to be set by the operator.

Alternatively, to provide a desired variance level corresponding to a desired AoA estimation accuracy, an embodiment can track the variance as the integration proceeds and automatically adjust the total integration interval. For example, the variance can be compared to a threshold such that the next increment in J only occurs if the variance is too high.

Coherent Unbiased Method of Estimating AoA

In practice, the voltages at the output of the receiver are corrupted by noise. Breaking out the SoI and noise terms separately, the estimated SoI power level from Equation 5 becomes:

$$D_N(t, T) = \frac{1}{T}\int_{t-\frac{T}{2}}^{t+\frac{T}{2}}(v_{SoI_N}(\tau) + n_N(\tau))^2 d\tau \text{ and } D_S(t, T) = \frac{1}{T}\int_{t-\frac{T}{2}}^{t+\frac{T}{2}}(v_{SoI_S}(\tau) + n_S(\tau))^2 d\tau. \quad (16)$$

Since $(v_{SoI_N}(\tau)+n_N(\tau))^2 = (v_{SoI_N}^2(\tau)+2v_{SoI_N}(\tau)n_N(\tau)+n_N^2(\tau))$ and $E[f2v_{SoI_N}(\tau)]=0$, equation 16 becomes $$D_N(t, T) = \frac{1}{T}\int_{t-\frac{T}{2}}^{t+\frac{T}{2}}(v_{SoI_N}^2(\tau) + n_N^2(\tau))d\tau \text{ and } D_S(t, T) = \frac{1}{T}\int_{t-\frac{T}{2}}^{t+\frac{T}{2}}(v_{SoI_S}^2(\tau) + n_S^2(\tau))d\tau. \quad (17)$$

It is clear from Equation 17 that each result is biased by its squared noise term. Therefore, this non-coherent embodiment works best when the SoI level is much higher than the receiver and background noise level. Clearly it would be desirable to eliminate this bias.

A slightly more complex embodiment uses a minimum of three antenna ports and a coherent-SoI-estimation method. In this case, one or more of the ports serves as a coherent reference containing the SoI. The coherent reference voltage is notated as $v_R(t)$. Both ports of any particular DPA are correlated with a common reference that is independent from that DPA.

There are multiple ways to create an effective $v_R(t)$. In some embodiments, for any set of antenna ports available to use as a reference, the port with the strongest SoI is used. For applications needing the lowest complexity, this single port reference embodiment is often preferred. For higher accuracy, at the expense of complexity, multiple ports can be combined to produce a reference with a higher signal-to-noise ratio (SNR). Multiple combining methods that trade performance for complexity exist in the literature. For example, one preferred embodiment applies classic maximum ratio combining (MRC) across the set of ports available for use as a reference.

The core principle is that the coherent-SoI-estimation method estimates the RMS SoI level at each port without the above noise bias term, and thereby improves the accuracy of the AoA estimate.

The coherent-energy-estimation method estimates the SoI power level using coherent integration as follows:

$$D_N(t, T) = \frac{1}{T}\int_{t-\frac{T}{2}}^{t+\frac{T}{2}}v_N(\tau)v_R(\tau)d\tau \text{ and } D_S(t, T) = \frac{1}{T}\int_{t-\frac{T}{2}}^{t+\frac{T}{2}}v_S(\tau)v_R(\tau)d\tau. \quad (18)$$

For clarity, sometimes two subscripts are used on the D metric so that both the port being measured (the first subscript) and the port used as the reference (the second subscript) are identified by the respective subscripts. In this case, Equation 18 is written as:

$$D_{NR}(t, T) = \frac{1}{T}\int_{t-\frac{T}{2}}^{t+\frac{T}{2}}v_N(\tau)v_R(\tau)d\tau \text{ and } D_{SR}(t, T) = \frac{1}{T}\int_{t-\frac{T}{2}}^{t+\frac{T}{2}}v_S(\tau)v_R(\tau)d\tau. \quad (19)$$

Expanding to show the noise terms produces:

$$v_N(\tau)v_R(\tau) = (v_{SoI_N}(\tau) + n_N(\tau))(v_{SoI_R}(\tau) + n_R(\tau)) \quad (20)$$

$$= v_{SoI_N}(\tau)v_{SoI_R}(\tau) + v_{SoI_N}(\tau)n_R(\tau) +$$

$$v_{SoI_R}(\tau)n_N(\tau) + n_N(\tau)n_R(\tau).$$

where $v_{SoI_N}(\tau)$ is the SoI component of the port-N receiver output voltage, $n_N(\tau)$ is the noise component of the port-N receiver output voltage, $v_{SoI_R}(\tau)$ and $n_R(\tau)$ are the SoI and noise components, respectively, of the reference (port-R) representing either a receiver output voltage, or a combination of port voltages.

Assuming the noise component is the receiver noise and not atmospheric noise, the expected values for the integration of all the cross terms are zero, i.e.:

$$E[\int v_{SoI_N}(\tau)n_R(\tau)d\tau]=0, E[\int v_{SoI_R}(\tau)n_N(\tau)d\tau]=0, \text{ and }$$
$$E[\int n_N(\tau)n_R(\tau)d\tau]=0 \quad (21)$$

the SoI RMS level estimates become:

$$D_{NR}(t, T) = \frac{1}{T}\int_{t-\frac{T}{2}}^{t+\frac{T}{2}}v_{SoI_N}(\tau)v_{SoI_r}(\tau)d\tau \text{ and } \quad (22)$$

$$D_{SR}(t, T) = \frac{1}{T}\int_{t-\frac{T}{2}}^{t+\frac{T}{2}}v_{SoI_S}(\tau)v_{SoI_R}(\tau)d\tau$$

showing that an SoI power measure is provided with no bias from receiver noise.

By incorporating this coherent integration method, an embodiment can obtain accurate AoA estimates on a signal so small that it is below the noise floor of a receiver optimized to demodulate the signal. This "sensitivity below the noise floor" feature is important for many applications. It allows a small portable radio with its inherently small insensitive antennas to be hand carried around to search for a signal that, while large enough to interfere with a sensitive system using a large well placed antenna, is too small for the RF emitter sensing system to demodulate and "hear" the information, such as music, speech, or data.

For clarity, an example of using MRC (maximum ratio combining) on two ports to provide a higher SNR reference signal follows. Suppose the RF emitter sensing system uses a north/south oriented DPA ($DPA_{NS}$) and an east/west oriented DPA ($DPA_{EW}$). Equation 22 is used to compute all the cross correlations, $D_{NE}$, $D_{SE}$, $D_{NW}$, $D_{SW}$. We find the maximum magnitude of these and identify which term it is, so suppose $|D_{NE}|=\max(|D_{NE}|, |D_{SE}|, |D_{NW}|, |D_{SW}|)$. This outcome would mean, for a single port reference, we would use the E port as the reference for the $DPA_{NS}$, and we would use the N port as the reference for the $DPA_{EW}$. Instead, we can combine the E and W ports to make a better SNR reference to use with $DPA_{NS}$, and similarly combine the N and S ports to make a better reference to use with the $DPA_{EW}$. Since the integration in Equation 22 is communicative, we can combine the terms used in the reference signal before or after the integration. We will take advantage of this fact and perform the combination after integration. Note also that $D_{XY}=D_{YX}$. The combining may be done by weighting and summing the port voltages, or by weighting and summing the E and H field components.

The process for using the port voltages directly starts with creating the weighted sum. Using $DPA_{NS}$ as the source of the reference signal, we have $D_{ER}=a \cdot D_{EN}+b \cdot D_{ES}$, and $D_{WR}=a \cdot D_{WN}+b \cdot D_{WS}$ (23)

and we need to find the weights a and b. When $|D_{EN}|>|D_{ES}|$ the normalized weights for MRC are $a=D_{EN}^2/(D_{EN}^2+D_{ES}^2)$, $b=D_{EN} \cdot D_{ES}/(D_{EN}^2+D_{ES}^2)$. Since scaling is not important in this application, the computation can be simplified to $a=1$, $b=D_{ES}/D_{EN}$ or $a=D_{EN}$, $b=D_{ES}$. When $|D_{ES}|>|D_{EN}|$ the weights for MRC are the normalized weights for MRC are $a=D_{EN} \cdot D_{ES}/(D_{ES}^2-D_{ES}^2)$, $b=D_{ES}^2/(D_{EN}^2+D_{ES}^2)$. Again, since scaling is not important in this application, this computation can be simplified to $a=D_{EN}/D_{ES}$, $b=1$ or $a=D_{EN}$, $b=D_{ES}$. The a and b weights are applied to Equation 23 to generate the higher SNR $D_{ER}$, and $D_{WR}$ terms used in finding the AoA. This same process is followed to compute $D_{NR}$, and $D_{SR}$ with $DPA_{EW}$ providing the reference signal. While illustrating the process for two ports for clarity, MRC allows any number of ports to be combined to improve the SNR and one skilled in the art should be able to apply MRC weighting to any number of ports.

Given the same scenario with $D_{NE}$ the largest term, the process for weighting and combining the EM field components starts by separating the EM components. Again, starting with $DPA_{NS}$ to supply the reference signal, and using the East port $DPA_{EW}$ since it produced the highest magnitude, the E-field term is $e_{ENS}=(D_{NE}+D_{SE})/2$ and the H-field term is $h_{ENS}=(D_{NE}-D_{SE})/2$. We want to weight and recombine these as $D_{ER}=a(D_{NE}+D_{SE})/2+b(D_{NE}-D_{SE})/2=a \cdot e_{ENS}+b \cdot h_{ENS}$, and $D_{WR}=a(D_{NW}+D_{SW})/2+b(D_{NW}-D_{SW})/2$. (24)

When $|e_{ENS}|>|h_{ENS}|$, the simplified un-normalized weights for MRC are $a=1$, $b=h_{ENS}/e_{ENS}$. When $|h_{ENS}|>|e_{ENS}|$, the simplified un-normalized weights for MRC are $a=e_{ENS}/h_{ENS}$, $b=1$. With these coefficients established for $DPA_{NS}$, the a and b weights are applied to Equation 24 to generate the higher SNR $D_{ER}$, and $D_{WR}$ terms used in finding the AoA. This same process is followed to compute $D_{NR}$, and $D_{SR}$ with the ports of $DPA_{EW}$ combined to provide the reference signal. While illustrating the process for two ports for clarity, MRC allows any number of ports to be combined to improve the SNR and one skilled in the art should be able to extend the application of MRC weighting to any number of ports.

Discontinuous Coherent Integration

The coherent integration shown in Equation 22 can use a non-continuous set of time intervals that follows the same outline as used in Equation 5, but with a coherent, instead of incoherent, integrand, as shown in Equation 15.

Let P∈{the ports in the antenna system}
Let j∈{1, 2, . . . J}
Let i∈{1, 2, . . . J}
Let $\psi_i=\{(t_{ai}, t_{bi})\}$ where $(t_{ai}, t_{bi})$ are start & stop times, or if discrete, start & stop indexes
Let $T_i=t_{bi}-t_{ai}$=the time interval, or if discrete, the number of sample intervals $$\text{Let } \tau_j = \sum_{i=1}^{j} T_i$$

If continuous, use the integral, if discrete, use the summation:

$$\text{Let } \beta_{i,P}(\psi_i) = \int_{t_{ai}}^{t_{bi}} v_P(\tau) v_R(\tau) d\tau \text{ or} \quad (25)$$

$$= \frac{v_P(t_{bi}) v_R(t_{bi}) + v_P(t_{ai}) v_R(t_{ai})}{2} +$$

$$\sum_{k=1}^{T_i-1} v_P(t_{ai}+k) v_R(t_{ai}+k)$$

$$\text{Let } D_P(\tau_j) = \left(\frac{1}{\tau_j} \sum_{i=1}^{j} \beta_{i,P}(\psi_i)\right)^2$$

$$\text{Let } \beta'_{i,j,P}(\psi_i) = \int_{t_{ai}}^{t_{bi}} \left(v_P(\tau) v_R(\tau) - \sqrt{D_P(\tau_j)}\right)^2 dt \text{ or}$$

$$= \frac{\left(v_P(t_{bi}) v_R(t_{bi}) - \sqrt{D_P(\tau_j)}\right)^2 +}{2} +$$

$$\frac{\left(v_P(t_{ai}) v_R(t_{ai}) - \sqrt{D_P(\tau_j)}\right)^2}{2} +$$

$$\sum_{k=1}^{T_i-1} \left(v_P(t_{ai}+k) v_R(t_{ai}+k) - \sqrt{D_P(\tau_j)}\right)^2$$

$$\text{Let } \sigma_P^2(\tau_j) = \frac{1}{\tau_j} \sum_{i=1}^{j} \beta'_{i,j,P}(\psi_i)$$

where the set $\psi$, contains J arbitrary time intervals, allowing the integration to skip increments of time that are advantageous to skip. It further shows the computation of an incremental estimate of the variance $\sigma_j^2$ at the $j^{th}$ step. When the signal is digitized and known at discrete points in time, the summation formulations are used rather than the continuous time integrals that are useful for analog forms of processing.

A signal processor in the estimator element implements a function F that includes this additional reference signal so that $\hat{\varphi}=F_\varphi(v_N(t), v_S(t), v_R(t))$ and $\hat{\theta}=F_\theta(v_N(t), v_S(t), v_R(t))$. Some embodiments of function F, which provide the best sensitivity and accuracy, use this coherent-energy-estimation method to make the AoA estimate unbiased to receiver noise.

A similar embodiment uses the same three antenna ports but the isolation element only has two channels and uses switches to connect two antenna-system ports at a time to the two channels. In this case, while one channel isolates the SoI in the reference signal, the other channel is switched to alternately isolate the SoI in the north or the SoI in the south port. In this case, $v_N v_R$ is measured in one time interval and $v_S v_R$ is measured in an alternate time interval. As long as the RMS SoI level remains fixed in the alternate intervals, the AoA estimate is the same. This two-receiver embodiment is preferred when low power is a high priority and the SoI meets this "fixed level across alternate intervals" requirement. FM and digital signals typically work well with this embodiment. FIG. 14 uses this two-receiver technique to cover a 14 port antenna-system.

Starting with the embodiment where the antenna-system is a single DPA, a slightly more complex embodiment adds a second DPA that is nominally oriented orthogonally to the first DPA. For example, if the first DPA was north-south oriented, this second DPA would be nominally east-west or up-down oriented. Together, the two DPAs provide the RF emitter sensing system with 4 ports aimed nominally every 90 degrees, for example, north, east, south and west (N, E, S, W, or 90, 0, −90, and 180 degrees), where $v_N(t)$, $v_S(t)$, $v_E(t)$, $v_W(t)$ are the voltages at the output of the isolation element connected to the antenna-system's north, south, east, and west ports respectively.

Removing Homogeneous Sky and Atmospheric Noise Using an Extra Port

Assuming that there is homogeneous atmospheric and sky and background noise being picked up by the antennas, and that this noise has homogeneous coherence from port to port, then there is an additional noise term, which can be called $n_{sky}(t)$. In other words, Equation 22 would become:

$$D_{NR}(t, T) = \frac{1}{T}\int_{t-\frac{T}{2}}^{t+\frac{T}{2}} (v_{SoI_N}(\tau) + n_{sky_N})(v_{SoI_R}(\tau) + n_{sky_R})d\tau \quad (26)$$

$$D_{NR}(t, T) =$$

$$\frac{1}{T}\int_{t-\frac{T}{2}}^{t+\frac{T}{2}} v_{SoI_N}(\tau)v_{SoI_R}(\tau)d\tau + \frac{1}{T}\int_{t-\frac{T}{2}}^{t+\frac{T}{2}} n_{sky_N}(\tau)n_{sky_R}(\tau)d\tau =$$

$$s_N s_R + n_{sky_N} n_{sky_R} = s_N s_R + n_{sky}^2$$

where $s_N$ and $s_R$ are the RMS voltage levels of the SoI at the N and R ports.

In this case, assuming that the E-port SoI is stronger than the W-port, so that the E-port is used for the reference, $R_{NV}$ becomes:

$$R_{NV} = \frac{D_{NE} - D_{SE}}{D_{NE} + D_{SE}} = \frac{(s_N s_E + n_{sky}^2) - (s_S s_E + n_{sky}^2)}{(s_N s_E + n_{sky}^2) + (s_S s_E + n_{sky}^2)} = \quad (27)$$

$$\frac{s_N s_E - s_S s_E}{s_N s_E + s_S s_E + 2n_{sky}^2} = \frac{s_E(s_N - s_S)}{s_E(s_N + s_S) + 2n_{sky}^2}.$$

Similarly, if the N port is used for the reference, $R_{EW}$ becomes:

$$R_{EV} = \frac{D_{EN} - D_{WN}}{D_{EN} + D_{WN}} = \frac{(s_E s_W + n_{sky}^2) - (s_W s_N + n_{sky}^2)}{(s_E s_W + n_{sky}^2) + (s_W s_N + n_{sky}^2)} = \quad (28)$$

$$\frac{s_E s_N - s_W s_N}{s_E s_N + s_W s_N + 2n_{sky}^2} = \frac{s_N(s_E - s_W)}{s_N(s_E + s_W) + 2n_{sky}^2}.$$

As long as the sky-noise term is relatively small, relative to the SoI, the reference signal cancels.

In addition to eliminating AoA estimation bias due to noise in the receivers, it would be advantageous to also remove AoA estimation bias due to homogeneous noise picked up by the antennas. Some embodiments do this as follows.

In an embodiment with at least one more port, any four ports can use the fifth port as the coherent reference for the four ports. When used this way the sky-noise term cancels in the argument for the arctangent function, and the AoA estimate becomes unbiased relative to homogeneous noise. This fact is illustrated, or explained by example, as follows. Substituting a common reference channel in the construction of Equations 27 and 28, causes them to become:

$$R_{NV} = \frac{D_{NR} - D_{SR}}{D_{NR} + D_{SR}} = \frac{(s_N s_R + n_{sky}^2) - (s_S s_R + n_{sky}^2)}{(s_N s_R + n_{sky}^2) + (s_S s_R + n_{sky}^2)} = \quad (29)$$

$$\frac{s_N s_R - s_S s_R}{s_N s_R + s_S s_R + 2n_{sky}^2} = \frac{s_R(s_N - s_S)}{s_R(s_N + s_S) + 2n_{sky}^2},$$

and:

$$R_{EV} = \frac{D_{ER} - D_{WR}}{D_{ER} + D_{WR}} = \frac{(s_E s_R + n_{sky}^2) - (s_W s_R + n_{sky}^2)}{(s_E s_R + n_{sky}^2) + (s_W s_R + n_{sky}^2)} = \quad (30)$$

$$\frac{s_E s_R - s_W s_R}{s_E s_R + s_W s_R + 2n_{sky}^2} = \frac{s_R(s_E - s_W)}{s_R(s_E + s_W) + 2n_{sky}^2},$$

and the arctangent argument becomes:

$$\frac{R_{NV}}{R_{EV}} = \frac{s_R(s_N - s_S)}{s_R(s_E - s_W)} \cdot \frac{s_R(s_E + s_W) + 2n_{sky}^2}{s_R(s_N + s_S) + 2n_{sky}^2} = \frac{s_R(s_N - s_S)}{s_R(s_E - s_W)} = \frac{s_N - s_S}{s_E - s_W}, \quad (31)$$

because $s_N+s_S=s_E+s_W$ since $s_N+s_S$ and $s_E+s_W$ are the same E-field.

Removing Homogeneous Sky and Atmospheric Noise without an Extra Port

Removing Homogeneous Sky and Atmospheric Noise without an Extra Port

In an embodiment with just the four ports, it is still possible to generate an AoA estimate that is unbiased to homogeneous noise as follows. Since $\sin^2 x + \cos^2 x = 1$ the preferred embodiment estimates the sky noise term $2n_{sky}^2$ by using a function $\xi = \Phi(A,B,C,D)$ that solves:

$$\left(\frac{D_{NE} - D_{SE}}{D_{NE} + D_{SE} - \xi}\right)^2 + \left(\frac{D_{EN} - D_{WN}}{D_{EN} + D_{WN} - \xi}\right)^2 = \left(\frac{A}{B - \xi}\right)^2 + \left(\frac{C}{D - \xi}\right)^2 = 1 \quad (32)$$

where $A=D_{NE}-D_{SE}$, $B=D_{NE}+D_{SE}$, $C=D_{EN}-D_{WN}$, and $D=D_{EN}+D_{WN}$.

One solution for the function $\Phi(A,B,C,D)$ is:

$$\Phi(A, B, C, D) = \text{Re}\left[\frac{B}{2} + \frac{D}{2} - \sqrt{\frac{F}{6} + \frac{H}{4} + \frac{I}{144}} - \sqrt{\frac{F}{3} - \frac{H}{4} - \frac{I}{144} - \frac{3E}{\sqrt{I + 36H + 24F}}}\right], \quad (33)$$

where:

$$E = A^2B - BC^2 - A^2D + C^2D,$$

$$F = A^2 + B^2/2 - BD + C^2 + D^2/2,$$

$$G = (B - D)^2(4A^2 - B^2 + 2BD + 4C^2 - D^2),$$

$$H = \sqrt[3]{\sqrt{3(432E^4 - 64E^2F^3 + G(16F^4 - 144E^2F) + 8F^2G^2 + G^3)}/72 + E^2/2 - F^3/27 + G(2BD - 2A^2 - B^2 - 2C^2 - D^2)/24},$$

and $$I = \begin{cases} (4F^2 - 3G)/H & \text{if } H \neq 0 \\ 0 & \text{if } H = 0 \end{cases}.$$

Given the solution $\xi = \Phi(A,B,C,D)$ in Equation 33, substituting for Equations 27 and 28 produces the following:

$$R_{NV} = \frac{A}{B - \xi} = \frac{D_{NE} - D_{SE}}{D_{NE} + D_{SE} - \xi} = \frac{s_E(s_N - s_S)}{s_E(s_N + s_S) + 2n_{sky}^2 - \xi} = \frac{s_E(s_N - s_S)}{s_E(s_N + s_S)} = \frac{s_N - s_S}{s_N + s_S}, \quad (34)$$

and:

$$R_{EV} = \frac{C}{D - \xi} = \frac{D_{EN} - D_{WN}}{D_{EN} + D_{WN} - \xi} = \frac{s_N(s_E - s_W)}{s_N(s_E + s_W) + 2n_{sky}^2 - \xi} = \frac{s_N(s_E - s_W)}{s_N(s_E + s_W)} = \frac{s_E - s_W}{s_E + s_W}, \quad (35)$$

and the function F to estimate the AoA, in the preferred embodiment, becomes $$\hat{\phi} = F(v_N(t), v_S(t), v_E(t), v_W(t)) = \arctan\left(\frac{R_{NV}}{R_{EV}}\right) = \text{atan2}(R_{EV}, R_{NV}). \quad (36)$$

In this embodiment, $R_{NV}$ and $R_{EV}$ from Equations 34 and 35 have taken advantage of (a) coherent integration to eliminate bias from self-noise and allow long integration times with high gain on the SNR, (b) a function $\Phi(A,B,C,D)$ to remove homogeneous noise picked up by the antennas, and (c) a ratio-based function, in this case an arctangent, to provide an AoA estimate that is unbiased with respect to both the noise in the receiver as well as the homogeneous noise picked up by the antennas. Since the reference signal cancels in the ratio, the beam pattern of the reference also cancels, and all that is left is the desired SoI sum and difference ratio. Since this ratio is independent of the SoI power level, an accurate angle estimate is provided that is robust to signal level changes.

In order to correct for anomalies caused by local objects that scatter the incoming wave, instead of using the a tan 2 function, the function F could be configured to also use an approximation to the arcsine of $R_{NS}$, the arccosine of $R_{EW}$, and/or lookup tables, as discussed above, based on calibration measurements. In this way, enhanced accuracy can be achieved even in the context of anomalies.

This method of removing homogeneous noise can be applied to other sets of antennas that can be combined to generate four orthogonal (e.g. 0, 90, 180, 270 degrees) unidirectional beams with a pattern that is nominally a raised cosine function. For example, take a first case where the output of a dipole and a loop are properly scaled so they can be summed to produce a first output that is unidirectional, and subtracted to produce a second output that is unidirectional, where the two beams aim in opposite directions. With a second loop oriented 90 degrees relative to the first loop, another beam-pair of oppositely aimed beams could be made that are orthogonal to the first beam-pair. Similarly, take a second case where a pair of dipoles is combined to produce a first output that is unidirectional, and a second output that is unidirectional, where the two beams aim in opposite directions. For this case, to illustrated, assume a pair of dipoles or a pair of loops displaced along the x-axis at (x,y) of ($-\lambda/20,0$), and ($\lambda/20,0$). The signal on ($-\lambda/20,0$) could be delayed by $\lambda/10$ and subtracted from the signal at ($\lambda/20,0$) to create a first pattern with a null in the -x direction and a beam in the +x direction. The signal on ($\lambda/20,0$) could be delayed by $\lambda/10$ and subtracted from the signal at ($\lambda/20,0$) to create a second pattern with a null in the +x direction and a beam in the -x direction. By adding another set of antennas displaced along the y-axis, at ($0,-\lambda/20$), and ($0,\lambda/20$) and doing a similar combinations, another beam-pair can be made in the +y and -y direction—orthogonal to the first beam-pair. In both the first case and the second case, the same procedure can be used to find and use a function to estimate the homogeneous noise being picked up by the set of antennas and remove its affect.

Correcting for Non-Ideal Cardioid

The previous equations were idealized and assumed a perfect back-to-front ratio of zero. Due to finite construction tolerances, any element's size, shape, position, and termination network impedance, and loss, for either a PxMA element, or a loop and dipole combination, the realized front-to-back ratio is typically not perfect. In practice, however, the estimator element can incorporate a correction for this non-ideal back-to-front ratio, thus mitigating its deleterious effect. An important feature of this calibration is that it allows the termination impedance on the PxMA elements such as the DPA, QPA, HPA, and DHPA to drive amplifiers and circuits that may not be ideal, yet still provide high directivity to arbitrarily low frequency. The antenna pattern can be corrected by measuring and estimating the back-to-front ratio term $\epsilon(\lambda)$ during calibration, and using this term during operations to remove the error. In this case, the measured patterns are become:

$$v_N = a\frac{1 + (1 - 2\epsilon(\lambda))\cos\phi}{2}, \text{ and } v_S = a\frac{1 - (1 - 2\epsilon(\lambda))\cos\phi}{2}. \quad (37)$$

Figure 16:
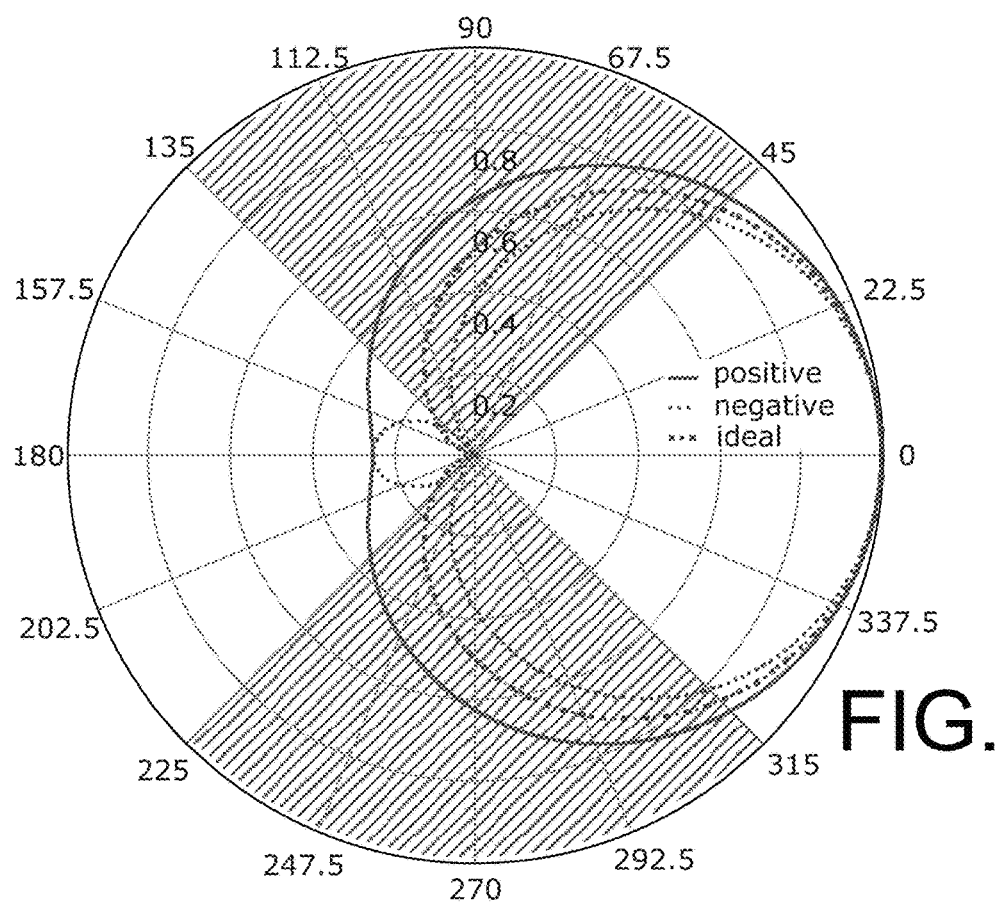
FIG. 16 illustrates magnitude patterns when $\epsilon(\lambda)$ is positive, negative, or ideal, where $\epsilon(\lambda)$ represents an imbalance between the electric dipole moment and the magnetic dipole moment, or an error caused by a phase shift due to operating the DPA at a high frequency.

Based on measured antenna patterns for these two ports, a curve fit is performed to estimate the $\epsilon(\lambda)$ term, calling it $\hat{\epsilon}(\lambda)$. The sign of $\epsilon(\lambda)$ is negative if the back-lobe voltage is inverted relative to the boresight voltage. FIG. 16 illustrates magnitude patterns when $\epsilon(\lambda)$ is positive, negative, or ideal. Given $\hat{\epsilon}(\lambda)$, a correction factor $$k(\lambda) = \frac{1}{(1 - 2\hat{\epsilon}(\lambda))}$$

is computed. This correction factor can be determined at the time of manufacture or in the field after measuring the antenna pattern.

This correction factor can be applied to the antenna outputs but is more typically applied to the output of the isolation element. The application is done as follows. For each DPA, the sum of the port voltages provides a measure of just the electric field component $v_{NSE}$. (This electric field component would simply be the dipole port voltage if a loop and a dipole were used to sense the EM field.):

$$v_{NSE} = v_N + v_S = a\left(\frac{1 + (1 - 2\varepsilon(\lambda))\cos\phi}{2} + \frac{1 - (1 - 2\varepsilon(\lambda))\cos\phi}{2}\right) = a. \quad (38)$$

The difference of the port voltages provides a measure of the magnetic field component (which would simply be the loop's port voltage if a dipole and loop were used to sense the EM field), where the normalized magnetic field component $v_{NSM}$ is:

$$v_{NSM} = \qquad (39)$$
$$\frac{v_N - v_S}{v_N + v_S} = a\left(\frac{1 + (1 - 2\varepsilon(\lambda))\cos\phi}{2} - \frac{1 - (1 - 2\varepsilon(\lambda))\cos\phi}{2}\right) / v_{NSE} =$$
$$(1 - 2\varepsilon(\lambda))\cos\phi.$$

Equation 38 mathematically shows the result of applying the correction factor to the normalized magnetic term and recombining it with the normalized electric field component, which is 1:

$$\hat{v}_N = \frac{1 + k(\lambda)v_{NSM}}{2} = \frac{1 + \frac{(1 - 2\varepsilon(\lambda))}{(1 - 2\hat{\varepsilon}(\lambda))}\cos\phi}{2} = \frac{1 + \cos\phi}{2} \quad (40)$$

$$\hat{v}_S = \frac{1 - k(\lambda)v_{NSM}}{2} = \frac{1 - \frac{(1 - 2\varepsilon(\lambda))}{(1 - 2\hat{\varepsilon}(\lambda))}\cos\phi}{2} = \frac{1 - \cos\phi}{2}.$$

Here $\hat{v}_N$ and $\hat{v}_S$ are the corrected voltages for the north and south ports respectively. (If a dipole and loop are used to sense the field, $\hat{v}_N$ and $\hat{v}_S$ have beam patterns that are aimed north and south respectively. At the north port the recombination is to add the normalized magnetic term, and at the south port the recombination is to subtract the normalized magnetic term. Assuming the estimated $\hat{\epsilon}(\lambda)$ is close to the actual $\epsilon(\lambda)$, these corrected voltages will have patterns that are nearly an ideal raised cosine with a null in the backlobe. As such, calculations to find the AoA will be as accurate as if the antenna and its termination impedances were nearly ideal.

Figure 18:
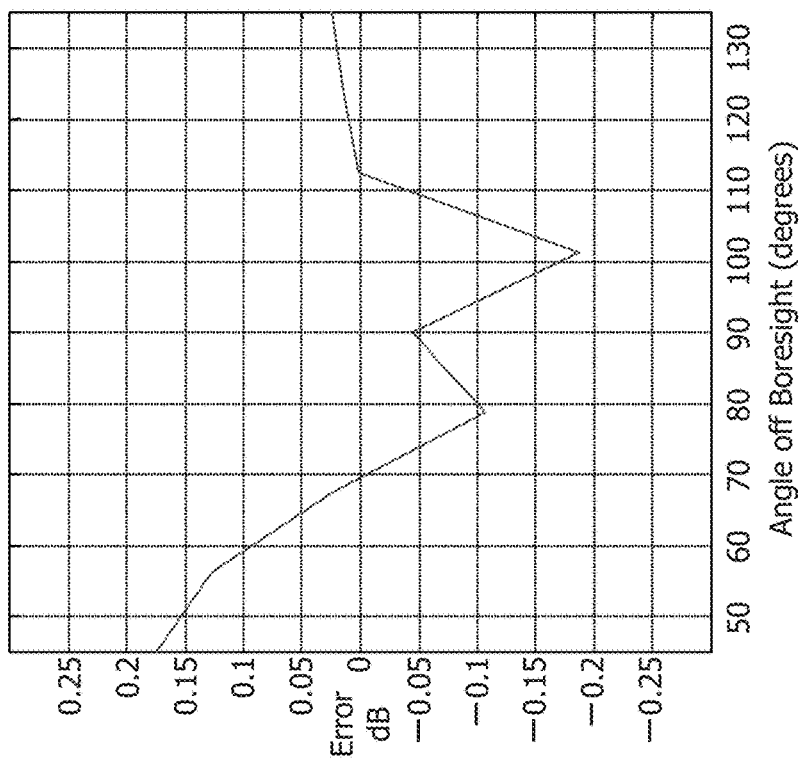
FIG. 18 is a plot showing the error between a simple 2-parameter theoretical beam pattern and the measured beam pattern according to a disclosed embodiment.
Figure 17:
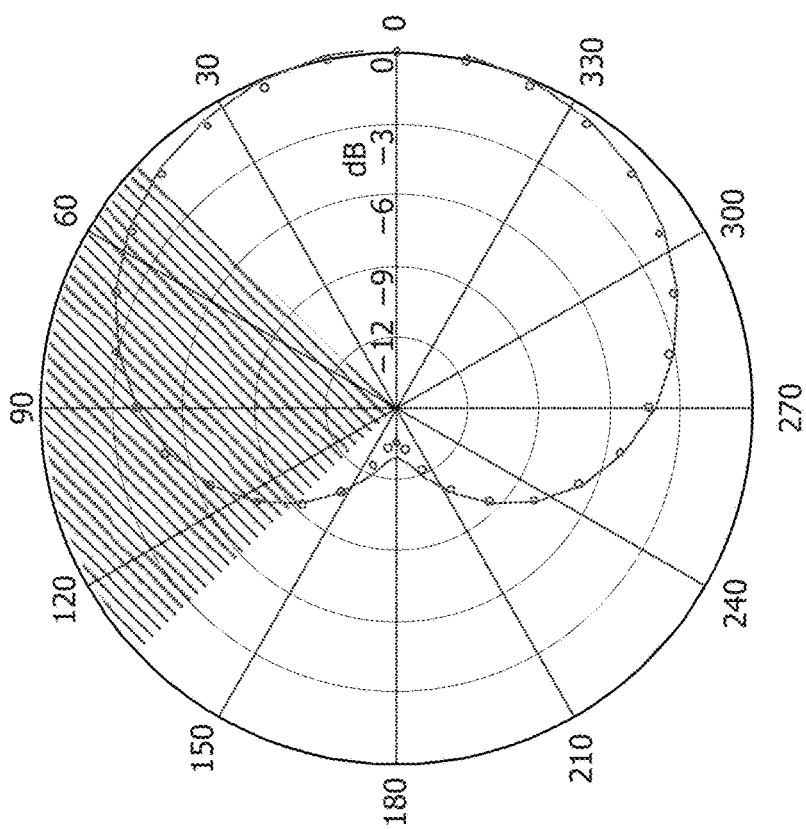
FIG. 17 shows a theoretical pattern along with overlaid measured points showing the very close match between the theoretical 2-parameter model and the measured beam pattern shape in the critical 45 to 135 degree sector according to a disclosed embodiment.

Measured DPA antennas show that this error term is quite small at low frequencies and grows at higher frequencies. FIG. 17 shows a plot with overlaid measurements (dots) and calculated (solid line) curves for the antenna. The agreement over the critical 90 degree sector is quite remarkable and is always within less than 0.2 dB relative to ideal. FIG. 18 plots the error as a function of angle, again highlighting the extremely good match between theory and practice. This low uncorrected error highlights the highly robust mechanical nature that allows the described RF emitter sensing system embodiment to be extremely small yet achieve high accuracy at arbitrarily low frequencies by incorporating PxMA elements that remain highly directive at arbitrarily low frequencies. The processing disclosed allows elimination of this error term.

Taken together, the processing disclosed in the above embodiments of the estimator element allow mitigation of self-noise, homogeneous atmospheric noise, anomalies from local scattering, errors in the antenna construction, as well as mitigation of the small energy collection due to the small size of the antenna so as to provide robust accuracy and sensitivity that extends below the noise floor of standard receivers built to demodulate the SoI (signal of interest).

Figure 20:
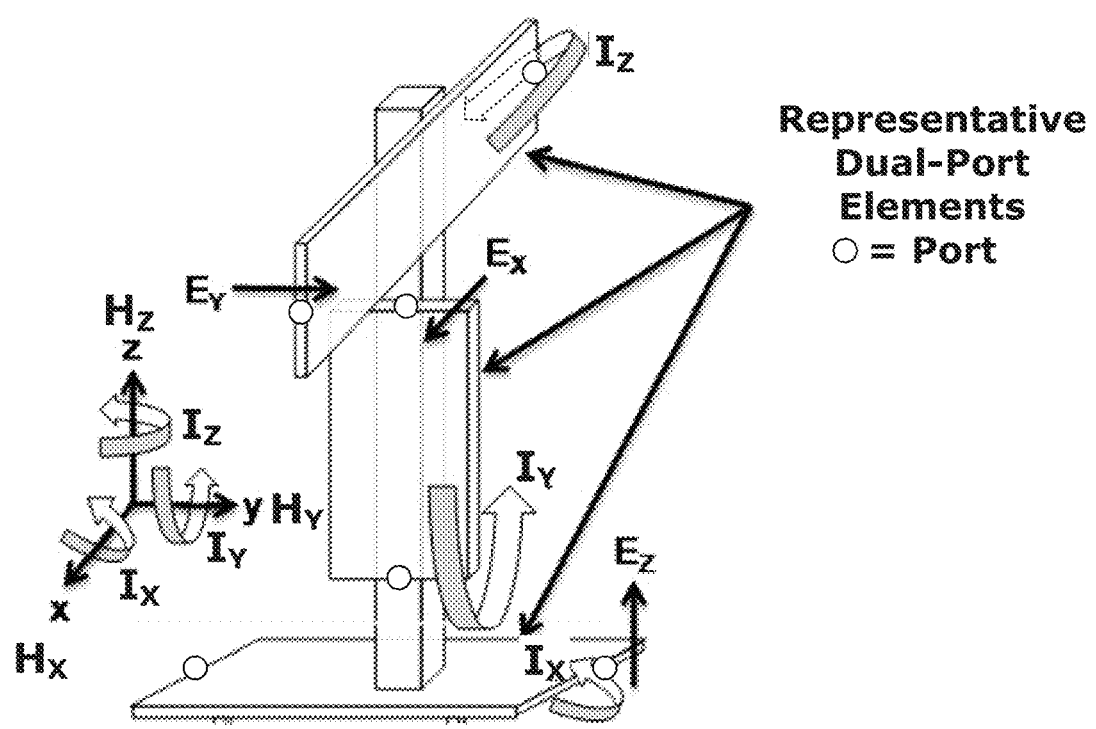
FIG. 20 is a three-dimensional drawing with rectangular-box representations of three DPAs similar to those in FIG. 3, oriented to enable their six ports to collect all six EM components. Following from FIG. 11, electromagnetic components $E_x$, $E_y$, $E_z$ shown in FIG. 20 create a voltage across the two conductive surfaces in the three respective DPAs. Currents $I_x$, $I_y$, $I_z$ induced in the loop formed by the ports and the conductive surfaces in the respective DPAs result from the respective H-field components $H_x$, $H_y$, $H_z$, shown in FIG. 20.

Given the above teaching, it is clear that the invention discloses an RF emitter sensing device wherein the antenna circuit can be configured such that the ports, including those from one or more multiport antennas, can be combined to provide three orthogonal E-field terms and three orthogonal H-field terms (e.g. $E_X$, $E_Y$, $E_Z$ and $H_X$, $H_Y$, $H_Z$). The HPA alone provides this capability. Three DPAs configured as shown in FIG. 20, also provide this capability. Three QPAs provide this capability with redundancy that is useful for mitigating errors. These terms can take advantage of all of the error mitigation techniques described above to deliver the best SNR and accuracy. The estimator is configured to output the three dimensional AoA for each SoI by estimating the three dimensional Poynting vector S of each SoI from the antenna circuit's outputs. Typically, the estimator is configured to perform the cross-product, $S=\vec{E}\times\vec{H}=\vec{x}(E_Y H_Z - E_Z H_Y) + \hat{y}(E_Z H_X - E_X H_Z) + \hat{z}(E_X H_Y - E_Y H_X)$ to estimate the Poynting vector. This cross-product is illustrated in FIG. 11.

Multipath Immune Field Strength Indicator

Uniquely, at a single point in space, the disclosed RF emitter sensing device can measure the separate electromagnetic field components, $E_x$, $E_y$, $E_z$ and $H_x$, $H_y$, $H_z$, for an arbitrarily polarized wave coming from any direction when it uses an HPA or DHPA. Similarly, when it uses a QPA, it can measure at a single point in space the separate three electromagnetic field components, for example, $E_z$, $H_x$, $H_y$ from a vertically polarized wave, coming from any direction. Similarly, when it uses a DPA, it can measure at a single point in space two field components, such as $E_z$, $H_x$, allowing it to sense and isolate the forward wave and reverse wave components aligned with the axis of the DPA. Due to the ability of a DPAs and QPAs to operate at an arbitrarily small size, multiple QPAs or DPAs can be placed electrically close together such that they measure, at effectively the same point on a wavefront, the electromagnetic field components covered by the different QPAs and/or DPAs. For example, consider a situation where a pair of DPAs are vertically polarized and oriented so they measure $E_{z1}$, $H_x$ and $E_{z2}$, $H_y$ respectively. In such a case, the closer the DPAs are to each other, the closer $E_{z1}$ will be to $E_{z1}$. Even if the multiple antennas are not close enough together that $E_{z1}$ and $E_{z1}$ are close, each antenna is still able to sense and isolate the forward wave and reverse wave components aligned with the axes of each loop within the set of multiple antennas.

This dual-directional coupling ability to sense and isolate the forward wave and reverse wave components, and having access to multiple electromagnetic field components collected in the exact same point in space gives the disclosed RF emitter sensing system the ability to perform better in environments with multipath than previous systems where the antennas do not have this ability.

To illustrate the multipath issues, recall how a standing wave is set up in a transmission line. Suppose a transmission line has a short at one end and an RF signal fed into the other end, and a standing wave is generated that is confined to one dimension, down the transmission line. In the transmission line, power flows smoothly in two directions, forward or backward down the transmission line. Note that energy is conserved at all points. The short represents an object causing a multipath reflection. At the short, the two waves (the forward wave and the backward wave reflected by the short) sum such that the voltage is at a minima (an ideal short would make the voltage zero) and the current is at a maxima. At a point one quarter wavelength from the short the two waves sum such that there is a voltage maxima and a current minima.

Expanding this multipath generated standing wave to three dimensions (3D), consider a grass field with a metal building on it. A transmitted wave will travel "forward" and bounce off of the metal building causing a "reflected" or "backward" wave. Just like the transmission line, the two waves (forward and reflected) sum such that a standing wave is created much like that in transmission line, but now the standing wave is in 3D. The "forward" wave is a spherically expanding wave front centered on the transmitter and covering the grass field. The reflected "backward" wave is also spherically expanding from the reflection surface. That reflected wave is also covering the grass field. These two waves cause a two-dimensional spatial standing wave. The E-field might be visualized as a waffle, where the height of the waffle is proportional to the E-field. The peaks of the waffle located at the peaks of the E-field, and the dips in the waffle at nulls of the E-field. The waffle height is high nearby a metal building and lower further from the metal building. The H-field might be visualized as another waffle, but with its peaks where the E-field waffle is in a dip, and its nulls where the E-field is peaked. The standing wave ratio (VSWR), the maximum voltage to minimum voltage, is highest around the metal building because the forward and reflected waves are of nearly equal amplitude and therefore can nearly cancel and create deep minima.

In practice, the existence of this standing wave means that when a an RF sensing system operator is standing at one position near the building, the E-field is doubled and at a maxima while the H-field is nearly canceled and is at a minima. The problem is that when the operator just slightly turns or moves, moving the antennas a few inches, the E-field can change to a minima and the H-field nearly doubled to is a maxima. This is particularly problematic in the VHF and UHF frequency bands. That being the case, any system whose basic operating principle depends on a spatially smooth E-field (i.e. no multipath) such as using a set of displaced dipoles to pick up the E-field at each dipole location, will not provide robust measurements. It will be confused by the non-smooth but waffle-like spatially changing E and H fields.

By having access to the various electromagnetic field components measured at the same point, the disclosed RF emitter sensing device can calculate a very precise field-strength indicator (FSI) metric that is immune to multipath. This FSI metric is in stark contrast to what is typically called a received signal strength indicator (RSSI). RSSI is universally derived from a single field component—either the E-field (e.g. from a dipole antenna) or the H-field (e.g. from a loop antenna)—on a single channel receiver that has access to only one antenna port. As a result, RSSI is well known for having an unacceptably high variance in environments with multipath.

Beyond just the FSI versus RSSI benefits, the benefits of this multipath immunity extends to AoA and range estimation as well. AoA estimation based on having access to the various electromagnetic field components measured at the same point in space is in stark contrast to DF-systems, which estimate the AoA based on the phase relationship of the E-field sensed by 4-dipoles. These phase relationships are well behaved in an anechoic chamber where only one wavefront exists. But in typical outdoor environments with multipath, the multipath sets up standing waves that can drastically change the estimated AoA, making it wrong, and making it drastically change with slight movements in the RF emitter sensing system or the target signal. For example, at one location, some of the dipoles might be near an E-field null, while other dipoles are not. At a slightly different location, like moving a few inches with a 450 MHz signal, the situation could be reversed. As a result, the 4-dipole array has very high sensitivity to multipath. The use of the 4-dipoles assumes a single wavefront with its positionally smooth E and H field. But having a single wavefront is simply not a valid assumption in many important scenarios, like operating in a forest or in an urban area where multipath is guaranteed.

A unique property of the disclosed RF emitter sensing device is that it measures and isolates the multiple electromagnetic field components all at the exact same spatial location. There are three key factors at work (A) multiple electromagnetic field terms are independently measured, (B) these terms can be calibrated relative to each other, as disclosed above, and (C) they are measured at the exact same location in space. These three factors combine to allow the disclosed RF emitter sensing device to compute a variety of precise field strength indicator (FSI) metrics that are: (1) insensitive to multipath (e.g. the SWR around a metal building, or trees when operating in a forest), and (2) insensitive to operator rotation (i.e. it is omni-directional). One metric would be the total field strength. For example, for a vertically polarized QPA, the total field can be computed as an RSS (root of the sum of the squares) of the electromagnetic field components:

$$\text{FSI}_{V\text{-}QPA\_total} = \sqrt{E_Z^2 + H_X^2 + H_Y^2}. \tag{41}$$

When the RF emitter sensing device includes an antenna combination that provides all electromagnetic field components, the total field can be computed as RSS of all the components:

$$\text{FSI}_{total} = \sqrt{E_X^2 + E_Y^2 + E_Z^2 + H_X^2 + H_Y^2 + H_Z^2}. \tag{42}$$

Another metric would be the field strength of just the forward and just the reflected waves. For example, for a vertically polarized QPA, these two field strengths can be computed as a linear combination of the measured electromagnetic terms $E_Z^2$, $H_X^2$, $H_Y^2$, as follows:

$$\text{FSI}_{V\text{-}QPA\_Forward} = E_Z + (\sin\psi \cdot H_X + \cos\psi \cdot H_Y), \text{ and} \tag{43}$$

$$\text{FSI}_{V\text{-}QPA\_Reflected} = E_Z - (\sin\psi \cdot H_X + \cos\psi \cdot H_Y). \tag{44}$$

where $\psi$ is used to adjust the weighting on the linearly combined terms and is adjusted to minimize.

$$\frac{FSI_{V\_QPA\_Reflected}}{FSI_{V\_QPA\_Forward}}. \quad (45)$$

In this case, the formulation assumes the operator is nominally between the target and the reflector such that the reflected wave is arriving from a direction approximately 180 degrees from the forward wave. The angle ψ is used to computationally rotate the oppositely aimed cardioid patterns natively provided by the antenna ports. A DF-system with an antenna configuration that provided all 6 electromagnetic can use a similar linear combination of all the electromagnetic terms to rotate a cardioid pattern in 3D space.

When the disclosed DF-system is built with a pair of DPAs that are close to each other, a total field FSI can be computed that, while not ideal, is still highly immune to multipath relative to standard RSSI metrics. For example, for a system set up for vertical polarization, the metric can be computed as the following RSS combination of the measured electromagnetic field components:

$$FSI_{2\text{-}V\text{-}DPA} = \sqrt{\left(\frac{|E_{NS}| + |E_{EW}|}{2}\right)^2 + H_{NS}^2 + H_{EW}^2}, \text{ or} \quad (46)$$

$$FSI_{2\text{-}V\text{-}DPA} = \sqrt{\frac{E_{NS}^2 + E_{EW}^2}{2} + H_{NS}^2 + H_{EW}^2} \quad (47)$$

The differences between a 4 inch quad port versus a pair of 4 inch DPAs separated by 4 inches, is likely un-noticeable at HF (3-30 MHz), moderate at VHF (30-300 MHz) where the antenna centers can be as much as about ⅕th wavelength apart, and significant at UHF (300-1000 MHz) where the antenna centers can be as much as about ⅔ wavelength apart.

Based on these teachings it is clear that in addition to the RSS and linear combinations illustrated, one skilled in the art could use other combinations of the electromagnetic field components to create field strength indicators optimized for other conditions or to cover additional polarizations and 3D space.

To be clear, blockages will still affect the FSI. Furthermore, in outdoor environments these FSI metrics are often still a sum of energies coming from multiple directions (i.e. there is more than just one reflector), especially in urban environments. So when the operator moves along a certain bearing, the bearing with the greatest ascent in FSI may not be toward the target, but some spot midway between the true target and another reflector. Nonetheless, the slope with operator motion of the FSI metrics disclosed are reasonably smooth. They do not bounce around due to multipath as much as a 4-dipole system does or as much as a typical RSSI does. This fact allows an operator to more quickly close in on a target transmitter based on the FSI.

Ranging

When a DF-operator is gets close to a target (i.e. the "fox" in a radio "fox hunt") the FSI will be changing quickly with distance to the target, since there is a high percentage range-change. This high change rate can provide additional information to zero in on the target, even in cases where there is lots of multipath and the AoA estimate might not be as reliable as open areas. Furthermore, the added FSI information is useful when walking away from a building. In difficult areas, a short walk in a few directions can tell you which direction is correct and help interpret multiple AoA numbers such as identifying which AoA estimates are likely from reflections and which are likely the target of interest.

Uniquely, the disclosed RF emitter sensing device can estimate the target range based on one of its unique multipath immune FSI metrics as opposed to triangulation with multiple AoAs measured at different locations. The combination of (A) having an FSI that is highly multipath robust, omnidirectional, and measurable with high accuracy (delta-FSI to hundredths of a dB), (B) having a system that accurately measures its position and orientation in real time, and (C) having computational capability, allows the disclosed DF-system to estimate the target range from measurements taken at two different ranges.

Using FSI allows an operator the flexibility to move in a straight line toward a target and still be able to estimate the target range. This capability can be vital when it is desirable to approach the target in secrecy, or where the speed of getting to the target is important. This straight-path capability is in stark contrast to the normal approach of walking on a tangential path in order to change the AoA and allow ranging by triangulation. It is also in stark contrast to the standard approach to avoid walking on a tangent path, which is to require multiple operators, each with a DF-system, so they can coordinate and jointly triangulate to get a geolocation based on multiple AoA's. The disclosed RF emitter sensing device is a single node geolocation system that is fast, avoids requiring walking on a tangent path, and becomes more and more accurate as the operator closes in on a target. The addition of the multipath immune FSI functions enables the disclosed DF-system to be a superior single-operator geolocation system.

The equation to solve for range is very simple and requires only two measurement points:

$PF$ = Propagation Factor ( = 2 for Free-Space)

$r$ = range

Power Received $\propto \dfrac{1}{r^{PF}}$ $d_{12}$ = (distance moved toward the target between $r_1$ and $r_2$)
   = (distance moved) · cos($AoA$ − (angle moved))

$FSI_1 = \left(\dfrac{\alpha}{r_1}\right)^{PF/2} = \left(\dfrac{\alpha}{r_2 + d_{12}}\right)^{PF/2}$ and $FSI_2 = \left(\dfrac{\alpha}{r_2}\right)^{PF/2}$, $\alpha = \dfrac{FSI_1^{2/PF} \cdot FSI_2^{2/PF} \cdot d_{12}}{FSI_2^{2/PF} - FSI_1^{2/PF}}$ $r_2 = \dfrac{FSI_1^{2/PF} \cdot d_{12}}{FSI_2^{2/PF} - FSI_1^{2/PF}}$ where $FSI_1$ is measured at range $r_1$, $FSI_2$ is measured at range $r_2$, $r_2$ is distance $d_{12}$ closer to the target than range $r_1$, the units for $r_2$ are the same as the units used for $d_{12}$, α is proportional to the transmitted signal voltage level emitted from the transmit antenna.

To calibrate, a PF term is entered and adjusted by the operator until the correct range is provided for a target at a known range. PF can also be found by using multiple points and adjusting it so all measurement pairs give approximately the same geographical position. The operator could also enter their geolocation and the RF emitter sensing device could lookup the correct PF to use in that particular geographic area. Generally, PF is between 2 and 4, but can occasionally fall outside of this range in unusual environments.

This ranging and geolocation capability is especially useful as the operator closes in on a target since the estimated range becomes extremely accurate and since it gives the operator complete flexibility on choosing their path to the target.

Operator Display

The disclosed RF emitter sensing device captures more information about the signal than previous DF-systems, and must effectively communicate this information to the operator. Preferred embodiments communicate to the operator via one or more of visual, acoustic, vibration, or touch mechanisms according to the particular application's needs. For example, in a portable application, as the system operator walks, displaying immediate estimates as well as some history of the FSI, the AoA estimates, the AoA variance, and the polarization if available, versus time would also aid the DF-operator in clustering and identifying bearing and range to participants in a radio net. A user-friendly and easy to learn display allow the operator to choose settings like history duration, or dimming rates, or some color-scale encodings. For example, the last N AoA estimates might be shown where:

1) The most recent is bright, and successive older ones are dimmed by age,

2) The dimming rate is slower for AoAs with low variance and faster for AoAs with high variance, 3) The line color is coded by its derivation method—e.g. white for AoAs derived from six ports, red for four ports, and green for AoAs derived from two ports, and 4) Dashed lines are added to show the variance around each line.

Allowing the operator to select line styles and what to display would enable experimentation and allow personal customization to suite different personalities or customization for different physical environments—like forest versus city versus relatively open field.

Preferred embodiments would communicate several FSI based metrics, such as total field, ratio of the reflected field to the forward field, an estimated range based on changes with the field strength versus position, and an estimated geolocation based on both the AoA and the estimated range. These could be communicated both numerically and graphically. For example, a vertical bar graph, where the bar length grows with field strength could be used to communicate both field strength and the rate of change of field strength. The levels at the bottom and top of the bar graph could be indicated numerically and be user adjustable, such as by top and bottom values or span and center values. For another example, the various FSI metrics could also be displayed on a dial, or set of dials, or a multi-hand clock with a sensitive (e.g. "seconds") hand and a less sensitive (e.g. "minutes") hand, where clockwise motion means the level is increasing, counter-clockwise motion means the level is decreasing, and each 360 degree turn causes a numerical counter, or the next dial over, or another hand, or a color index, to increment or decrement accordingly. A user setting could allow the operator to choose how many dB change caused a 360 degree turn, allowing high sensitivity to field strength changes. For example, using a clock like dial display, the operator could set the "seconds hand" to 2 dB per rotation, and the "minutes hand" to 60 dB per rotation allowing both fine scale and large scale changes to be communicated nearly instantly in a way that the operator could remember the recent history. Assuming PF=2 (free space), every 6 dB increase in the FSI means the distance to the target has been cut in half.

By virtue of capturing the various electromagnetic field components, the disclosed RF emitter sensing system can computationally rotate the cardioid beam patterns produced at the antenna ports. The feature is used in Equations 43 and 44 to find the field strength of the forward and reflected waves. Preferred embodiments would include a graphical plot of the field strength as a function of a beam pointing angle (i.e. $\psi$ in equation 43) as such a pattern would aid the operator in some multipath environments. Most embodiments would include a graphical compass line showing the bearing to the emitter and the bearing to a reference heading (e.g. north).

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. An RF emitter sensing device comprising an antenna circuit, an isolation element, and an estimator element configured to output, for one or more incoming signal-of-interest (SoI), either or both of an estimated range to the emitter of each SoI, and estimates for one or more angles corresponding to the angle-of-arrival (AoA) of each SoI, wherein:

the antenna circuit has a plurality of ports that each output an output signal containing the one or more SoI, the antenna circuit including one or more multi-port antennas, each multi-port antenna having two or more ports, each multi-port antenna being configured to
    pick up a combination of one or more E-field signals and one or more H-field signals from each SoI,
    in a common volume of space,
    such that the one or more E-field signals and the one or more H-field signals can be isolated from each other by combining the output signals; and the isolation element is configured to output one or more isolated SoI outputs, for each respective port by
    receiving the output signals from each output port of the antenna circuit, and
    isolating in each respective port, one or more SoI from other extraneous signals; and the estimator element is configured to output either or both of an estimated range to the emitter of each SoI, and estimates for one or more angles corresponding to the AoA of each SoI by:
    receiving the output signals from the antenna circuit, and
    generating either or both of an estimated range to the emitter of each SoI, and estimates for one or more angles corresponding to the AoA of each SoI.

2. The RF emitter sensing device of claim 1 also receiving or having access to user data that includes SoI-isolation-metrics corresponding to each SoI wherein,
the isolation element is configured to isolate the one or more SoI from other extraneous signals according to the SoI-isolation-metrics.

3. The RF emitter sensing device of claim 1 also receiving or having access to user data that includes SoI-isolation-metrics corresponding to each SoI wherein:
the SoI-isolation-metrics include one or more of, time intervals when the SoI is known or likely to be active, time intervals when the SoI is known or likely to be inactive, field strength range, center frequency, bandwidth, modulation characteristics, occurrence timing, repetition rate, polarization, field strength range, stability of field strength, constraints on a range of potential angles of arrival, and multipath geometries; and
the isolation element is configured to isolate the one or more SoI from other extraneous signals according to the SoI-isolation-metrics.

4. The RF emitter sensing device of claim 1 wherein the one or more multi-port antennas include a multiport antenna that is comprised of one or more conductive-surface-pairs, wherein,
each conductive-surface-pair has
a first conductive surface,
a second conductive surface offset in an offset-direction from the first conductive surface, and
one or more port-pairs, each port-pair including a first port and a second port;
wherein each of the first and second port is formed by a connection to the first and second conductive surfaces, and
wherein each of the one or more port-pairs forms a loop going from a first terminal of a corresponding first port, through the first conductive surface to a first terminal of a corresponding second port, through a termination load connected across the corresponding second port to a second terminal of the corresponding second port, and through the second conductive surface to a second terminal of the corresponding first port, and through a termination load connected across the corresponding first port, back to the first terminal of the corresponding first port to complete the loop, and
an output for each port; and
different conductive-surface-pairs have different offset-directions and
the loops associated with the port-pairs share a nominally common center point.

5. The RF emitter sensing device of claim 1, wherein the estimator element is configured to output either or both of an estimated range to the emitter of an SoI, and estimates for one or more angles corresponding to the AoA of an SoI by also:
computing the estimated range and/or one or more angle estimates based on a computation that is a function of:
the received output signals from the antenna circuit, and
a set of one or more baseline values determined with one or more known SoI, with each of the one or more known SoI at one or more known positions or angles.

6. The RF emitter sensing device of claim 1, wherein the estimator means is configured to, for each SoI:
isolate E-field signals from the SoI by combining output signals from the antenna circuit, and
isolate H-field signals from the SoI by combining output signals from the antenna circuit, and
the estimator means is configured to output either or both of an estimated range to the emitter of the SoI, and estimates for one or more angles corresponding to the AoA of the SoI by also by using one or more of:
the magnitude of combinations of the isolated E-field signals from the SoI and the isolated H-field signals from the SoI, and
the phase of combinations of the isolated E-field signals from the SoI and the isolated H-field signals from the SoI.

7. The RF emitter sensing device of claim 1, wherein
the antenna circuit is configured to pick up signals at a more than one location or orientation, and
the one or more locations or orientations are made with one or more of a sequential configuration and a simultaneous configuration;
wherein, in the sequential configuration, ports are in respective initial locations and orientations at an initial time, and ports are in a respective next location and orientation at a next time that is later than the initial time, and wherein the estimator uses the output signals received at different times.

8. The RF emitter sensing device of claim 1 wherein the estimator element is configured to output either or both of an estimated range to the emitter of an SoI, and estimates for one or more angles corresponding to the AoA of an SoI by also:
computing the estimated range and/or one or more angle estimates based on a computation that is a function that uses the received output signals from the antenna circuit,
wherein the function is configured to mitigate estimation bias caused by one or more of: receiver noise, noise picked up by the antennas, sensitivity imbalance in the E and H fields picked up by a port, the magnitude of an SoI, effects of non-ideal termination impedances attached to the antenna ports, and the effects of objects causing reflections into the antenna circuit or blockages to the antenna circuit.

9. The RF emitter sensing device of claim 1, wherein the estimator element is configured to generate, for each SoI, one or more angles corresponding to the AoA of each SoI, by also:
computing, for each SoI, a set of measured values based on the one or more isolated SoI outputs from the isolation means,
comparing, for each SoI, the set of measured values with a plurality of sets of calibration values, where the plurality of sets of calibration values is comprised of sets of values determined with the SoI emitter at known, one or more of, location, AoA, and range.

10. The RF emitter sensing device of claim 9 wherein each value set is derived from the outputs of an $i^{th}$ port pair and includes a first quantity $A_i$, and a second quantity $B_i$, where i is an index value from 1 to N, wherein,
the first quantity $A_i$, is a difference between a first SoI level and a second SoI level,
the second quantity $B_i$ is the sum of the first SoI level and the second SoI level.

11. The RF emitter sensing device of claim 9 wherein,
a set of real-time derived values is derived from the set of measured value sets,
the set of desired outputs are contained in a lookup table where each row contains the list of the desired outputs in a first set of columns, and a set of expected derived values, corresponding to the list of desired outputs, in a second set of columns, and determining the list of desired outputs involves finding a row where the set of expected derived values most closely matches the set of real-time derived values, and corresponding to the row found, reading from the first set of columns the list of desired output values.

12. The RF emitter sensing device of claim 9 wherein, the set of real-time derived values includes a plurality of ratio quantities corresponding to each port-pair, and each ratio quantity is the first quantity divided by the second quantity for each of the plurality of port-pairs.

13. The RF emitter sensing device of claim 9 wherein, a set of real-time derived values is derived from the set of measured value sets, the set of real-time desired outputs are contained in a lookup table where each row contains
  a first set of columns including the list of desired outputs,
  a second set of columns including a set of corresponding expected derived values, and
  a third set of columns that indicate, in each row, which values in the second set of columns are active for that particular row; and determining the list of desired outputs involves finding the row where the set of the set of expected derived values that are active according to the third set of columns, most closely matches the set of real-time derived values, and corresponding to the row found, reading from the first set of columns the list of desired output values.

14. The RF emitter sensing device of claim 9 wherein a set of derived values includes a plurality of value pairs corresponding to a plurality of port-pairs, and for each port pair, the value pair is the arc-sine and arc-cosine of a ratio quantity which is the first quantity divided by the second quantity.

15. The RF emitter sensing device of claim 9 wherein the first SoI level and the second SoI level are generated by:
  coherently estimating a first initial SoI level corresponding to the first port and a second initial SoI level corresponding to the second port, and
  correcting for any imbalance in the E-field and H-field sensitivities embedded in the first initial SoI level, and the second initial SoI level to generate the first SoI level and the second SoI level.

16. The RF emitter sensing device of claim 15, wherein the estimator is configured such that the coherently estimating is performed by
  choosing from the plurality of ports a different port, having a high SoI level relative to all the ports and that is neither the first port nor the second port, and
  finding a first initial SoI level that is a first correlation between the first port and the different port over a time period which may be discontinuous,
  finding a second initial SoI level that is a second correlation between the second port and the different port over a time period which may be discontinuous, and the correcting for any imbalance is performed by
  computing the sum of the first initial SoI level and the second initial SoI level,
  computing the difference between the initial SoI level and the second initial SoI level,
  computing a value M, which is the difference divided by the sum,
  having, for each said port-pair, a known or measured back-to-front ratio, $\hat{\epsilon}$, at the frequency of the SoI, and
  computing a correction factor k for each port pair that is one divided by the quantity 1 minus twice a measured back-to-front ratio $\hat{\epsilon}$, (k =1/(1−2$\hat{\epsilon}$) at the frequency of the SoI, such that
  computing the first SoI level to be one-half of M times the quantity of 1 plus k ( M (1+k)/2), and
  computing the second SoI level to be one half of M times the quantity of 1 minus k, (M(1−k)/2).

17. The RF emitter sensing device of claim 9, wherein the antenna system includes one or more pairs of port-pairs, such as an $i^{th}$ port-pair and a $j^{th}$ port pair, where i and j are indexes, wherein,
  j is not equal to i,
  the patterns of the first port and the second port in each of the port-pairs are aimed in opposite directions,
  all the ports in each pair of port-pairs share the same polarization axis,
  the aiming axis of the $i^{th}$ port-pair is orthogonally to the $j^{th}$ port-pair, and
  the estimator is configured to determine the list of desired outputs by correcting for homogeneous noise $\xi_{i,j}$ picked up by each of the ports by estimating the homogeneous noise and removing its affect.

18. The RF emitter sensing device of claim 17, wherein the estimator module is further configured to estimate the homogeneous noise $\xi_{i,j}$ such that, $$\xi_{i,j} = \Phi(A_i, B_i, A_j, B_j) = \text{Re}\left[\frac{B_i}{2} + \frac{B_j}{2} - \sqrt{\frac{F}{6} + \frac{H}{4} + \frac{I}{144}} - \sqrt{\frac{F}{3} - \frac{H}{4} - \frac{I}{144} - \frac{3E}{\sqrt{I+36H+24F}}}\right]$$

wherein
$A_i$, $B_i$, $A_j$, $B_j$ are the first and second quantities of the $i^{th}$ and $j^{th}$ port-pairs respectively $$E = A_i^2 B_i - A_j^2 B_i - A_i^2 B_j + A_j^2 B_j,$$
$$F = A_i^2 + B_i^2/2 - B_i B_j + A_j^2 + B_j^2/2,$$
$$G = (B_i - B_j)^2(4A_i^2 - B_i^2 + 2B_i B_j + 4A_j^2 - B_j^2),$$
$$H = \sqrt[3]{\sqrt{3(432E^4 - 64E^2 F^3 + G(16F^4 - 144E^2 F) + 8F^2 G^2 + G^3)}/72 + E^2/2 - F^3/27 + G(2B_i B_j - 2A_i^2 - B_i^2 - 2A_j^2 - B_j^2)/24},$$
$$I = \begin{cases} (4F^2 - 3G)/H & \text{if } H \neq 0 \\ 0 & \text{if } H = 0 \end{cases},$$

and
the estimator is configured to estimate an angle of arrival from the (i, j) pair of port-pairs using a four quadrant arctangent function (e.g. atan2(y, x) Fortran function), where the arguments are $A_i/(B_i-\xi_{i,j})$ and $A_j/(B_j-\xi_{i,j})$.

19. The RF emitter sensing device of claim 17, wherein the estimator module further:
  operates to estimate the homogeneous noise $\xi_{i,j}$ for a particular (i, j) pair of port-pairs, such that $$\xi_{i,j} = \Phi(A_i, B_i, A_j, B_j) = \text{Re}\left[\frac{B_i}{2} + \frac{B_j}{2} - \sqrt{\frac{F}{6} + \frac{H}{4} + \frac{I}{144}} - \sqrt{\frac{F}{3} - \frac{H}{4} - \frac{I}{144} - \frac{3E}{\sqrt{I + 36H + 24F}}}\right],$$

wherein
$A_i$, $B_i$, $A_j$, $B_j$ are the first and second quantities of the $i^{th}$ and $j^{th}$ port-pairs respectively $E = A_i^2 B_i - A_j^2 B_i - A_i^2 B_j + A_j^2 B_j$, $$F = A_i^2 + B_i^2/2 - B_i B_j + A_j^2 + B_j^2/2,$$

$$G = (B_i - B_j)^2 (4A_i^2 - B_i^2 + 2B_i B_j + 4A_j^2 - B_j^2),$$

$$H = \sqrt[3]{\sqrt{3(432E^4 - 64E^2 F^3 + G(16F^4 - 144E^2 F) + 8F^2 G^2 + G^3)}/72 + E^2/2 - F^3/27 + G(2B_i B_j - 2A_i^2 - B_i^2 - 2A_j^2 - B_j^2)/24},$$

$$I = \begin{cases} (4F^2 - 3G)/H & \text{if } H \neq 0 \\ 0 & \text{if } H = 0 \end{cases},$$

and
operates to generate a set of derived value sets for each pair of port-pairs that includes the values $A_i/(B_i - \xi_{i,j})$, $A_j/(B_j - \xi_{i,j})$, and $(B_i - \xi_{i,j})/(B_j - \xi_{i,j})$, for each (i, j) pair of port-pairs,
includes a lookup table in which each row contains,
the angles from the list of desired outputs in a first set of columns, and corresponding to these angles,
the expected values for the set of derived value sets, in a second set of columns; and
operates to determine the list of desired outputs by finding the row where the expected values most closely match the values in the set of derived value sets, and reading from the first set of columns in that row, the list of output values.

20. An RF emitter sensing device, comprising:
an antenna-system including one or more antenna elements;
an isolation means configured to
receive a signal from each port of the antenna-system, and
isolate, for each port, a signal of interest (SoI) from other extraneous signals based on the SoI-isolation-metrics, and
output, for each corresponding antenna-system port, an isolated SoI output;
a combing module that that includes N combiners, each combiner configured to generate an output-pair that includes a first output and a second output, where the first output and the second output both have patterns that are nominally a raised sine, and aim in opposite directions, where N is one or more, and where we will use i or j to correspond to and reference a particular output-pair by taking its value from 1 to N , and
an estimator module configured to
receive the plurality of output-pairs from the combining module, and
generate the list of desired outputs for each SoI by using the plurality of SoI-quad-sets, and user data; and
output the list of desired outputs;
wherein the estimator means estimates and computes the SoI angle of arrival by
computing a set of measured value sets, one value set for each output-pair, where each value set contains a first quantity $A_i$, a second quantity $B_i$, and where the first quantity $A_i$, is the difference between a first SoI level and a second SoI level, and where the second quantity $B_i$, is the sum of the first SoI level and the second SoI level, and where the first SoI level and the second SoI level are derived using the SoI received on the first port and the second port, and
determining the list of desired outputs based on a set of desired outputs that correspond to a set of potential value sets, and the set of measured value sets;
wherein the output-pairs are organized into one or more quad-sets that each include pairs of output-pairs (i, j), where both output-pairs share the same polarization but aim in orthogonal directions, such that j is never equal to i; and
wherein the estimator module operates to correct for homogeneous noise $\xi_{i,j}$ picked up by each quad-set by, estimating the homogeneous noise for a particular (i, j) quad-set such that $$\xi_{i,j} = \Phi(A_i, B_i, A_j, B_j) = \text{Re}\left[\frac{B_i}{2} + \frac{B_j}{2} - \sqrt{\frac{F}{6} + \frac{H}{4} + \frac{I}{144}} - \sqrt{\frac{F}{3} - \frac{H}{4} - \frac{I}{144} - \frac{3E}{\sqrt{I + 36H + 24F}}}\right],$$

wherein
$A_i, B_i, A_j, B_j$ are the first and second quantities of the $i^{th}$ and $j^{th}$ port-pairs respectively $$E = A_i^2 B_i - A_j^2 B_i - A_i^2 B_j + A_j^2 B_j,$$

$$F = A_i^2 + B_i^2/2 - B_i B_j + A_j^2 + B_j^2/2,$$

$$G = (B_i - B_j)^2 (4A_i^2 - B_i^2 + 2B_i B_j + 4A_j^2 - B_j^2),$$

$$H = \sqrt[3]{\sqrt{3(432E^4 - 64E^2 F^3 + G(16F^4 - 144E^2 F) + 8F^2 G^2 + G^3)}/72 + E^2/2 - F^3/27 + G(2B_i B_j - 2A_i^2 - B_i^2 - 2A_j^2 - B_j^2)/24},$$

$$I = \begin{cases} (4F^2 - 3G)/H & \text{if } H \neq 0 \\ 0 & \text{if } H = 0 \end{cases},$$

and
removing the effect of the homogeneous noise by generating a set of derived value sets including a quad-output-value-set for each quad-set, that is comprised of a first term $A_i/(B_i - \xi_{i,j})$, a second term $A_j/(B_j - \xi_{i,j})$, and sometimes a third term $(B_i - \xi_{i,j})/(B_i - \xi_{i,j})$, for a said (i, j) quad-set, and
wherein the estimator module includes a lookup table in which each row contains,
the list of desired outputs in a first set of columns, and corresponding to the values in the list, and
the expected values for the set of derived value sets, in a second set of columns,
wherein the estimator module is configured to find the row where the expected values most closely match the values in the set of derived value sets, and read from the first set of columns in that row, the list of output values, and wherein the user data includes for each SoI, SoI-isolation-metrics that can be used to isolate the SoI, including one or more of the center frequency, bandwidth, modulation characteristics, occurrence timing, repetition rate, polarization, field strength, stability of field strength, constraints on the range of potential angles of arrival, and known multipath geometries; and specifications for a list of desired outputs for each particular SoI, including one or more items such as the coordinate system and pose used, time and date, azimuth angle, desired azimuth angle accuracy and confidence level, achieved azimuth angle accuracy and confidence level, elevation angle, desired elevation angle accuracy and confidence level, achieved elevation angle accuracy and confidence level, maximum processing time allowed, processing time used, time periods used to integrate SoI energy, polarization, center frequency, modulation type, repetition rate, peak-to-average ratio, variance, times to a number of the highest independent peaks, frequency versus time profile, power versus time profile, and rms power.

a configuration of the antenna system including a position and beam pattern associated with each port in the antenna system relative to a reference position on the DF system, where the beam pattern includes one or more of magnitude, polarization, group-delay, transfer function, and impulse response as a function of angles, and the time, date and pose of a reference position on the DF system relative to an earth coordinate system.

* * * * *